(12) United States Patent
Johnsson et al.

(10) Patent No.: US 12,326,385 B2
(45) Date of Patent: Jun. 10, 2025

(54) CELL-PERMEABLE FLUOROGENIC FLUOROPHORES

(71) Applicant: MAX-PLANCK-GESELLSCHAFT ZUR FÖRDERUNG DER WISSENSCHAFTEN E. V., Munich (DE)

(72) Inventors: Kai Johnsson, Heidelberg (DE); Lu Wang, Heidelberg (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 838 days.

(21) Appl. No.: 17/296,243

(22) PCT Filed: Dec. 6, 2019

(86) PCT No.: PCT/EP2019/084006
§ 371 (c)(1),
(2) Date: May 23, 2021

(87) PCT Pub. No.: WO2020/115286
PCT Pub. Date: Jun. 11, 2020

(65) Prior Publication Data
US 2022/0404242 A1    Dec. 22, 2022

(30) Foreign Application Priority Data

Dec. 6, 2018 (EP) .................................. 18210676
Jun. 17, 2019 (EP) .................................. 19180481
Jun. 19, 2019 (EP) .................................. 19181362

(51) Int. Cl.
*G01N 1/30* (2006.01)
*C09B 11/02* (2006.01)
*C09B 11/24* (2006.01)
*C09B 57/02* (2006.01)

(52) U.S. Cl.
CPC ................ *G01N 1/30* (2013.01); *C09B 11/02* (2013.01); *C09B 11/24* (2013.01); *C09B 57/02* (2013.01)

(58) Field of Classification Search
CPC ...................................... C09B 57/02
USPC ........................................ 549/227
See application file for complete search history.

(56) References Cited

FOREIGN PATENT DOCUMENTS

CN          105693736        6/2016
WO          2018182811       10/2018

OTHER PUBLICATIONS

Hongli et al "An acid catalyzed reversible ring-opening/ring-closure reaction involving a cyano-rhodamine spirolactam", Org. Biomol. Chem., 2013, 11, 1805-1809.
Bender et al "Novel acid-activated fluorophores reveal a dynamic wave of protons in the intestine of Caenorhabditis elegans", ACS Chem Biol. Mar. 15, 2013;8(3):636-42. Epub Jan. 7, 2013.
Lee et al "Small-Molecule Labeling of Live Cell Surfaces for Three-Dimensional Super-Resolution Microscopy", J. Am. Chem. Soc. 2014, 136, 40, 14003-14006 Publication Date:Sep. 15, 2014.
Fang et al "Fluorescent probes for sensitive and selective detection of pH changes in live cells in visible and near- infrared channels", J. Mater. Chem. B, 2017,5, 9579-9590.
Duan et al "A ratiometric fluorescent probe for gasotransmitter hydrogen sulfide based on a coumarin-benzopyrylium platform", Analytica Chimica Acta vol. 859, Feb. 15, 2015, pp. 59-65.
Wang Lu et al: "A general strategy to develop cell permeable and fluorogenic probes for multicolour nanoscopy", Nature Chemistry, Nature Publishing Group UK, London, vol. 12, No. 2, Dec. 2, 2019 (Dec. 2, 2019), pp. 165-172.

*Primary Examiner* — Kahsay Habte
(74) *Attorney, Agent, or Firm* — JMB Davis Ben-David

(57) ABSTRACT

The present invention relates to rhodamine-type fluorophores being present in two states, a cell-permeable non-florescent form and a fluorescent form. The present invention also relates to use of the fluorophores in staining and live cell fluorescence imaging. The compounds have general formula (10) or the general formula (10').

20 Claims, 30 Drawing Sheets

CELL-PERMEABLE FLUOROGENIC FLUOROPHORES

CROSS-REFERENCE TO RELATED APPLICATIONS

This is the U.S. National Stage of International Patent Application No. PCT/EP2019/084006 filed on Dec. 6, 2019, which claims priority to European patent applications EP18210676.5, filed 6 Dec. 2018; EP19180481.4, filed 17 Jun. 2019; and EP19181362.5, filed 19 Jun. 2019, all of which are incorporated herein by reference.

The present invention relates to fluorophores being present in two states, a cell-permeable non-florescent form and a fluorescent form.

BACKGROUND

Synthetic fluorophores are important tools in chemistry and biology. One of the main applications is their use as molecular probes in biomolecular imaging. For such applications fluorophores should possess high solubility and membrane permeability to allow their application in live cells as well as in tissues and in vivo. Binding of the fluorophore to the target of interest can be achieved by its coupling to a suitable ligand. Examples of ligands are benzylguanines which react with SNAP-tag, chloroalkanes which react with Halotag, ligands that bind non-covalently to f-actin, microtubules, DNA or enzymes. In addition, alternative labelling strategies for other biomolecules exist.

Most fluorophores possess rather low membrane permeability and/or low solubility, which makes them unsuitable for live-cell bioimaging. One of the few classes of fluorophores that possess the required brightness and photostability needed for bioimaging, and in certain cases possess good membrane permeability are the rhodamines, rhodols, and derivatives thereof. These fluorophores are often coupled to ligands that target them to specific biomolecules or to biological structures and such molecules are then often referred to as fluorescent probes. It has been realized that one important feature of these fluorophores that can make them well suited for bioimaging is their capacity to form spirolactones (Scheme 1). Spirolactones are also referred to as the closed form of the molecule. The spirolactone of the rhodamines is not fluorescent, but it is uncharged and thus has a higher membrane permeability than the open form of the rhodamine. The open form of the rhodamines is fluorescent and is a zwitterion. Research in the last years has focused on identifying rhodamines that are in a dynamic equilibrium between the open and closed form. In aqueous solution, a rhodamine well suited for live-cell imaging would exist to a significant percentage in the closed form so that it can penetrate into cells. However, it should convert to the open form when bound to its biological target. The binding to the biological target is generally mediated by a ligand which is attached to the fluorophore. Such fluorescent probes are also called fluorogenic to highlight the fact that their fluorescence is dependent on target binding. This is attractive as it reduces background signal resulting from unbound probe. One of the early examples that exploited the lactone-zwitterion equilibrium to generate fluorescent probes with good membrane permeability and fluorogenicity are silicone-rhodamine (Si-rhodamine) derivatives. Compared to regular rhodamines, Si-rhodamines possess a higher propensity to form the closed form of the fluorophore but preferentially go to the open form when bound to their target. Building on these advances, other rhodamines have been designed in which substituents at the xanthene ring favour formation of the lactone relative to regular rhodamines such as rhodamine 110 or tetramethyl-rhodamine (TMR), which exist mostly in the open form. In all of these examples, formation of the closed form is based on the formation of a spirolactone. Formation of spirolactames has also been described but in the described structures, formation of the closed form is strongly favoured over the open, fluorescent form, which makes them not well suited for fluorescence spectroscopy.

The equilibrium between the open and closed form of rhodamines depends on the ionic strength of the solvent, as measured by water-dioxane titrations. At lower solvent polarity, the closed form is favoured whereas at higher solvent polarity the open form is preferred. It has been found that dyes that show good membrane permeability and also fluorogenicity, transition from the closed to the open form at an ionic strength between 20-60, Si-rhodamines being one example. In contrast, classical rhodamines such as TMR are already at low solvent polarity (i.e. an ionic strength below 20) fully in the open state. One strategy to increase membrane permeability of such dyes is to decrease the electron density of the xanthene ring, for example through substitution with fluorides. Alternative strategies to control the open and closed form of rhodamine and rhodamine derivatives are needed for the generation of new membrane permeable and fluorogenic fluorescent probes.

Based on the above-mentioned state of the art, the objective of the present invention is to provide means and methods to provide access to a new class of fluorogenic fluorophores with improved properties. This objective is attained by the subject-matter of the independent claims of the present specification.

SUMMARY OF THE INVENTION

The inventors describe new rhodamines and rhodols bearing acidic amides that exist in a dynamic equilibrium between the open, zwitterionic form and the closed form, comprised of a spirolactam. The nature of the amide is chosen such that the rhodamines transition from the closed to the open state at intermediate ionic strength. Specifically, the inventors found that rhodamines bearing acyl sulfamides or acyl amidonitriles are in a dynamic equilibrium between their open and closed state. This contrasts with previously described rhodamines possessing an amide at this position. Attaching such fluorophores to suitable ligands enables the generation of fluorescent probes with good membrane permeability and fluorogenicity based on rhodamines, carbopyronines, Si-rhodamines and other rhodamine-like structures. Such ligands can be: substrates of self-labelling tags such as SNAP-tag, Halotag and Clip-tag; ligands binding non-covalently to biological structures such as docetaxel and jasplakinolide binding to microtubules and f-actin; ligands binding to nucleic acids such as Hoechst; ligands accumulating in cellular organelles; ligands binding to membrane structures, ligands binding to selected cell types, organisms, viruses. The fluorophore can also be used for the generation of sensor molecules such as a calcium indicator by fusing it to a calcium-chelating group. Another important aspect of rhodamines bearing acyl sulfamides is that any ligand can also be attached through the acyl sulfamide. The inventors also demonstrate that the same amides can be used to generate semi-rhodamines that dynamically can switch be an open and closed state.

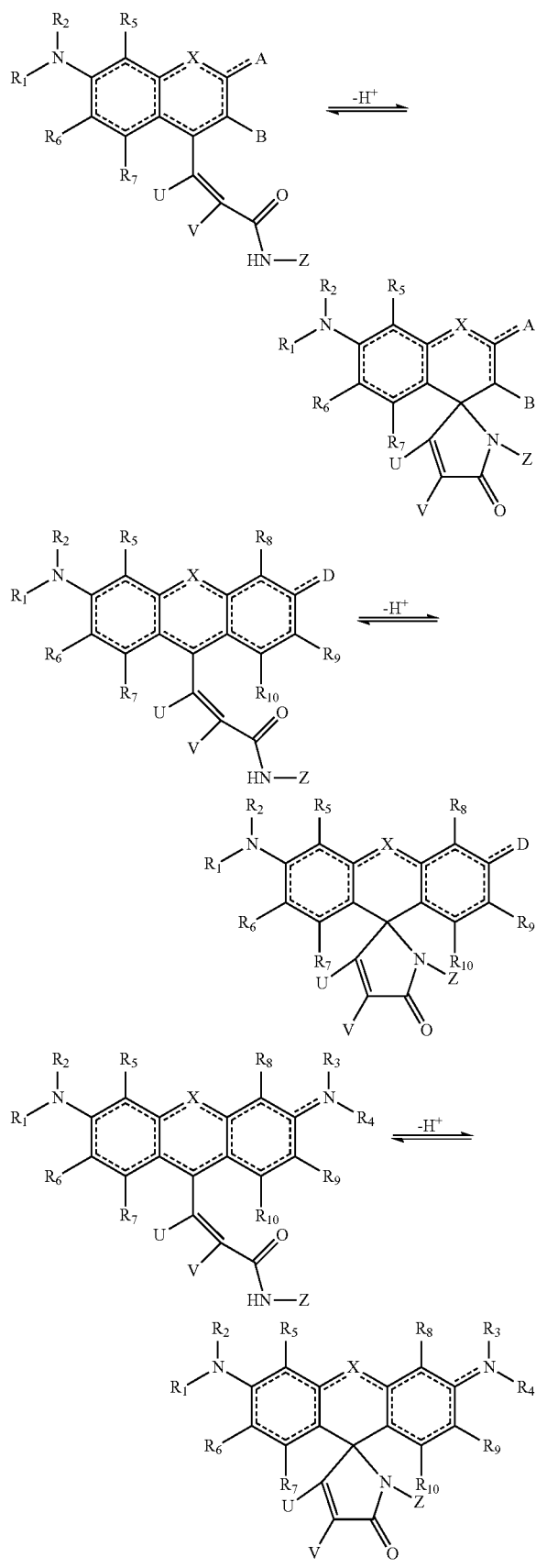

Scheme 1: General structure of fluorophores that form dynamic equilibria between open form and spirolactam. The structures are hierarchically ordered so that each structure also comprises those below.

X is an atom or moiety known to be compatible with fluorescence dye qualities of the molecule; non-limiting examples for such group are O (fluorescein or rhodamine), S, $SiR_2$ (silicorhodamine), $CR_2$ (carborhodamines), NR, and Se.

D is O or $NR^3R^4$.

A and B are moieties compatible with fluorescence of the scaffold in the open form; A and B can also form a 5- to 7-membered ring that is substituted with moieties conducive to fluorescence as specified in detail below.

Z is an electron-withdrawing group.

U and V may form, but are not limited to, a substituted or unsubstituted 5-7 membered ring, which optionally connects the molecule to a binding moiety M.

Terms and Definitions

The term $C_1$-$C_4$ alkyl in the context of the present specification signifies a saturated linear or branched hydrocarbon having 1, 2, 3 or 4 carbon atoms, wherein in certain embodiments one carbon-carbon bond may be unsaturated and one $CH_2$ moiety may be exchanged for oxygen, sulfur, selen (ether, thioether or selenoether bridge) or nitrogen (NH, or NR with R being methyl, ethyl, or propyl; amino bridge). Non-limiting examples for a $C_1$-$C_4$ alkyl are methyl, ethyl, propyl, prop-2-enyl, n-butyl, 2-methylpropyl, tert-butyl, but-3-enyl, prop-2-inyl and but-3-inyl. In certain embodiments, a $C_1$-$C_4$ alkyl is a methyl, ethyl, propyl or butyl moiety.

A $C_1$-$C_6$ alkyl in the context of the present specification signifies a saturated linear or branched hydrocarbon having 1, 2, 3, 4, 5 or 6 carbon atoms, wherein one carbon-carbon bond may be unsaturated and one $CH_2$ moiety may be exchanged for oxygen (ether bridge) or nitrogen (NH, or NR with R being methyl, ethyl, or propyl; amino bridge). Non-limiting examples for a $C_1$-$C_6$ alkyl include the examples given for $C_1$-$C_4$ alkyl above, and additionally 3-methylbut-2-enyl, 2-methylbut-3-enyl, 3-methylbut-3-enyl, n-pentyl, 2-methylbutyl, 3-methylbutyl, 1,1-dimethylpropyl, 1,2-dimethylpropyl, 1,2-dimethylpropyl, pent-4-inyl, 3-methyl-2-pentyl, and 4-methyl-2-pentyl. In certain embodiments, a $C_5$ alkyl is a pentyl or cyclopentyl moiety and a $C_6$ alkyl is a hexyl or cyclohexyl moiety.

The term unsubstituted $C_n$ alkyl when used herein in the narrowest sense relates to the moiety —$C_nH_{2n}$— if used as a bridge between moieties of the molecule, or —$C_nH_{2n+1}$ if used in the context of a terminal moiety. It may still contain fewer H atoms if a cyclical structure or one or more (non-aromatic) double bonds are present.

The term $C_n$ alkylene in the context of the present specification signifies a saturated linear or branched hydrocarbon comprising one or more double bonds. An unsubstituted alkylene consists of C and H only. A substituted alkylene may comprise substituents as defined herein for substituted alkyl.

The term $C_n$ alkylyne in the context of the present specification signifies a saturated linear or branched hydrocarbon comprising one or more triple bonds and may also comprise one or more double bonds in addition to the triple bond(s). An unsubstituted alkylyne consists of C and H only. A substituted alkylyne may comprise substituents as defined herein for substituted alkyl.

The terms unsubstituted $C_n$ alkyl and substituted $C_n$ alkyl include a linear alkyl comprising or being linked to a cyclical structure, for example a cyclopropane, cyclobutane, cyclopentane or cyclohexane moiety, unsubstituted or substituted depending on the annotation or the context of mention, having linear alkyl substitutions. The total number of carbon and—where appropriate—N, O or other hetero atoms in the linear chain or cyclical structure adds up to n.

The term cycloalkyl (substituted or non-substituted as further specified herein) relates to a ring structure constituted by an alkyl backbone. Cycloalkyl encompasses but is not limited to cyclopropane and substituted cyclopropane, cyclobutane and substituted cyclobutane, cyclopentane and substituted cyclopentane, cyclohexane and substituted cyclohexane. Cycloalkyl encompasses bicyclic structures such as [2.2.1] bicycloheptane (norbonane). If a nitrogen is defined as having two variable alkyl ligands, it is understood that the two alkyl ligands may form a cyclic or bicyclic structure including the nitrogen.

Where used in the context of chemical formulae, the following abbreviations may be used: Me is methyl $CH_3$, Et is ethyl —$CH_2CH_3$, Prop is propyl —$(CH_2)_2CH_3$ (n-propyl, n-pr) or —$CH(CH_3)_2$ (iso-propyl, i-pr), but is butyl —$C_4H_9$, —$(CH_2)_3CH_3$, —$CHCH_3CH_2CH_3$, —$CH_2CH(CH_3)_2$ or —$C(CH_3)_3$.

The term substituted alkyl in its broadest sense refers to an alkyl as defined above in the broadest sense that is covalently linked to an atom that is not carbon or hydrogen, particularly to an atom selected from N, O, F, B, Si, P, S, Se, Cl, Br and I, which itself may be—if applicable—linked to one or several other atoms of this group, or to hydrogen, or to an unsaturated or saturated hydrocarbon (alkyl or aryl in their broadest sense). In a narrower sense, substituted alkyl refers to an alkyl as defined above in the broadest sense that is substituted in one or several carbon atoms by groups selected from amine $NH_2$, alkylamine NHR, imide NH, alkylimide NR, amino(carboxyalkyl) NHCOR or NRCOR, hydroxyl OH, oxyalkyl OR, oxy(carboxyalkyl) OCOR, carbonyl O and its ketal or acetal $(OR)_2$, nitril CN, isonitril NC, cyanate CNO, isocyanate NCO, thiocyanate CNS, isothiocyanate NCS, fluoride F, chloride Cl, bromide Br, iodide I, phosphonate $PO_3H_2$, $PO_3R_2$, phosphate $OPO_3H_2$ and $OPO_3R_2$, sulfhydryl SH, sulfalkyl SR, sulfoxide SOR, sulfonyl $SO_2R$, sulfanylamide $SO_2NHR$, sulfate $SO_3H$ and sulfate ester $SO_3R$, wherein the R substituent as used in the current paragraph, different from other uses assigned to R in the body of the specification, is itself an unsubstituted or substituted $C_1$ to $C_{12}$ alkyl in its broadest sense, and in a narrower sense, R is methyl, ethyl or propyl unless otherwise specified.

The term amino substituted alkyl or hydroxyl substituted alkyl refers to an alkyl according to the above definition that is modified by one or several amine or hydroxyl groups $NH_2$, NHR, $NR_2$ or OH, wherein the R substituent as used in the current paragraph, different from other uses assigned to R in the body of the specification, is itself an unsubstituted or substituted $C_1$ to $C_{12}$ alkyl in its broadest sense, and in a narrower sense, R is methyl, ethyl or propyl unless otherwise specified. An alkyl having more than one carbon may comprise more than one amine or hydroxyl. Unless otherwise specified, the term "substituted alkyl" refers to alkyl in which each C is only substituted by at most one amine or hydroxyl group, in addition to bonds to the alkyl chain, terminal methyl, or hydrogen.

The term carboxyl substituted alkyl refers to an alkyl according to the above definition that is modified by one or several carboxyl groups COOH, or derivatives thereof, particularly carboxylamides $CONH_2$, CONHR and $CONR_2$, or carboxylic esters COOR, with R having the meaning as laid out in the preceding paragraph and different from other meanings assigned to R in the body of this specification.

The term sulfoxyl substituted alkyl refers to an alkyl according to the above definition that is modified by one or several sulfoxyl groups $R_2SO_2$, or derivatives thereof, with R having the meaning as laid out in the preceding paragraph and different from other meanings assigned to R in the body of this specification.

Non-limiting examples of amino-substituted alkyl include —$CH_2NH_2$, —$CH_2NHMe$, —$CH_2NHEt$, —$CH_2CH_2NH_2$, —$CH_2CH_2NHMe$, —$CH_2CH_2NHEt$, —$(CH_2)_3NH_2$, —$(CH_2)_3NHMe$, —$(CH_2)_3NHEt$, —$CH_2CH(NH_2)CH_3$, —$CH_2CH(NHMe)CH_3$, —$CH_2CH(NHEt)CH_3$, —$(CH_2)_3CH_2NH_2$, —$(CH_2)_3CH_2NHMe$, —$(CH_2)_3CH_2NHEt$, —$CH(CH_2NH_2)CH_2CH_3$, —$CH(CH_2NHMe)CH_2CH_3$, —$CH(CH_2NHEt)CH_2CH_3$, —$CH_2CH(CH_2NH_2)CH_3$, —$CH_2CH(CH_2NHMe)CH_3$, —$CH_2CH(CH_2NHEt)CH_3$, —$CH(NH_2)(CH_2)_2NH_2$, —$CH(NHMe)(CH_2)_2NHMe$, —$CH(NHEt)(CH_2)_2NHEt$, —$CH_2CH(NH_2)CH_2NH_2$, —$CH_2CH(NHMe)CH_2NHMe$, —$CH_2CH(NHEt)CH_2NHEt$, —$CH_2CH(NH_2)(CH_2)_2NH_2$, —$CH_2CH(NHMe)(CH_2)_2NHMe$, —$CH_2CH(NHEt)(CH_2)_2NHEt$, —$CH_2CH(CH_2NH_2)_2$, —$CH_2CH(CH_2NHMe)_2$ and —$CH_2CH(CH_2NHEt)_2$ for terminal moieties and —$CH_2CHNH_2$—, —$CH_2CHNHMe$-, —$CH_2CHNHEt$- for an amino substituted alkyl moiety bridging two other moieties.

Non-limiting examples of hydroxy-substituted alkyl include —$CH_2OH$, —$(CH_2)_2OH$, —$(CH_2)_3OH$, —$CH_2CH(OH)CH_3$, —$(CH_2)_4OH$, —$CH(CH_2OH)CH_2CH_3$, —$CH_2CH(CH_2OH)CH_3$, —$CH(OH)(CH_2)_2OH$, —$CH_2CH(OH)CH_2OH$, —$CH_2CH(OH)(CH_2)_2OH$ and —$CH_2CH(CH_2OH)_2$ for terminal moieties and —CHOH—, —$CH_2CHOH$—, —$CH_2CH(OH)CH_2$—, —$(CH_2)_2CHOHCH_2$—, —$CH(CH_2OH)CH_2CH_2$—, —$CH_2CH(CH_2OH)CH_2$—, —$CH(OH)(CH_2CHOH$—, —$CH_2CH(OH)CH_2OH$, —$CH_2CH(OH)(CH_2)_2OH$ and —$CH_2CHCH_2OHCHOH$— for a hydroxyl substituted alkyl moiety bridging two other moieties.

The term halogen-substituted alkyl refers to an alkyl according to the above definition that is modified by one or several halogen atoms selected (independently) from F, Cl, Br, I.

The term fluoro substituted alkyl refers to an alkyl according to the above definition that is modified by one or several fluoride groups F. Non-limiting examples of fluoro-substituted alkyl include —$CH_2F$, —$CHF_2$, —$CF_3$, —$(CH_2)_2F$, —$(CHF)_2H$, —$(CHF)_2F$, —$C_2F_5$, —$(CH_2)_3F$, —$(CHF)_3H$, —$(CHF)_3F$, —$C_3F_7$, —$(CH_2)_4F$, —$(CHF)_4H$, —$(CHF)_4F$ and —$C_4F_9$.

Non-limiting examples of hydroxyl- and fluoro-substituted alkyl include —$CHFCH_2OH$, —$CF_2CH_2OH$, —$(CHF)_2CH_2OH$, —$(CF_2)_2CH_2OH$, —$(CHF)_3CH_2OH$, —$(CF_2)_3CH_2OH$, —$(CH_2)_3OH$, —$CF_2CH(OH)CH_3$, —$CF_2CH(OH)CF_3$, —$CF(CH_2OH)CHFCH_3$, and —$CF(CH_2OH)CHFCF_3$.

The term aryl in the context of the present invention signifies a cyclic aromatic $C_5$-$C_{10}$ hydrocarbon that may comprise a heteroatom (e.g. N, O, S). Examples of aryl include, without being restricted to, phenyl and naphthyl, and any heteroaryl. A heteroaryl is an aryl that comprises one or several nitrogen, oxygen and/or sulphur atoms. Examples for heteroaryl include, without being restricted to, pyrrole, thiophene, furan, imidazole, pyrazole, thiazole, oxazole, pyridine, pyrimidine, thiazin, quinoline, benzofuran and indole. An aryl or a heteroaryl in the context of the invention additionally may be substituted by one or more alkyl groups.

An aryl methylene in the context of the present invention signifies a $CH_2$ (-methylene) group substituted by an aryl moiety. One non-limiting example of aryl methylene is a benzyl (Bn) group. If used in particular, a heteroaryl methylene in the context of the present invention signifies a $CH_2$ (-methylene) group substituted by a heteroaryl moiety.

The term alkylaryl refers to an alkyl having at least one aryl substituent. One non-limiting example for an alkylaryl is a benzyl (phenylmethyl); others are 1-phenylethyl and 2-phenylethyl.

The term carbocycle refers to a cycloalkyl or an aryl.

The term heterocycle refers to a heteroaryl or a cycloalkyl that comprises an atom that is not carbon or hydrogen, particularly an atom selected from N, O, F, B, Si, P, S, Se, Cl, Br and I.

The term ring or ring system refers to any carbocycle or heterocycle if not specified further.

"Nucleotides" in the context of the present invention are nucleic acid or nucleic acid analogue building blocks, oligomers of which are capable of forming selective hybrids with RNA oligomers on the basis of base pairing. The term nucleotides in this context includes the classic ribonucleotide building blocks adenosine, guanosine, uridine (and ribosylthymin), cytidine, the classic deoxyribonucleotides deoxyadenosine, deoxyguanosine, thymidine, deoxyuridine and deoxycytidine. It further includes analogues of nucleic acids such as phosphotioates, 2'O-methylphosphothioates, peptide nucleic acids (PNA; N-(2-aminoethyl)-glycine units linked by peptide linkage, with the nucleobase attached to the alpha-carbon of the glycine) or locked nucleic acids (LNA; 2'O, 4'C methylene bridged RNA building blocks). The hybridizing sequence may be composed of any of the above nucleotides, or mixtures thereof.

In the following, the molecules of the invention are discussed in detail. Where ionizable moieties are disclosed, it is understood that any salt, particularly any pharmaceutically acceptable salt of such molecule is encompassed by the invention. The salt comprises the ionized molecule of the invention and an oppositely charged counterion. Non-limiting examples of anionic salt forms include acetate, benzoate, besylate, bitartrate, bromide, carbonate, chloride, citrate, edetate, edisylate, embonate, estolate, fumarate, gluceptate, gluconate, hydrobromide, hydrochloride, iodide, lactate, lactobionate, malate, maleate, mandelate, mesylate, methyl bromide, methyl sulfate, mucate, napsylate, nitrate, pamoate, phosphate, diphosphate, salicylate, disalicylate, stearate, succinate, sulfate, tartrate, tosylate, triethiodide and valerate. Non-limiting examples of cationic salt forms include aluminium, benzathine, calcium, ethylene diamine, lysine, magnesium, meglumine, potassium, procaine, sodium, tromethamine and zinc.

It is understood that any position wherein H is present can be substituted by D.

DETAILED DESCRIPTION OF THE INVENTION

A first aspect of the invention relates to compound of the general formula (10) or the general formula (10'), or the general formula (10"), which is a resonance variant of (10) for certain substituents:

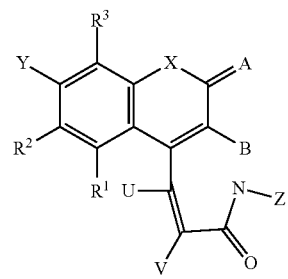

(10)

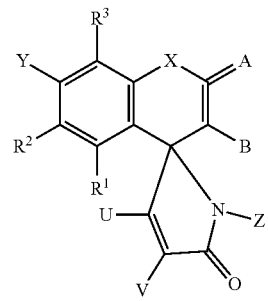

(10')

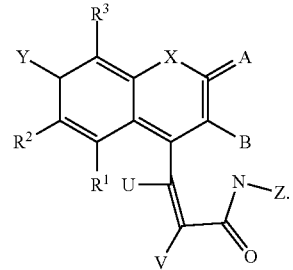

(10")

It is understood that the nitrogen in formula (10) and (10") is bound to a hydrogen, although not explicitly shown to improve the clarity of the formulas. This practice is followed in most formulas herein.

$R^1$ is selected from H and F. In certain embodiments, $R^1$ is H.

$R^2$ and $R^3$ independently of each other can be any moiety. The skilled person is aware that these positions are highly variable. If the molecule of the invention is to be connected to, for example, a tag or selective targeting moiety, these positions offer themselves to this function, as derivatization by an alkyl linker will not greatly affect optical properties. In certain embodiments, $R^2$ and $R^3$ are independently selected from H, substituted or unsubstituted $C_1$ to $C_4$ alkyl optionally forming a bridge to the substituent designated Y, and a moiety having a molecular weight between 15 and 250 u (g/mol). In certain embodiments, one of $R^2$ and $R^3$, or both, form a ring structure linking the "left" phenyl ring to the substituent Y (see below). For compounds having a symmetric structure (A and B forming another phenyl ring), the same may apply for moieties $R^4$ and/or $R^5$ (see below).

X is selected from O, S, Se, TeO, $POR^X$, $POOR^X$, $SO_2$, $NR^X$, $CR^X_2$, $SiR^X_2$, $GeR^X_2$, and $SnR^X_2$. The ring including X is a 6-membered ring; $R^X$ is not part of the ring, nor is any oxygen attached to a heteroatom (selected from Te, P, S) part of the ring, as exemplary shown for X being $SiR^X_2$:

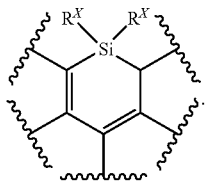

(90)

Each $R^X$ is independently selected from H and an unsubstituted or substituted moiety selected from $C_1$-$C_{12}$ alkyl, $C_3$-$C_8$ cycloalkyl, $C_2$-$C_{12}$ alkenyl, $C_2$-$C_{12}$ alkynyl, $C_7$-$C_{12}$ alkylaryl, phenyl and a 5- or 6-membered ring heteroaryl. In certain embodiments, the moiety is hydroxy-, amino-, halogen-, and/or carboxy-substituted. Alternatively, two $R^X$ moieties form a four-, five-, six- or seven-membered unsubstituted or amino-, hydroxy- and/or halogen substituted alkyl ring.

Y is OH or $NR^{Y1}R^{Y2}$. $R^{Y1}$ and $R^{Y2}$ are each independently selected from H, unsubstituted or hydroxy-, amino-, halogen-, and/or carboxy-substituted $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, $COOR^{YC}$, $CONR^{YC}_2$. $R^{YC}$ is selected from H and unsubstituted or amino- or hydroxy-substituted $C_1$-$C_8$ alkyl. Alternatively, $R^{Y1}$ and $R^{Y2}$ together are a $C_3$-$C_6$ unsubstituted or hydroxy-, amino-, halogen-, alkoxy- and/or carboxy-substituted alkyl forming a 4-7-membered ring structure with Y. Such ring may be bicyclic, one example being a [2.2.1] bicycloheptyl ring with one carbon being substituted by the Y nitrogen. Alternatively, at least one $R^{Y1}$ and $R^{Y2}$ together with $R^2$ and/or $R^3$, respectively, form an unsubstituted or hydroxy-, amino-, halogen-, carboxy- and/or aryl-substituted 4-7-membered alkyl or alkylene ring.

A and B together with the atoms they are covalently coupled to form a phenyl or 5- or 6-membered heteroaryl ring structure, wherein the ring structure is unsubstituted or substituted by one of $NR^{N1}R^{N2}$— and OH and further optionally by $R^4$, $R^5$ and/or $R^6$. $R^{N1}$ and $R^{N2}$ independently of $R^{Y1}$ and $R^{Y2}$ have the same meanings as $R^{Y1}$ and $R^{Y2}$ above. $R^4$ independently of $R^3$ has the same meaning as $R^3$ above, $R^5$ independently of $R^1$ has the same meaning as $R^1$ above, and $R^6$ independently of $R^2$ has the same meaning as $R^2$ above.

In certain embodiments, A and B are a moiety of the general formula (50):

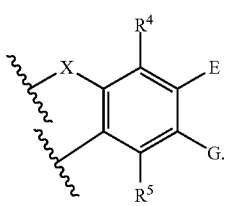

(50)

$R^4$ and G are selected from H, substituted or unsubstituted $C_1$ to $C_4$ alkyl optionally forming a bridge to the substituent designated E, and a moiety having a molecular weight between 15 and 250 u (g/mol).

$R^5$ is selected from H and F. In certain embodiments, $R^5$ is H.

E is OH or $NR^{EG1}R^{EG2}$. $R^{EG1}$ and $R^{EG2}$ have the same meanings as $R^{Y1}$ and $R^{Y2}$ above, respectively, wherein optionally one of $R^{EG1}$ and $R^{EG2}$, or both $R^{EG1}$ and $R^{EG2}$, together with $R^4$ and/or G, respectively, form an unsubstituted or hydroxy-, amino-, halogen-, and/or carboxy-substituted 4-7-membered alkyl ring.

Alternatively, A is an unsubstituted or hydroxy-, amino-, halogen-, and/or carboxy-substituted conjugated carbocycle or heterocycle having one, two or three rings. In certain embodiments, A is an aromatic or heteroaromatic ring system, particularly a benzpyranoyl, more particularly a substituted or unsubstituted coumarin. In certain embodiments, A is selected from an unsubstituted or hydroxy-, amino-, halogen-, and/or carboxy-substituted aryl, and heteroaryl. In certain embodiments, A is a substituted (particularly hydroxy-, amino-, halogen-, and/or carboxy-substituted) coumarin (a 1-benzpyran-2-onyl moiety linked at position 3 of the coumarin ring). In certain embodiments, 3-benzpyran-2-only is hydroxy-, amino-, halogen-, and/or carboxy-substituted. B is selected from H, D, F and a moiety having a molecular weight between 15 and 250 u (g/mol).

U and V together with the atoms they are covalently coupled to form an unsubstituted or substituted 5-7 membered ring. The substitution is selected from one or several substituents independently selected from OH, SH, amine (particularly $NR^{UV}_2$), halogen, CN, NC, CNO, NCO, CNS, NCS, unsubstituted $C_1$-$C_4$ O-alkyl, $C_1$-$C_4$ S-alkyl, O-aryl, S-aryl, $NO_2$, CHO, $CONR^{UV}_2$, $COOR^{UV}$, COO-aryl, COO-alkylaryl (particularly benzyl), $PO_3H$, $PO_3R^{UV}$, $SO_3H$, $SO_3R^{UV}$ and $SO_2R^{UV}$. $R^{UV}$ is selected from H, and $C_1$-$C_4$ unsubstituted alkyl. In certain embodiments, the 5-7 membered ring is selected from cycloalkyl, aryl, and heteroaryl.

In certain embodiments, U and V form an unsubstituted or substituted 5-membered heteroaryl or phenyl.

Alternatively, U is selected from H, D and F and V is selected from H, D, F, and $C_1$ to $C_4$ unsubstituted or amino-, hydroxy- or halogen substituted alkyl.

Z is selected from CN, CHO, $COR^Z$, $COOR^Z$, and $CONR^Z_2$. Each $R^Z$ is independently selected from H, unsubstituted or hydroxy-, amino-, halogen-, and/or carboxy-substituted $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, $COOR^C$, $CONR^C_2$. $R^C$ is selected from H, $C_1$-$C_8$ alkyl. In certain embodiments, $R^Z$ is selected from H, unsubstituted $C_1$-$C_4$ alkyl, and alkylaryl (particularly benzyl).

Alternatively, Z is $SO_2R^S$. $R^S$ is selected from $NH_2$, $NHR^{SN}$, $NR^{SN}_2$. Each $R^{SN}$ is independently selected from an unsubstituted or hydroxy-, amino-, halogen-, and/or carboxy-substituted moiety selected from $C_1$-$C_8$ alkyl, $C_3$-$C_8$ cycloalkyl, $C_1$-$C_4$ acyl, $C_7$-$C_{12}$ alkylaryl, or from unsubstituted phenyl or phenyl substituted by any one or several of the following substituents: unsubstituted $C_1$-$C_4$ alkyl, halogen, O—$C_1$-$C_4$ alkyl, COOH, $COOR^C$, $CONR^C_2$, with $R^C$ being selected from H and $C_1$-$C_8$ alkyl. Alternatively, $R^S$ is selected from unsubstituted or hydroxy-, amino-, halogen-, and/or carboxy-substituted $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, $COOR^{SC}$, $CONR^{SC}_2$, with $R^{SC}$ being selected from H and $C_1$-$C_8$ alkyl. In certain embodiments, $R^{SC}$ is unsubstituted or fluorinated alkyl.

Alternatively, $R^S$ is $OR^{SO}$. $R^{SO}$ is selected from an unsubstituted or hydroxy-, amino-, halogen-, and/or carboxy-substituted moiety selected from $C_1$-$C_8$ alkyl, $C_3$-$C_8$ cycloalkyl, $C_1$-$C_4$ acyl, $C_7$-$C_{12}$ alkylaryl, or from unsubstituted phenyl or phenyl substituted by any one or several of the following substituents: unsubstituted $C_1$-$C_4$ alkyl, halogen, O—$C_1$-$C_4$ alkyl, COOH, COOR$^C$, CONR$^C_2$, with R$^C$ being selected from H and $C_1$-$C_8$ alkyl.

Alternatively, Z is selected from CH$_2$R$^F$, CHR$^F_2$, and CR$^F_3$, with R$^F$ selected from CH$_2$F, CHF$_2$, CF$_3$, CH$_2$Cl, and CHCl$_2$, CCl$_3$. In certain embodiments, R$^F$ is CF$_3$.

Alternatively, Z is H.

Alternatively, Z is selected from CH$_2$COOR$^{K1}$ or CH$_2$CONHR$^{K1}$ with R$^{K1}$ selected from H, and unsubstituted or halogen-substituted $C_1$ to $C_4$ alkyl.

The following combinations are disclaimed with regard to protection to the compound per se, but are claimed with regard to their use in the labelling or staining of biological probes:

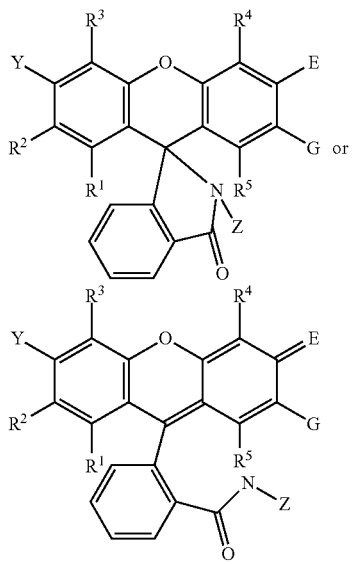

with
R$^1$, R$^2$, R$^3$, R$^4$, R$^5$ and G are H, and
  Y and E are NEt$_2$ and
    Z is CONH$_2$ or
    Z is CONHC$_6$H$_5$; or
    Z is CN or
    Z is selected from CH$_2$CF$_3$, CH$_2$CHF$_2$, and CH$_2$CH$_2$F, or
    Z is selected from CH$_2$COOCH$_3$ and CH$_2$COOH,
    Z is H,
or
  Y and E are NMe$_2$ and Z is selected from CH$_2$COOCH$_3$ and CH$_2$COOH or
  Y and E are NH$_2$ and Z is selected from CH$_2$COOH and CH$_2$COOCH$_3$
or
  Y is OH and E is =O (for formula 10) or E is OH (for formula 10'), and Z is C(=O)(CH$_3$)C$_6$H$_5$;
or
  R$^1$, R$^3$, R$^4$, and R$^5$ are H, R$^2$ and G are methyl, Y and E are NHEt and Z is CH$_2$COOH or CH$_2$COOCH$_3$ or the compound is of formula (301), (302), (303), or (304)

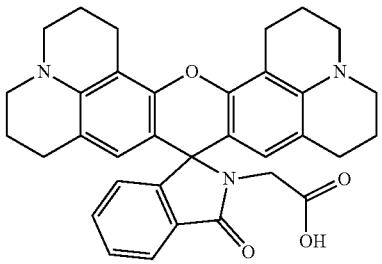

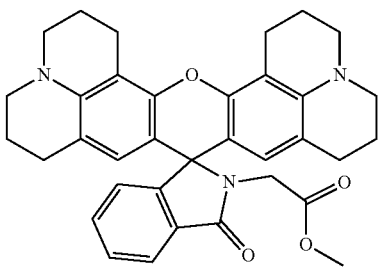

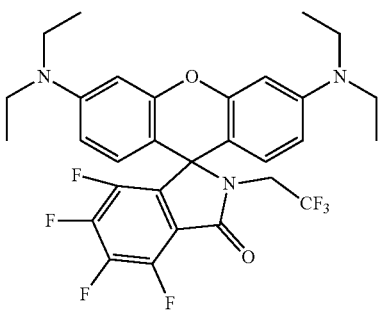

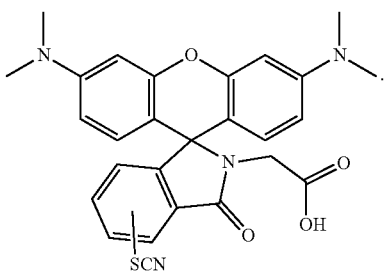

Optionally, the compound is covalently linked to a binding moiety M. In certain embodiments, the compound is linked through any one of substituents A, B, R$^2$, R$^3$, R$^4$, R$^{EG1}$, R$^{EG2}$, R$^{EG}$, G, R$^X$, R$^{Y1}$, R$^{Y2}$, R$^Y$, U, V, R$^Z$, R$^{Ph}$, R$^S$. M is a targeting or tagging moiety that allows the core dye compound to be selectively attached to biomolecules or certain target structures.

The Binding Moiety M

M may be a moiety selectively attachable by covalent or quasi-covalent bond to a protein or nucleic acid under conditions prevailing in cell culture or inside of a living cell. In certain embodiments, M is a moiety able to form an ester bond, an ether bond, an amide bond, a disulfide bond, a Schiff base, or react in a click-chemistry reaction. In certain embodiments, M is a moiety selected from —COCHCH$_2$, —CO—NHS, biotin, an azide or ethyne moiety, a tetrazine moiety, a (bicyclo[6.1.0]nonyne) moiety, a cyclooctyne moiety, a transcyclooctene moiety and a maleimide.

M may alternatively be a moiety employed for specific protein labelling. Examples are known in the art, they include but are not limited to the SNAP-tag, CLIP-tag and Halo-tag ligands. One example is a substrate of an $O^6$-alkylguanine-DNA-alkyltransferase or a functional variant thereof. In certain embodiments, M is a 6-[(4-methylenephenyl)methoxy]-9H-purin-2-amine moiety of formula (71), or a pyrimidine derivative thereof, particularly a moiety of formula (72), or a moiety of formula (73),

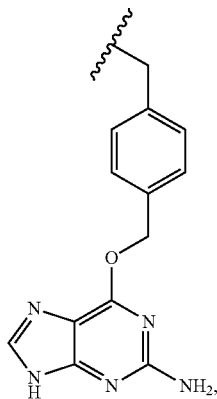

(71)

(72)

(73)

M may also be a substrate of a haloalkane halotransferase, particularly a 1-chlorohexyl moiety as exemplarily shown below;

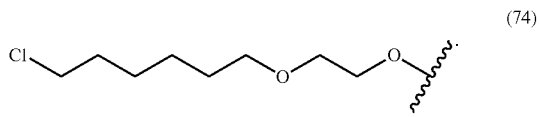

(74)

M may alternatively be a substrate of dihydrofolate reductase, particularly the moiety:

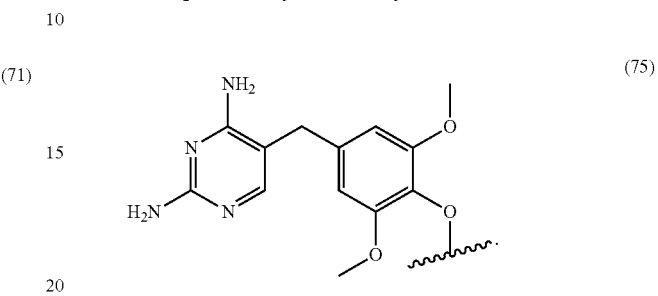

(75)

If M is selected to function as a targeting moiety for biomolecules, a particularly advantageous approach is to covalently link the dye to a drug or drug-like small molecule with high specificity for a particular protein, nucleic acid or other complex biological structure. Thus, in certain embodiments, M is a moiety capable of selectively interacting non-covalently with a biomolecule (particularly a protein or nucleic acid) under conditions prevailing in a live cell, wherein said moiety and said biomolecule form a complex having a dissociation constant $K_D$ of $10^{-4}$ mol/l or less. In certain embodiments, M has a molecular mass of more than 160 u but less than 1000 u, particularly less than 700 u, more particularly less than 500 u, and M comprises up to five hydrogen bond donators, up to ten hydrogen bond acceptors and is characterized by an octanol-water partition coefficient logP of below 5.6 (any of these characteristics applied to the isolated M moiety, without regard to the rest of compound). These are the so-called "Lipinski" rules of 5 (originally, referring to molecules between 160 and 500 u) for drug-like compounds. M can be any licensed medicinal or veterinary drug or a drug candidate for which affinity data for a particular biomolecule are known. In certain embodiments, M is selected from taxol, jasplaklinolide, a bis-benzimide DNA stain, pepstatin A and triphenylphosphonium.

In certain particular embodiments, M is an oligonucleotide having a sequence length of 10 to 40 nucleotides capable of sequence specifically forming a hybrid with a DNA or RNA sequence, particularly inside a human, animal, plant or bacterial cell.

In certain embodiments, M is a lipid. In certain embodiments, the lipid is selected from a ceramide derivative, a glyceride, or a fatty acid.

In certain embodiments, the compound is connected to said binding moiety M through a covalent bond or a linker moiety L consisting of 1 to 50 atoms and having an atomic weight of 12 or higher. In certain embodiments, L is a moiety described by a formula $-L^{41}{}_n-L^{J1}{}_n{}'-L^{42}{}_m-L^{J2}{}_m{}'-L^{43}{}_p-L^{J3}{}_p{}'-L^{44}{}_q-L^{J4}{}_q{}'-$.

In certain embodiments, $L^{41}$, $L^{42}$, $L^{43}$ and $L^{44}$ independently of each other are selected from $C_1$ to $C_{12}$ unsubstituted or amino-, hydroxyl-, carboxyl- or fluoro-substituted alkyl or cycloalkyl, $(CH_2-CH_2-O)_r$ or $(CH_2-CH(OH)-CH_2-O)_r$ with r being an integer from 1 to 20, alkylaryl, alkylaryl-alkyl, and unsubstituted or alkyl-, halogen-, amino-, alkylamino-, imido-, nitro-, hydroxyl- oxyalkyl-, carbonyl-, carboxyl-, sulfuryl- and/or sulfoxyl substituted aryl or heteroaryl.

In certain embodiments, $L^{J1}$, $L^{J2}$, $L^{J3}$ and $L^{J4}$ independently of each other are selected from —$NR^{N5}$C(O)—, —C(O)N($R^{N5}$)—, —CN—, —NC—, —CO—, —OC(O)—, —C(O)O—, —$NR^{N5}$—, —O—, —P(OOH)—, —OP(OOH)—, —P(OOH)O—, —OP(OOH)O—, —OP(OOH)O—, —S—, —SO—, $SO_2$—. $R^{N5}$ is selected from H and unsubstituted or amino-, hydroxyl-, carboxyl or fluoro substituted $C_1$ to $C_6$ alkyl. In certain embodiments, $R^{N5}$ is selected from H and unsubstituted $C_1$ to $C_3$ alkyl. n, n', m, m', p, p', q, q' and s independently from each other are selected from 0 and 1.

In certain embodiments, L is -$L^{A1}$-$L^{J1}$-$L^{A2}_m$-$L^{J2}_{m'}$-$L^{A3}_p$, wherein
$L^{A1}$, $L^{A2}$ and $L^{A3}$ are independently selected from $C_1$ to $C_6$ unsubstituted, amino-, hydroxyl-, carboxyl- or fluoro substituted alkyl or cycloalkyl, and ($CH_2$—$CH_2$—O)$_r$ or ($CH_2$—CH(OH)—$CH_2$—O)$_r$ with r being an integer from 1 to 4, and
$L^{J1}$ and $L^{J2}$ are selected independently from —$NR^{N5}$C(O)—, —C(O)N($R^{N5}$)—, —CN—, —NC—, —CO—, —OC(O)—, —C(O)O—, $NR^{N5}$—, —O—, and —S—, and m, m' and p independently from each other are selected from 0 and 1.

In certain embodiments, the compound is connected to said binding moiety M through one of substituents A, $R^2$, $R^3$, $R^4$, G, or a phenyl moiety formed by U and V.

In certain embodiments, any one of substituents $R^2$, $R^3$, $R^4$, G and $R^X$ independently of any other is selected from H and unsubstituted or fluoro-, amino-, hydroxyl-, $SO_3H$— and/or carboxyl substituted $C_1$ to $C_4$ alkyl, $C_1$ to $C_4$ alkenyl or $C_1$ to $C_4$ alkynyl, wherein optionally one of $R^2$, $R^3$, $R^4$, G and $R^X$ is linked to a moiety M as defined in the first aspect and wherein M is linked to the compound by a moiety L as defined in the first aspect.

In certain embodiments, one or several of $R^1$, $R^2$, $R^3$, $R^4$, $R^5$, and/or G are D (deuterium) or deuterated alkyl. In certain embodiments, one or several of $R^{N1}$, $R^{N2}$, $R^{EG1}$, $R^{EG2}$ and $R^O$ are D (deuterium) or a deuterated alkyl. Deuteration, particularly in the indicated positions, can increase photostability of the molecule.

In certain embodiments, A is a moiety of the general formula (60) or (60'):

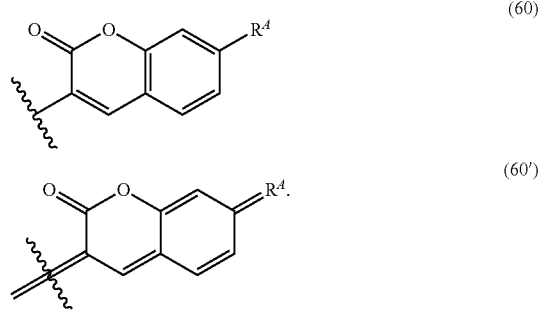

$R^A$ is selected from H, OH, $NR^{Y1}R^{Y2}$, with $R^{Y1}$, and $R^{Y2}$ as defined above, or one of $R^{Y1}$, and $R^{Y2}$, or $R^A$ itself, is L-M, with L as defined above, and M as defined above.

In certain embodiments, B is selected from H, D and F.

In certain embodiments, Z is selected from CN and $CONR^Z_2$. In certain embodiments, $R^Z$ is selected from H, unsubstituted $C_1$-$C_4$ alkyl and alkylaryl (particularly benzyl).

In certain embodiments, Z is selected from $SO_2R^S$. In certain embodiments, $R^S$ is selected from $NR^{SN}_2$ and unsubstituted or perfluorinated alkyl. In certain embodiments, $R^{SN}$ is independently selected from H, unsubstituted or hydroxy-, amino-, halogen-, and/or carboxy-substituted $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, $COOR^C$, $CONR^C_2$, with $R^C$ being selected from H and $C_1$-$C_8$ alkyl.

In certain embodiments, U and V form an unsubstituted or substituted phenyl, wherein one or several substituents are independently selected from OH, SH, amine [particularly $NR^{UV}_2$], halogen, CN, NC, CNO, NCO, CNS, NCS, unsubstituted $C_1$-$C_4$ O-alkyl, $C_1$-$C_4$ S-alkyl, O-aryl, S-aryl, $NO_2$, CHO, $CONR^{UV}_2$, $COOR^{UV}$, COO-aryl, COO-alkylaryl (particularly benzyl), $PO_3H$, $PO_3R^{UV}$, $SO_3H$, $SO_3R^{UV}$ and $SO_2R^{UV}$, with $R^{UV}$ being selected from H, and $C_1$-$C_4$ unsubstituted alkyl. In certain embodiments, U and V form a phenyl substituted with a moiety L-M, wherein M and L have the meanings as specified above.

In certain embodiments, each $R^X$ is independently selected from unsubstituted or hydroxyl-, amino- or halogen-substituted $C_1$ to $C_4$ alkyl, $C_2$ to $C_4$ alkenyl or $C_2$ to $C_4$ alkynyl, unsubstituted or hydroxyl-, amino- or halogen-substituted $C_4$ to $C_6$ cycloalkyl and unsubstituted or hydroxyl-, alkyoxy-, amino- or halogen-substituted phenyl. In certain embodiments, $R^X$ is selected from methyl, ethyl, n-propyl, isopropyl, n-butyl, isobutyl, tert-butyl, and phenyl. In certain embodiments, both $R^X$ are the same for X selected from C, Si, Ge, and Sn.

In certain embodiments, Y is $NR^{Y1}R^{Y2}$ and E is $NR^{EG1}R^{EG2}$.

In certain embodiments, $R^{Y1}$ and $R^{Y2}$, and/or $R^{EG1}$ and $R^{EG2}$, are independently selected from H, unsubstituted and amino-, hydroxy-, carboxy- and/or fluoro-substituted $C_1$-$C_6$ alkyl, $C_1$-$C_4$ acyl, and $C_3$-$C_6$ cycloalkyl. In certain embodiments, $R^{Y1}$ and $R^{Y2}$, and/or $R^{EG1}$ and $R^{EG2}$, are independently selected from H, methyl, ethyl, n-propyl, isopropyl, n-butyl, isobutyl, tert-butyl and $CH_2CF_3$.

In certain embodiments, $R^{Y1}$ together with $R^{Y2}$, and/or $R^{EG1}$ together with $R^{EG2}$ form a ring including Y or E, respectively, and are an unsubstituted or alkyl-, amino-, hydroxy-, carboxy- and/or fluoro-substituted $C_3$-$C_6$ alkyl, particularly —$(CH_2)_3$—, —$(CH_2)_4$—, —$(CH_2)_5$—, —$(CH_2)_2O(CH_2)_2$— or —$(CH_2)_2NR^{NN}(CH_2)_2$— with $R^{NN}$ being selected from H and unsubstituted $C_1$ to $C_4$ alkyl.

In certain embodiments, $R^{Y1}$ and/or $R^{EG1}$ are independently selected from H, unsubstituted and alkyl- (particularly methyl-), amino-, hydroxy-, carboxy- and/or fluoro-substituted $C_1$-$C_6$ alkyl, $C_1$-$C_4$ acyl, and $C_3$-$C_6$ cycloalkyl, and $R^{Y2}$ together with $R^2$ or $R^3$, and/or $R^{EG2}$ together with G or $R^4$, is an alkyl or heteroalkyl bridge selected from —$(CH_2)_2$—, —$(CH_2)_3$—, —$CH_2CH=CH$— or —$(CH_2)_4$— or —$CH_2$—O—, —$CH_2$—$NR^5$—, —$CH_2$—S—, —$CH_2$—Se—, —$(CH_2)_2O$—, —$(CH_2)_2NR^N$—, —$(CH_2)_2S$—, —$(CH_2)_2Se$—, —$CH_2$—O—$CH_2$—, —$CH_2NR^5$—, —$CH_2S$—$CH_2$—, —$CH_2$—Se—$CH_2$—, —$CH_2$-(1,2)phenyl-, and a mono- or dimethyl substituted derivative of any one of the foregoing alkyl or heteroalkyl bridge moieties.

In certain embodiments, $R^{Y1}$ and/or $R^{EG1}$ are independently selected from H, unsubstituted and alkyl- (particularly methyl-), amino-, hydroxy-, carboxy- and/or fluoro-substituted $C_1$-$C_6$ alkyl, $C_1$-$C_4$ acyl, and $C_3$-$C_6$ cycloalkyl, and $R^{Y2}$ together with $R^2$, and/or $R^{EG2}$ together with G, form a cyclic structure according to any one of substructures (41) to (44) or (51) to (54):

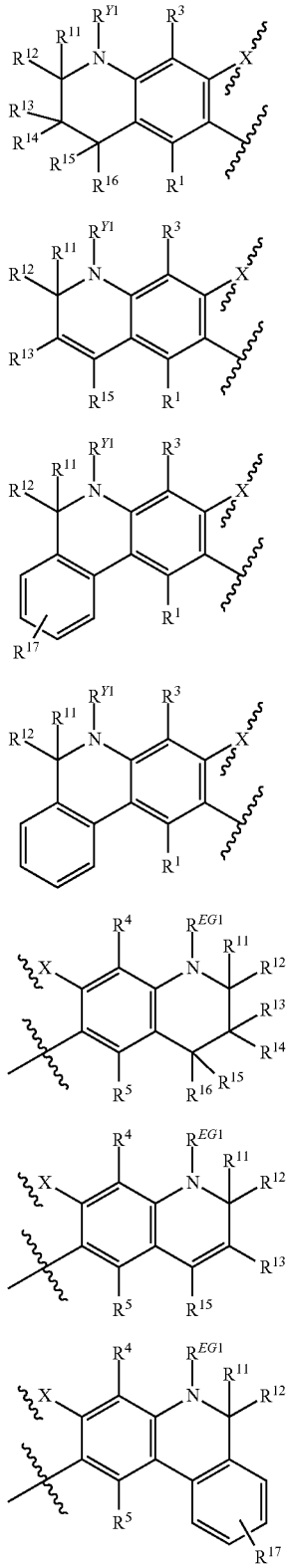

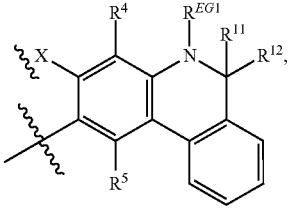

Herein, $R^{11}$, $R^{12}$, $R^{13}$, $R^{14}$, $R^{15}$ and $R^{16}$ are selected from H, unsubstituted or hydroxyl-, amino-, carboxyl-, sulfoxyl- or halogen-substituted $C_1$ to $C_4$ alkyl, halogen, $SO_3R'$, $COOR'$, $CONR'_2$ with $R'$ selected from H and unsubstituted $C_1$ to $C_4$ alkyl and $R^{17}$ is selected from H unsubstituted or hydroxyl-, amino-, carboxyl-, sulfoxyl- or halogen-substituted $C_1$ to $C_4$ alkyl, halogen, $NO_2$, CN, $SO_3R'$, $COOR'$, $CONR'_2$ with $R'$ selected from H and unsubstituted $C_1$ to $C_4$ alkyl. In certain embodiments, $R^{11}$, $R^{12}$, $R^{13}$, $R^{14}$, $R^{15}$ and $R^{16}$ are selected from H, methyl, $CH_2$—$SO_3H$, Cl and F. In certain embodiments, $R^1$ and $R^3$ can have any of the meanings given herein.

In certain embodiments, $R^{Y1}$ together with $R^3$, and $R^{Y2}$ together with $R^2$, and/or $R^{EG1}$ together with $R^4$, and $R^{EG2}$ together with G, form a bi-cyclic structure according to any one of substructures (45) to (47) or (55) to (57):

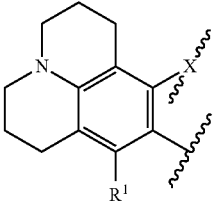

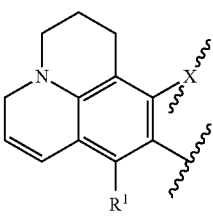

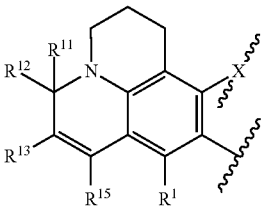

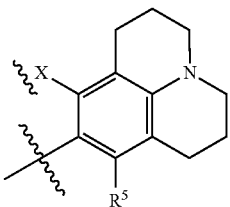

-continued (56)

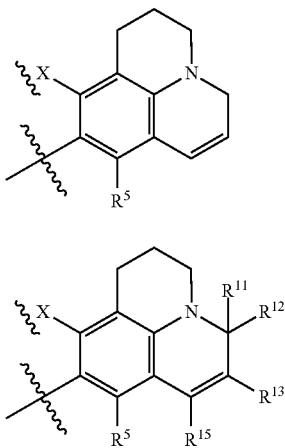

(57)

Herein, $R^{11}$, $R^{12}$, $R^{13}$, and $R^{15}$ are selected from H, unsubstituted or hydroxyl-, amino-, carboxyl-, sulfoxyl- or halogen-substituted $C_1$ to $C_4$ alkyl, halogen, $SO_3R'$, $COOR'$, $CONR'_2$ with $R'$ selected from H and unsubstituted $C_1$ to $C_4$ alkyl. In certain embodiments, $R^{11}$, $R^{12}$, $R^{13}$, and $R^{15}$ are selected from H, methyl, $CH_2$—$SO_3H$, Cl and F. In certain embodiments, $R^1$ and $R^3$ can have any of the meanings given herein; or In certain embodiments, $R^{Y2}$ and/or $R^{EG2}$ are independently selected from H, unsubstituted and alkyl- (particularly methyl-), amino-, hydroxy-, carboxy- and/or fluoro-substituted $C_1$-$C_6$ alkyl, $C_1$-$C_4$ acyl, and $C_3$-$C_6$ cycloalkyl, and $R^{Y1}$ together with $R^3$, and/or $R^{EG1}$ together with $R^4$, form a cyclic structure according to any one of substructures (48) to (49) or (58) to (59):

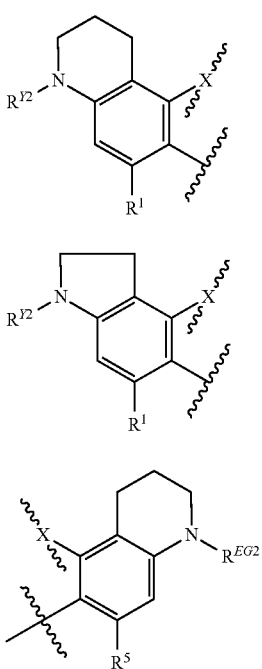

(48)

(49)

(58)

-continued

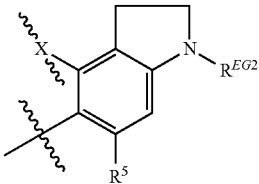

(59)

Herein, $R^1$ and $R^3$ can have any of the meanings given herein.

In certain embodiments, $R^{Y1}$ together with $R^{Y2}$, and/or $R^{EG1}$ together with $R^{EG2}$ are —$(CH_2)_3$—, —$CH_2CHFCH_2$—, —$CH_2CF_2CH_2$—, —$CH_2CH(CH_3)CH_2$—, —$CH_2C(CH_3)_2CH_2$—, $CH_2CH(CN)CH_2$—, $CH_2CH(COOH)CH_2$—, $CH_2CH(CH_2COOH)CH_2$—, —$CH_2CH(OCH_3)CH_2$— and —$CH_2CH(N(CH_3)_2)CH_2$—, particularly wherein the substituent is the same for $R^{Y1}$ with $R^{Y2}$, and $R^{EG1}$ with $R^{EG2}$.

Electron-Rich Ring Structures Combined with Z as $CH_2R^F$, $CH_2COOR^{K1}$ or Related Structures:

With electron-rich ring structures such as exemplified by derivatives of rhodamine X (non-limiting examples of ring constitution are substructures 42 to 59), certain combinations of Z have proven particularly useful:

In certain embodiments, $R^{Y1}$ together with $R^3$, and $R^{Y2}$ together with $R^2$, and/or $R^{EG1}$ together with $R^4$, and $R^{EG2}$ together with G, form a bi-cyclic structure according to any one of substructures (45) to (47) or (55) to (57), and Z is selected from $CH_2R^F$, $CHR^F_2$, $CR^F_3$, H, $CH_2COOR^{K1}$ and $CH_2CONHR^{K1}$ with $R^F$ selected from $CH_2F$, $CHF_2$, $CF_3$, $CH_2Cl$, and $CHCl_2$, $CCl_3$, and with $R^{K1}$ selected from H, and unsubstituted or halogen-substituted $C_1$ to $C_4$ alkyl. In certain embodiments, X is O. In certain embodiments, $R^F$ is $CF_3$.

Blinking Probes: Lean $R^N$ Combined with Z as $CH_2R^F$, $CH_2COOR^{K1}$ or Related Moieties Less electron-rich ring structures such as may be constituted by those having short alkyl ligands on the nitrogen, the above mentioned combinations of Z lead to blinking probes particularly useful in superresolution microscopy:

In such embodiments, Y is $NR^{Y1}R^{Y2}$ and E is $NR^{EG1}R^{EG2}$. $R^{Y1}$, $R^{Y2}$, $R^{EG1}$ and $R^{EG2}$ are unsubstituted or halogen-substituted $C_1$-$C_4$ alkyl. Optionally, $R^2$, $R^3$, $R^4$ and G can be halogen (particularly F or Cl). Z is selected from $CH_2R^F$, $CHR^F_2$, $CR^F_3$, H and $CH_2COOR^{K1}$ with $R^{K1}$ selected from H, and unsubstituted or halogen-substituted $C_1$ to $C_4$ alkyl and with $R^F$ selected from $CH_2F$, $CHF_2$, $CF_3$, $CH_2Cl$, and $CHCl_2$, $CCl_3$.

In certain embodiments related to blinking probes, X is O. In certain embodiments thereof, $R^{Y1}$, $R^{Y2}$, $R^{EG1}$ and $R^{EG2}$ are methyl, ethyl or $CH_2CF_3$. In certain embodiments, $R^F$ is $CF_3$.

Similarly, in embodiments relating to blinking probes, the compound is of the general formula (30) or (30')

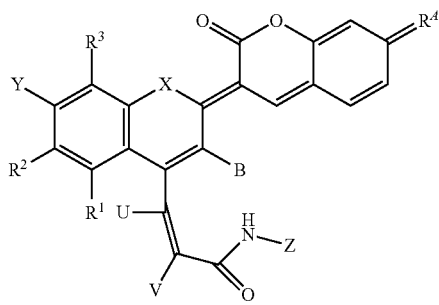
(30)

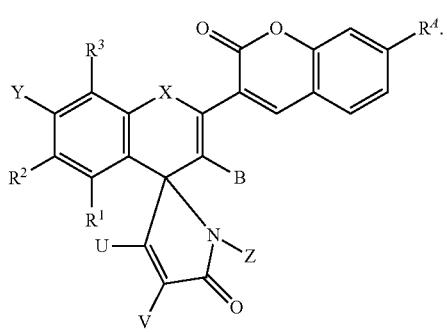
(30')

$R^A$, B, U and V have the meanings as defined above. Y is $NR^{Y1}R^{Y2}$. $R^{Y1}$ and $R^{Y2}$ are unsubstituted or halogen-substituted $C_1$-$C_4$ alkyl, particularly methyl, ethyl or $CH_2CF_3$.

Optionally, $R^2$ and $R^3$, can be halogen (particularly F or Cl).

Z is selected from $CH_2R^F$, $CHR^F_2$, $CR^F_3$, H and $CH_2COOR^{K1}$ with $R^{K1}$ selected from H, and unsubstituted or halogen-substituted $C_1$ to $C_4$ alkyl and with $R^F$ selected from $CH_2F$, $CHF_2$, $CF_3$, $CH_2Cl$, and $CHCl_2$, $CCl_3$. In certain embodiments, $R^F$ is $CF_3$.

In certain embodiments, X is O.

In certain embodiments, the compound is of the general formula (20) or (20') or (20"):

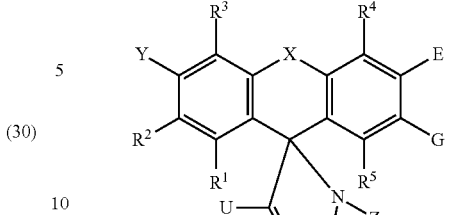
(20)

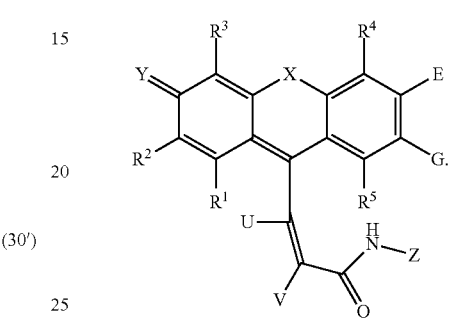
(20')

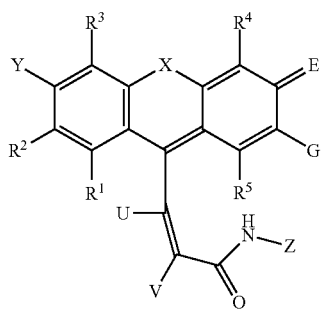
(20")

Y is $NR^{Y1}R^{Y2}$ and E is $NR^{EG1}R^{EG2}$, wherein $R^{Y1}$, $R^{Y2}$, $R^{EG1}$ and $R^{EG2}$ are individually unsubstituted or amino-, hydroxyl- or halogen-substituted $C_1$ to $C_4$ alkyl or $C_3$ to $C_6$ cycloalkyl, or $R^{Y1}$ together with $R^{Y2}$, and $R^{EG1}$ together with $R^{EG2}$ together with the N form an unsubstituted or methyl-, ethyl-propyl-, or halogen-substituted aziridine, pyrrolidine, piperidine, piperazine or morpholine.

$R^1$ and $R^5$ are H.

$R^2$, $R^3$, $R^4$ and G are independently selected from H, halogen, $SO_3H$, and unsubstituted and amino-, hydroxy-, carboxy-, $SO_3H$—, and/or halogen-substituted $C_1$-$C_4$ alkyl, $CO_2H$, $CO_2R$, $SO_2R$ with R being selected from $C_1$ to $C_4$ unsubstituted alkyl.

X is selected from O, $CR^X_2$, $SiR^X_2$. In certain embodiments, X is O.

Each $R^X$ is independently selected from unsubstituted or halogen-substituted $C_1$ to $C_4$ alkyl or $C_3$ to $C_6$ cycloalkyl and phenyl.

U and V form an unsubstituted or substituted phenyl, wherein one or several substituents are independently selected from OH, SH, amine [particularly $NR^{UV}_2$], halogen, CN, NC, CNO, NCO, CNS, NCS, unsubstituted $C_1$-$C_4$ O-alkyl, $C_1$-$C_4$ S-alkyl, O-aryl, S-aryl, $NO_2$, CHO, CON-$R^{UV}_2$, $COOR^{UV}$, COO-aryl, COO-alkylaryl (particularly benzyl), $PO_3H$, $PO_3R^{UV}$, $SO_3H$, $SO_3R^{UV}$ and $SO_2R^{UV}$, with $R^{UV}$ being selected from H, and $C_1$-$C_4$ unsubstituted alkyl.

In certain embodiments, U and V form a phenyl substituted with a moiety L-M, wherein M and L have the meanings as specified above.

In certain embodiments, Z is selected from CN and $CONR^Z_2$. In certain embodiments, $R^Z$ is selected from H, unsubstituted $C_1$-$C_4$ alkyl and alkylaryl (particularly benzyl).

In certain embodiments, Z is selected from $SO_2R^S$. In certain embodiments, $R^S$ is selected from $NR^{SN}_2$ and unsubstituted or perfluorinated alkyl. In certain embodiments, $R^{SN}$ is independently selected from H, unsubstituted or hydroxy-, amino-, halogen-, and/or carboxy-substituted $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, COOR$^C$, CONR$^C_2$, with R$^C$ being selected from H and $C_1$-$C_8$ alkyl.

Optionally, one of G, R$^2$, R$^3$, R$^4$, or a phenyl linking U and V bears a moiety M as defined above, linked to the compound by a covalent bond or a linker L, with L as defined above.

In certain embodiments, the compound is of the general formula (30) or (30') or (30")

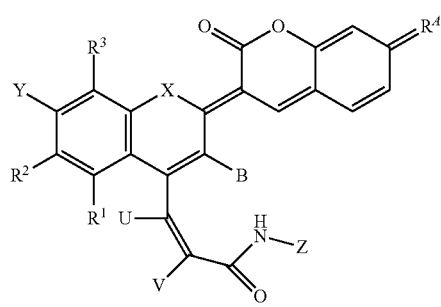
(30)

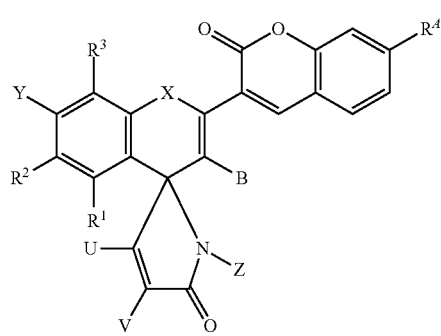
(30')

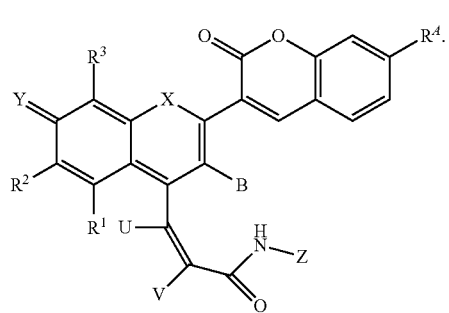
(30")

R$^4$ has the meaning as defined above and B is H.

Y is NR$^{Y1}$R$^{Y2}$, wherein R$^{Y1}$ and R$^{Y2}$ are individually unsubstituted or amino-, hydroxyl- or halogen-substituted $C_1$ to $C_4$ alkyl or $C_3$ to $C_6$ cycloalkyl, or R$^{Y1}$ together with R$^{Y2}$, and R$^{EG1}$ together with R$^{EG2}$ together with the N form an unsubstituted or methyl-, ethyl- propyl-, or halogen-substituted aziridine, pyrrolidine, piperidine, piperazine or morpholine.

R$^1$ is H.

R$^2$ and R$^3$ are independently selected from H, halogen, SO$_3$H, and unsubstituted and amino-, hydroxy-, carboxy-, SO$_3$H—, and/or halogen-substituted $C_1$-$C_4$ alkyl, CO$_2$H, CO$_2$R, SO$_2$R with R being selected from $C_1$ to $C_4$ unsubstituted alkyl.

X is selected from O, CR$^X_2$, SiR$^X_2$. In certain embodiments, X is O.

Each R$^X$ is independently selected from unsubstituted or halogen-substituted $C_1$ to $C_4$ alkyl or $C_3$ to $C_6$ cycloalkyl and phenyl.

U and V form an unsubstituted or substituted phenyl, wherein one or several substituents are independently selected from OH, SH, amine [particularly NR$^{UV}_2$], halogen, CN, NC, CNO, NCO, CNS, NCS, unsubstituted $C_1$-$C_4$ O-alkyl, $C_1$-$C_4$ S-alkyl, O-aryl, S-aryl, NO$_2$, CHO, CONR$^{UV}_2$, COOR$^{UV}$, COO-aryl, COO-alkylaryl (particularly benzyl), PO$_3$H, PO$_3$R$^{UV}$, SO$_3$H, SO$_3$R$^{UV}$ and SO$_2$R$^{UV}$, with R$^{UV}$ being selected from H, and $C_1$-$C_4$ unsubstituted alkyl. In certain embodiments, U and V form a phenyl substituted with a moiety L-M, wherein M and L have the meanings as specified above.

In certain embodiments, Z is selected from CN and CONR$^Z_2$. In certain embodiments, R$^Z$ is selected from H, unsubstituted $C_1$-$C_4$ alkyl and alkylaryl (particularly benzyl).

In certain embodiments, Z is SO$_2$R$^S$. In certain embodiments, R$^S$ is selected from NR$^{SN}_2$ and unsubstituted or perfluorinated alkyl. In certain embodiments, R$^{SN}$ is independently selected from H, unsubstituted or hydroxy-, amino-, halogen-, and/or carboxy-substituted $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, COOR$^C$, CONR$^C_2$, with R$^C$ being selected from H and $C_1$-$C_8$ alkyl.

Optionally, one of R$^2$, R$^3$, R$^4$, or a phenyl linking U and V bears a moiety M as defined above, linked to the compound by a covalent bond or a linker L, with L as defined above.

In certain embodiments, R$^2$, R$^3$, R$^4$, and G, are H, or one of R$^1$, R$^2$, R$^3$, R$^4$, G, and R$^5$ is $L^{A1}_n$-$L^{J1}_{n'}$'-$L^{A2}_m$-$L^{J2}_{m'}$'-$L^{A3}_p$-$L^{A3}_{p'}$'-$L^{A4}_q$-$L^{J4}_{q'}$'-$M_s$, wherein $L^{A1 \cdots 4}$, $L^{J1 \cdots 4}$, n, n' ... q', s and M have the definitions recited above each R$^X$ is $C_1$ to $C_4$ alkyl or phenyl, Y is NR$^{Y1}$R$^{Y2}$ and E is NR$^{EG1}$R$^{EG2}$;

R$^{Y1}$, R$^{Y2}$, R$^{EG1}$ and R$^{EG2}$ are individually unsubstituted or amino-, hydroxyl- or fluoro substituted $C_1$ to $C_4$ alkyl, or R$^{Y1}$ together with R$^{Y2}$, and R$^{EG1}$ together with R$^{EG2}$ form a ring including Y or E, respectively, and are —(CH$_2$)$_3$—, —(CH$_2$)$_4$—, —(CH$_2$)$_5$—, —(CH$_2$)$_2$O(CH$_2$)$_2$— or —(CH$_2$)$_2$NH(CH$_2$)$_2$—.

In certain embodiments, R$^2$ and G are F or Cl.

A second aspect of the invention relates to the use of a compound according the first aspect or being characterized by one of the following combinations

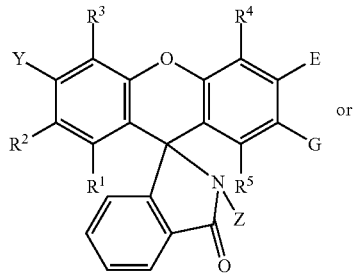
or

-continued

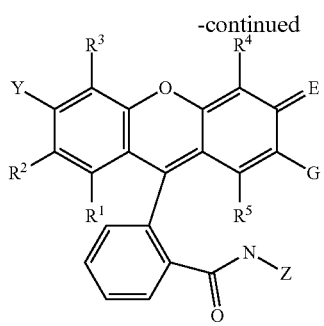

with

R¹, R², R³, R⁴, R⁵ and G are H, and
  Y and E are NEt₂ and
    Z is CONH₂ or
    Z is CONHC₆H₅; or
    Z is CN or
    Z is selected from CH₂CF₃, CH₂CHF₂, and CH₂CH₂F, or
    Z is selected from CH₂COOCH₃ and CH₂COOH,
    Z is H,
or
  Y and E are NMe₂ and Z is selected from CH₂COOCH₃ and CH₂COOH
or
  Y and E are NH₂ and Z is selected from CH₂COOH and CH₂COOCH₃
or
  Y is OH and E is =O (for formula 10) or E is OH (for formula 10'), and Z is C(=O)(CH₃)C₆H₅;
or
R¹, R³, R⁴, and R⁵ are H, R² and G are methyl, Y and E are NHEt and Z is CH₂COOH or CH₂COOCH₃
or the compound is of formula (301), (302), (303) or (304)

(301)
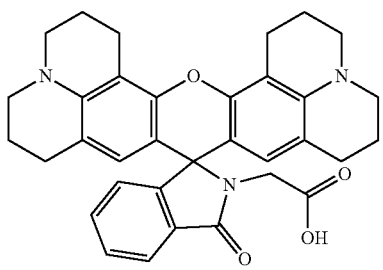

(302)
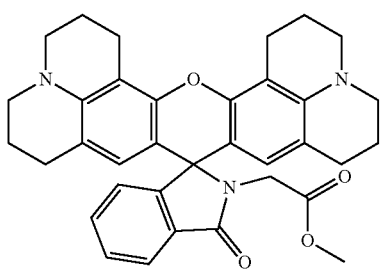

(303)
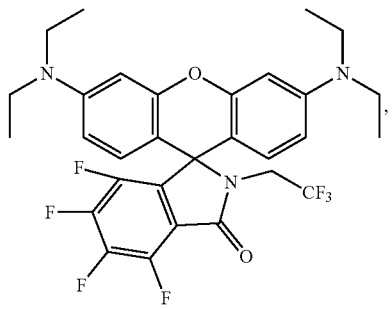

(304)
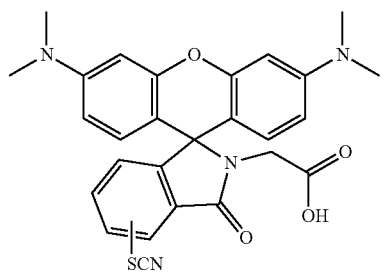

in a method of staining a biological sample.

In certain embodiments, the method to stain a sample comprises the steps of:
a. contacting the sample with a compound according to any one of the preceding claims or being characterized by one of the following combinations

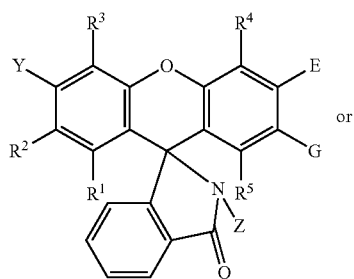 or

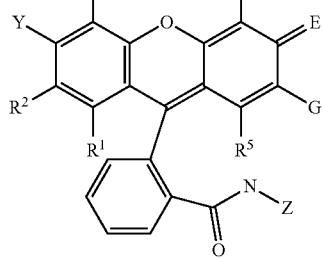

with

R¹, R², R³, R⁴, R⁵ and G are H, and
  Y and E are NEt₂ and
    Z is CONH₂ or
    Z is CONHC₆H₅; or
    Z is CN or
    Z is selected from CH₂CF₃, CH₂CHF₂, and CH₂CH₂F, or
    Z is selected from CH₂COOCH₃ and CH₂COOH,
    Z is H, or
  Y and E are NMe$_2$ and Z is selected from CH$_2$COOCH$_3$ and CH$_2$COOH
or
  Y and E are NH$_2$ and Z is selected from CH$_2$COOH and CH$_2$COOCH$_3$
or
  Y is OH and E is =O (for formula 10) or E is OH (for formula 10'), and Z is C(=O)(CH$_3$)C$_6$H$_5$;
or
  R$^1$, R$^3$, R$^4$, and R$^5$ are H, R$^2$ and G are methyl, Y and E are NHEt and Z is CH$_2$COOH or CH$_2$COOCH$_3$
or the compound is of formula (301), (302), (303) or (304)

(301)
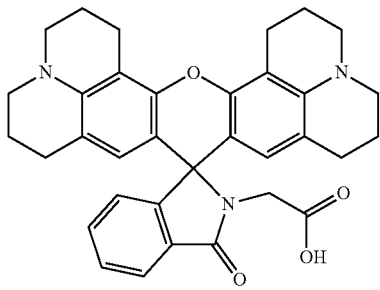

(302)
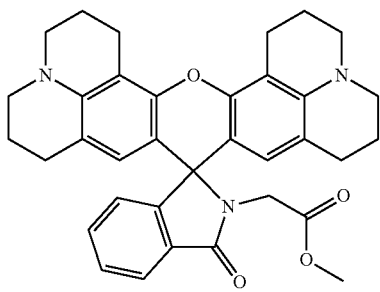

(303)
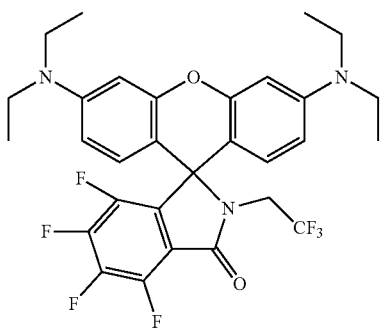

(304)
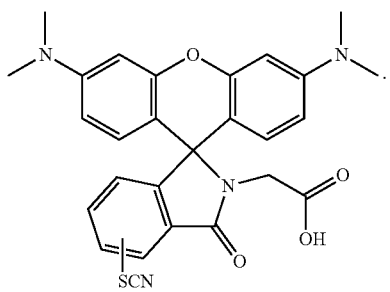

A third aspect of the invention relates to a method to stain a sample, said method comprising the steps of:
  a. contacting the sample with a compound according to the first aspect or being characterized by one of the following combinations

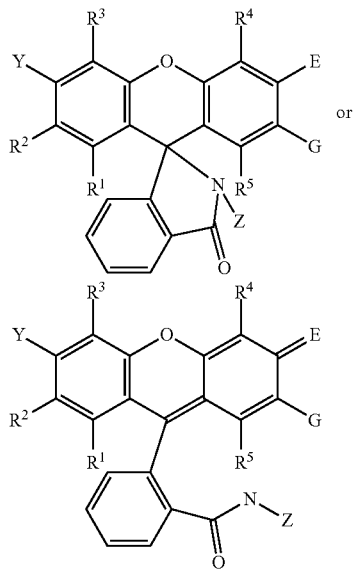

with
  R$^1$, R$^2$, R$^3$, R$^4$, R$^5$ and G are H, and
    Y and E are NEt$_2$ and
      Z is CONH$_2$ or
      Z is CONHC$_6$H$_5$; or
      Z is CN or
      Z is selected from CH$_2$CF$_3$, CH$_2$CHF$_2$, and CH$_2$CH$_2$F, or
      Z is selected from CH$_2$COOCH$_3$ and CH$_2$COOH,
      Z is H,
    or
    Y and E are NMe$_2$ and Z is selected from CH$_2$COOCH$_3$ and CH$_2$COOH
    or
    Y and E are NH$_2$ and Z is selected from CH$_2$COOH and CH$_2$COOCH$_3$
  or
    Y is OH and E is =O (for formula 10) or E is OH (for formula 10'), and Z is C(=O)(CH$_3$)C$_6$H$_5$;
  or
    R$^1$, R$^3$, R$^4$, and R$^5$ are H, R$^2$ and G are methyl, Y and E are NHEt and Z is CH$_2$COOH or CH$_2$COOCH$_3$
  or the compound is of formula (301), (302), (303) or (304)

(301)
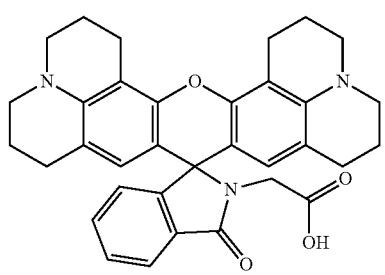

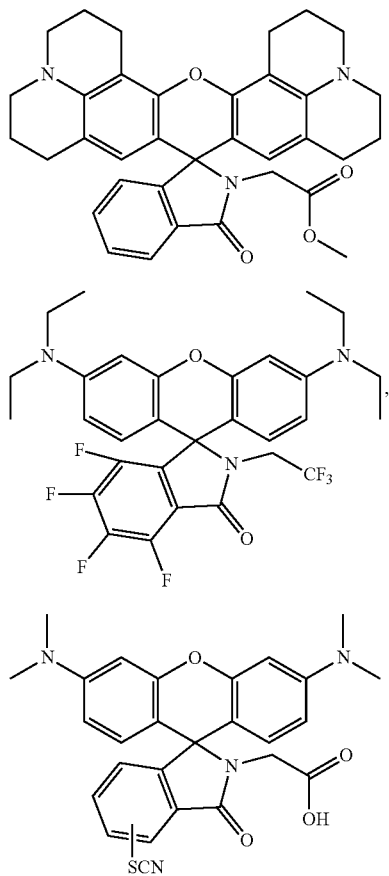

b. illuminating the sample with light of a wavelength ranging from 400 to 800 nm;
c. recording the presence and location of said compound in said sample by illuminating the sample with light of an appropriate excitation wavelength and recording light emitted from said sample, particularly at an appropriate emission wavelength λ. The skilled artisan is capable of determining the optical properties of any compound disclosed herein, and to select an appropriate λ close to the maximum of the emission spectrum without inventive activity.

Wherever alternatives for single separable features such as, for example, Z, V, or U are laid out herein as "embodiments", it is to be understood that such alternatives may be combined freely to form discrete embodiments of the invention disclosed herein.

The invention is further illustrated by the following examples and figures, from which further embodiments and advantages can be drawn. These examples are meant to illustrate the invention but not to limit its scope.

EXAMPLES

Figure 1:
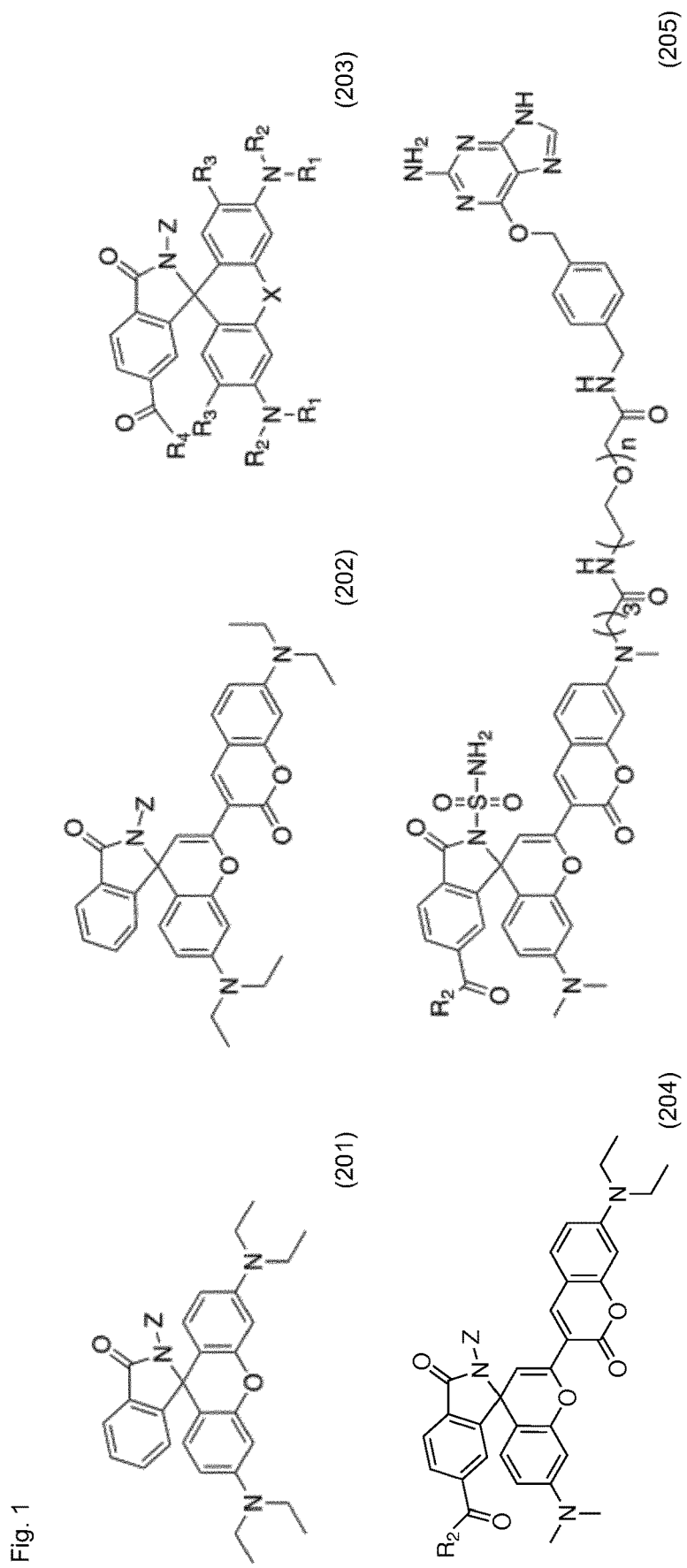
FIG. 1 Structures of particular compounds according to the invention for which a synthesis is disclosed in this specification.
Figure 1:
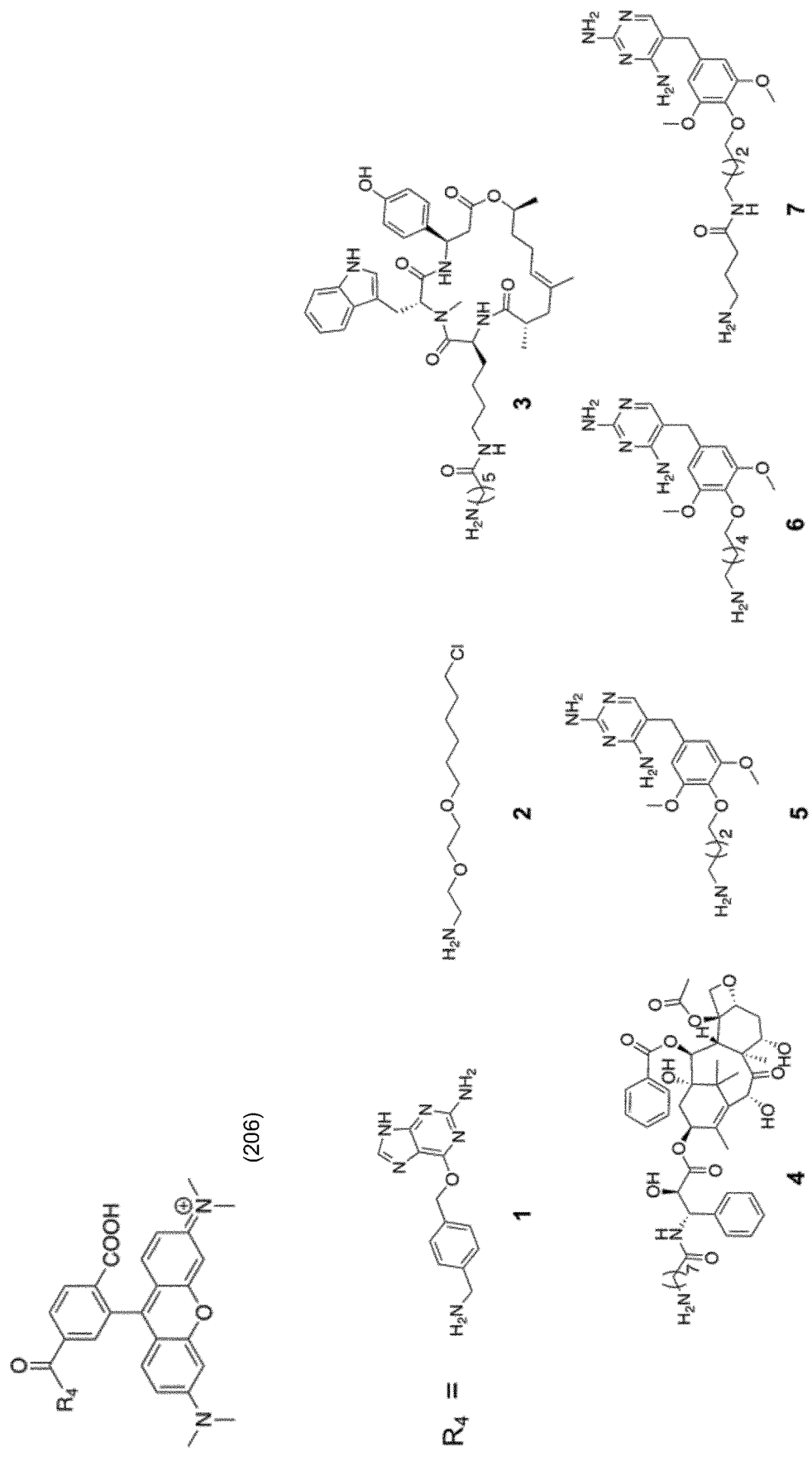

FIG. 1 shows exemplary fluorogenic compounds of the invention.

The following compounds with moieties for Z were synthesized according to scaffold 201:
  RhB-CH3 Z=—CH$_3$
  RhB-Ben Z=—C$_6$H$_5$
  RhB-CN Z=—CN
  RhB-SCH3 (115) Z=—SO$_2$CH$_3$
  RhB-SNH2 (116) Z=—SO$_2$NH$_2$
  RhB-SNMe2 (117) Z=—SO$_2$N(CH$_3$)$_2$
  RhB-CONH2 (118) Z=—CONH$_2$.

For compound 202 the following moieties for Z were synthesized:
  WS1-SCF3 (119) Z=—SO$_2$CF$_3$
  WS1-SCH3 (120) Z=—SO$_2$CH$_3$
  WS1-CN (121) Z=—CN
  WS1-SNH2 (122) Z=—SO$_2$NH$_2$
  WS1-SO (123) Z=—SO$_3$
  WS1-UREA (124) Z=—CONH$_2$
  WS1-SCH2-C3-SNAP (125) Z=SO$_2$CH$_2$CH$_2$CH$_2$CO—R$_2$, R$_2$=1
  WS1-SCH2-C3-HALO (126) Z=SO$_2$CH$_2$CH$_2$CH$_2$CO—R$_2$, R$_2$=2.

The following compounds with moieties for Z, X and $R_1$-$R_4$ were synthesized according to scaffold 203:
  RhB-SNH2-SNAP (146) X=O, Z=SO$_2$NH$_2$, R$_1$=R$_2$=CH$_2$CH$_3$, R$_3$=H, R$_4$=1
  RhB-SNH2-HALO (147) X=O, Z=SO$_2$NH$_2$, R$_1$=R$_2$=CH$_2$CH$_3$, R$_3$=H, R$_4$=2
  RhB-SNMe2-SNAP (148) X=O, Z=SO$_2$N(CH$_3$)$_2$, R$_1$=R$_2$=CH$_2$CH$_3$, R$_3$=H, R$_4$=1
  RhB-SNMe2-HALO (149) X=O, Z=SO$_2$N(CH$_3$)$_2$, R$_1$=R$_2$=CH$_2$CH$_3$, R$_3$=H, R$_4$=2
  RhB-CONH2-HALO (175) X=O, Z=CONH$_2$, R$_1$=R$_2$=CH$_2$CH$_3$, R$_3$=H, R$_4$=2
  R110-SNMe2-SNAP (173) X=O, Z=SO$_2$N(CH$_3$)$_2$, R$_1$=R$_2$=H, R$_3$=H, R$_4$=1
  R110-SNMe2-HALO (174) X=O, Z=SO$_2$N(CH$_3$)$_2$, R$_1$=R$_2$=H, R$_3$=H, R$_4$=2
  TMR-CN-SNAP (152) X=O, Z=CN, R$_1$=R$_2$=CH$_3$, R$_3$=H, R$_4$=1
  TMR-CN-HALO (153) X=O, Z=CN, R$_1$=R$_2$=CH$_3$, R$_3$=H, R$_4$=2
  TMR-SCH3-SNAP (154) X=O, Z=SO$_2$CH$_3$, R$_1$=R$_2$=CH$_3$, R$_3$=H, R$_4$=1
  TMR-SCH3-HALO (155) X=O, Z=SO$_2$CH$_3$, R$_1$=R$_2$=CH$_3$, R$_3$=H, R$_4$=2
  TMR-SNH2-SNAP (156) X=O, Z=SO$_2$NH$_2$, R$_1$=R$_2$=CH$_3$, R$_3$=H, R$_4$=1
  TMR-SNH2-HALO (157) X=O, Z=SO$_2$NH$_2$, R$_1$=R$_2$=CH$_3$, R$_3$=H, R$_4$=2
  TMR-SNMe2-SNAP (158) X=O, Z=SO$_2$N(CH$_3$)$_2$, R$_1$=R$_2$=CH$_3$, R$_3$=H, R$_4$=1
  TMR-SNMe2-HALO (159) X=O, Z=SO$_2$N(CH$_3$)$_2$, R$_1$=R$_2$=CH$_3$, R$_3$=H, R$_4$=2
  TMR-SNMe2-Actin (169) X=O, Z=SO$_2$N(CH$_3$)$_2$, R$_1$=R$_2$=CH$_3$, R$_3$=H, R$_4$=3
  TMR-SNMe2-Tubulin (172) X=O, Z=SO$_2$N(CH$_3$)$_2$, R$_1$=R$_2$=CH$_3$, R$_3$=H, R$_4$=4
  CPY-CN-SNAP (160) X=C(CH$_3$)$_2$, Z=CN, R$_1$=R$_2$=CH$_3$, R$_3$=H, R$_4$=1
  CPY-CN-HALO (161) X=C(CH$_3$)$_2$, Z=CN, R$_1$=R$_2$=CH$_3$, R$_3$=H, R$_4$=2
  CPY-SCH3-SNAP (162) X=C(CH$_3$)$_2$, Z=SO$_2$CH$_3$, R$_1$=R$_2$=CH$_3$, R$_3$=H, R$_4$=1
  CPY-SCH3-HALO (163) X=C(CH$_3$)$_2$, Z=SO$_2$CH$_3$, R$_1$=R$_2$=CH$_3$, R$_3$=H, R$_4$=2
  CPY-SNH2-SNAP (164) X=C(CH$_3$)$_2$, Z=SO$_2$NH$_2$, R$_1$=R$_2$=CH$_3$, R$_3$=H, R$_4$=1
  CPY-SNH2-HALO (165) X=C(CH$_3$)$_2$, Z=SO$_2$NH$_2$, R$_1$=R$_2$=CH$_3$, R$_3$=H, R$_4$=2
  CPY-SNMe2-SNAP (166) X=C(CH$_3$)$_2$, Z=SO$_2$N(CH$_3$)$_2$, R$_1$=R$_2$=CH$_3$, R$_3$=H, R$_4$=1
  CPY-SNMe2-HALO (167) X=C(CH$_3$)$_2$, Z=SO$_2$N(CH$_3$)$_2$, R$_1$=R$_2$=CH$_3$, R$_3$=H, R$_4$=2
  CPY-CN-Actin (170) X=C(CH$_3$)$_2$, Z=CN, R$_1$=R$_2$=CH$_3$, R$_3$=H, R$_4$=3
  CPY-SCH3-Actin (171) X=C(CH$_3$)$_2$, Z=SO$_2$CH$_3$, R$_1$=R$_2$=CH$_3$, R$_3$=H, R$_4$=3
  SiR700-CN-HALO (168) X=Si(CH$_3$)$_2$, Z=CN, R$_1$=CH$_3$, R$_2$-R$_3$=CH$_2$—CH$_2$, R$_4$=2.

The following compounds with moieties for Z and $R_2$— were synthesized according to scaffold 204:
  WS1-CN-SNAP (176) Z=CN, R$_2$=1
  WS1-CN-HALO (177) Z=CN, R$_2$=2
  WS1-CN-TMP (178) Z=CN, R$_2$=5
  WS1-SCH3-HALO (179) Z=SO$_2$CH$_3$, R$_2$=2
  WS1-SCH3-TMP (180) Z=SO$_2$CH$_3$, R$_2$=5
  WS1-SNH2-HALO (181) Z=SO$_2$NH$_2$, R$_2$=2
  WS1-SNH2-TMP (182) Z=SO$_2$NH$_2$, R$_2$=5
  WS1-SNH2-TMP-C6 (183) Z=SO$_2$NH$_2$, R$_2$=6
  WS1-SNH2-TMP-C8 (184) Z=SO$_2$NH$_2$, R$_2$=7.

The following compounds with moieties for $R_2$ were synthesized according to scaffold 205:
  WS1-SNH2-TMP-PEG2BG (191) n=2, R$_2$=5
  WS1-SNH2-TMP-PEG5BG (192) n=2, R$_2$=5.

The following compounds with moieties for $R_2$ were synthesized according to scaffold 206:
TMR-SNAP (150) $R_4$=1
TMR-HALO (151) $R_4$=2
with $R_4$ depicted in FIG. 1.

Figure 2:
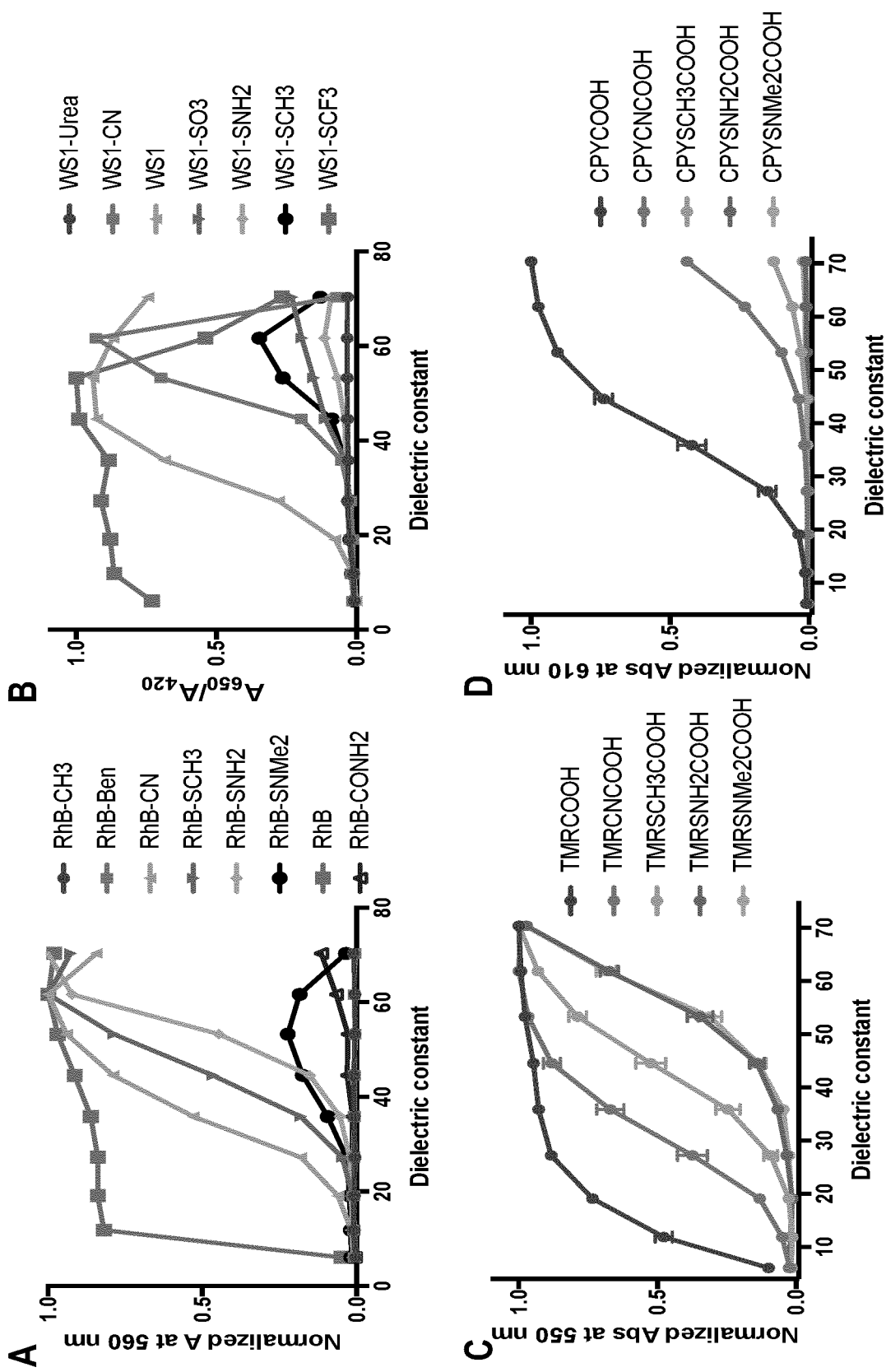
FIG. 2 Normalized integral of absorption spectra of the zwitterion region of Rhodamine B (RhB) derivatives (A), semi-Rhodamine (WS1) derivatives (B), tetramethylrhodamine (TMR) derivatives (C), and carbopyronine (CPY) derivatives (D) in water-dioxane mixtures as a function of dielectric constant. Experimental Conditions: probe: 5 μM, temperature: 25° C.
RhB-CH3: compound 201 with Z=methyl; RhB-Ben: 201, Z=benzyl; RhB-CN: 201, Z=CN; RhB-SCH3 (115), RhB-SNH2 (116), RhB-SNMe2 (117), RhB: Rhodamine B, RhB-CONH2 (118), WS1-UREA (124), WS1-CN (121), WS1: compound 202 with N—Z=OH; WS1-SO3 (123), WS1-SNH2 (122), WS1-SCH3 (120), WS1-SCF3 (119), TMRCOOH (6-Carboxytetramethylrhodamine), TMRCN-COOH (132), TMRSCH3COOH (133), TMRSNH2COOH (134), TMRSNMe2COOH (135), CPYCOOH (6-Carboxy-carbopyronine), CPYCNCOOH (136), CPYSCH3COOH (137), CPYSNH2COOH (138), CPYSNMe2COOH (139).

From FIG. 2, it can be concluded that the method of the invention can modify the ratio between spirolactam and the zwitterionic form of rhodamine/semi-rhodamine fluorophores as a function of the dielectric constant of the solvent. This property is termed fluorogenicity in the context of the present specification.

Figure 3:
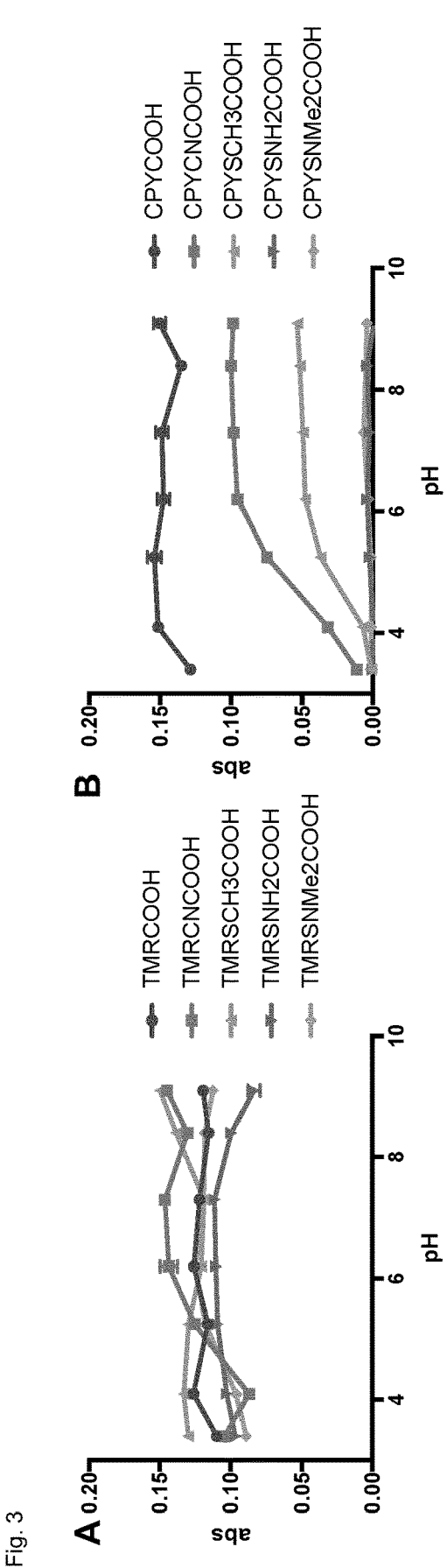
FIG. 3 Absorbance of TMR (A) at 560 nm and CPY (B) at 610 nm in Phosphate-buffered saline solution (PBS, 10 mM) as a function of pH. Experimental Conditions: probe: 5 μM, pH: 3.4, 4.1, 5.25, 6.2, 7.3, 8.4, 9.1.
Figure 4:
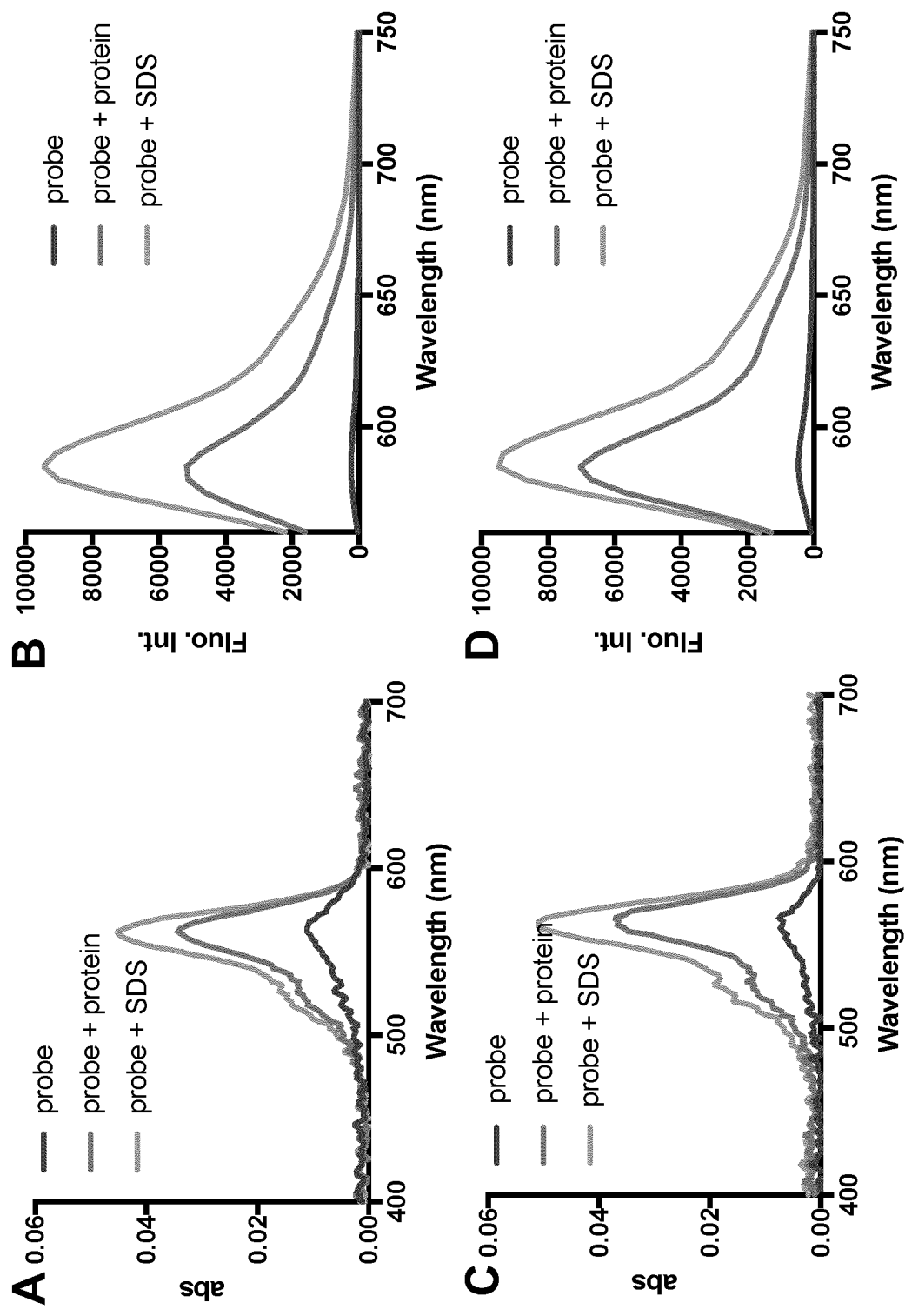
FIG. 4 The absorption (A,C) and emission (B,D) spectra of RhB-SNH2-SNAP (146) (A,B) and RhB-SNH2-HALO (147) (C,D) in the absence (blue line) and presence of tag proteins (red line) or SDS (green line). Experimental Conditions: probe: 1 μM, SNAP-HaloTag protein: 2 μM, SDS: 0.1%, incubation time: 1 h, 50 mM Hepes buffer (pH 7.3). $\lambda_{ex}$=530 nm, temperature: 25° C.
Figure 5:
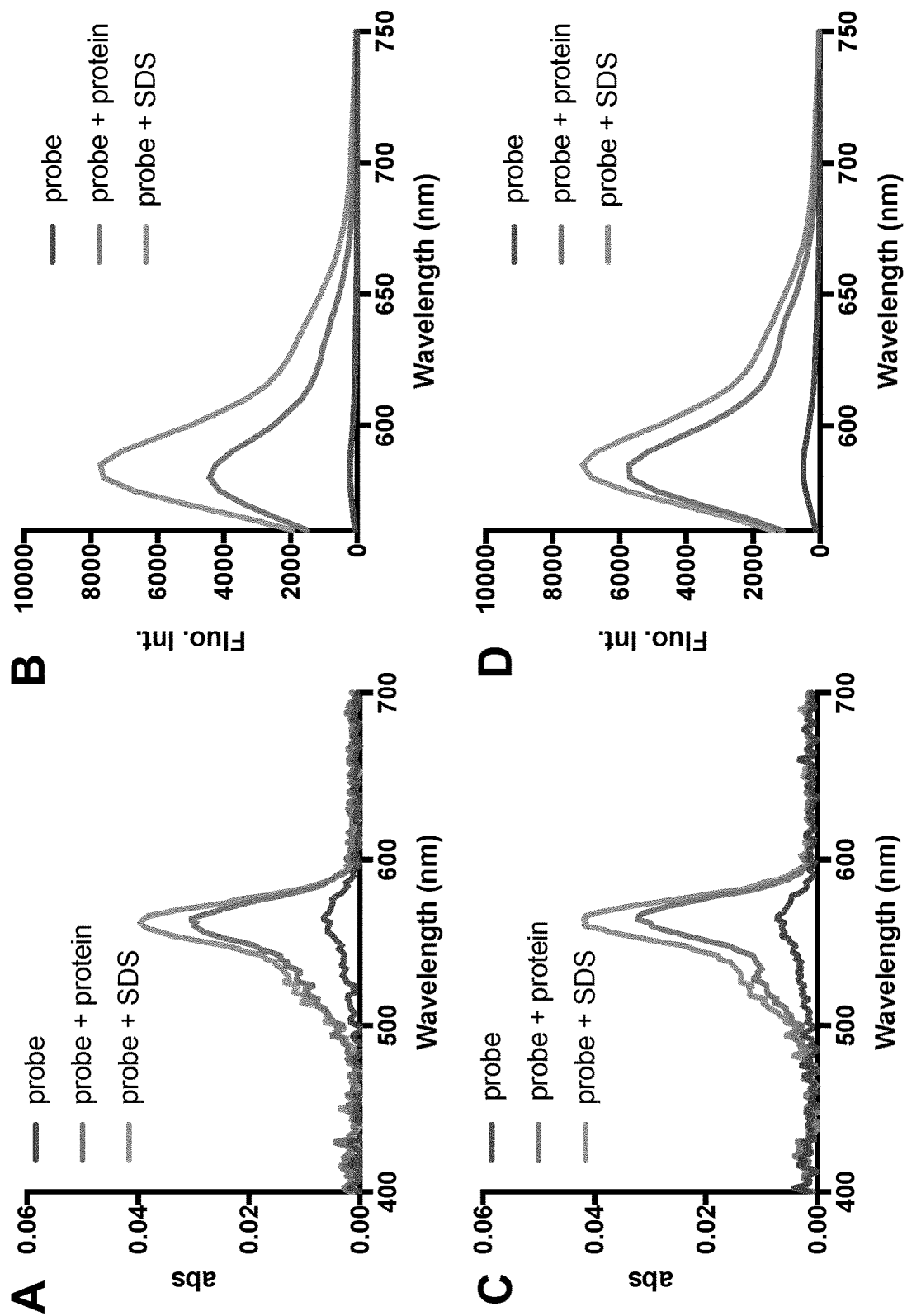
FIG. 5 The absorption (A,C) and emission (B,D) spectra of RhB-SNMe2-SNAP (148) (A,B) and RhB-SNMe2-HALO (149) (C,D) in the absence (blue line) and presence of tag proteins (red line) or SDS (green line). Experimental Conditions: probe: 1 μM, SNAP-HaloTag protein: 2 μM, SDS: 0.1%, incubation time: 1 h, 50 mM Hepes buffer (pH 7.3). $\lambda_{ex}$=530 nm, temperature: 25° C.
Figure 6:
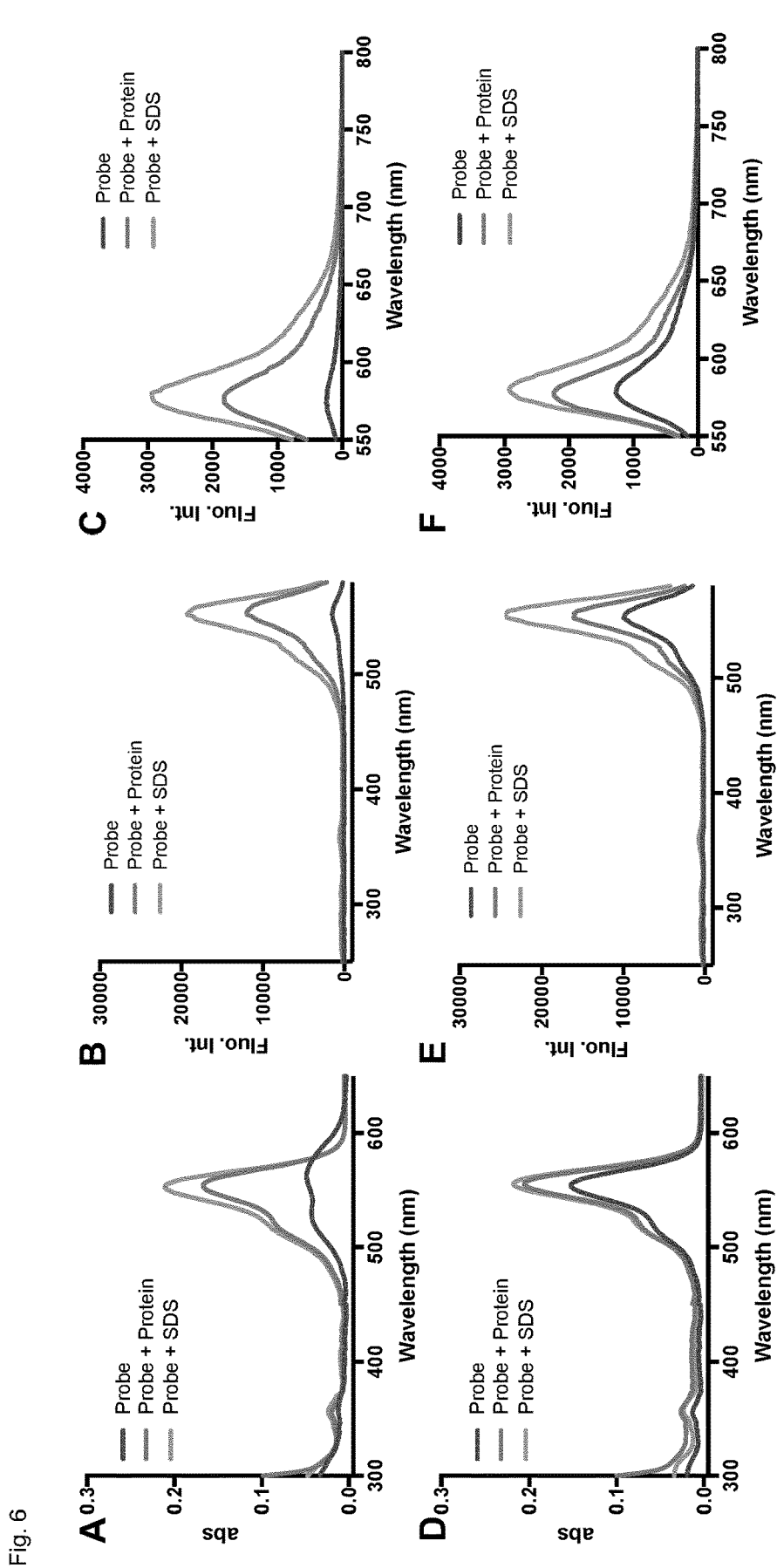
FIG. 6 The absorption (A,D), excitation (B,E) and emission (C,F) spectra of TMR-SNAP (150) (A,B,C) and TMR-HALO (151) (D,E,F) in the absence (blue line) and presence of tag proteins (red line) or SDS (green line). Experimental Conditions: probe: 2.5 μM, SNAP-HaloTag protein: 5 μM, SDS: 0.1%, incubation time: 1 h, 50 mM Hepes buffer (pH 7.3). $\lambda_{ex}$=530 nm, temperature: 25° C. TMR-SNAP and TMR-HALO were prepared based on reported method (Liss et al. Scientific Reports 5, 17740 (2015)).
Figure 7:
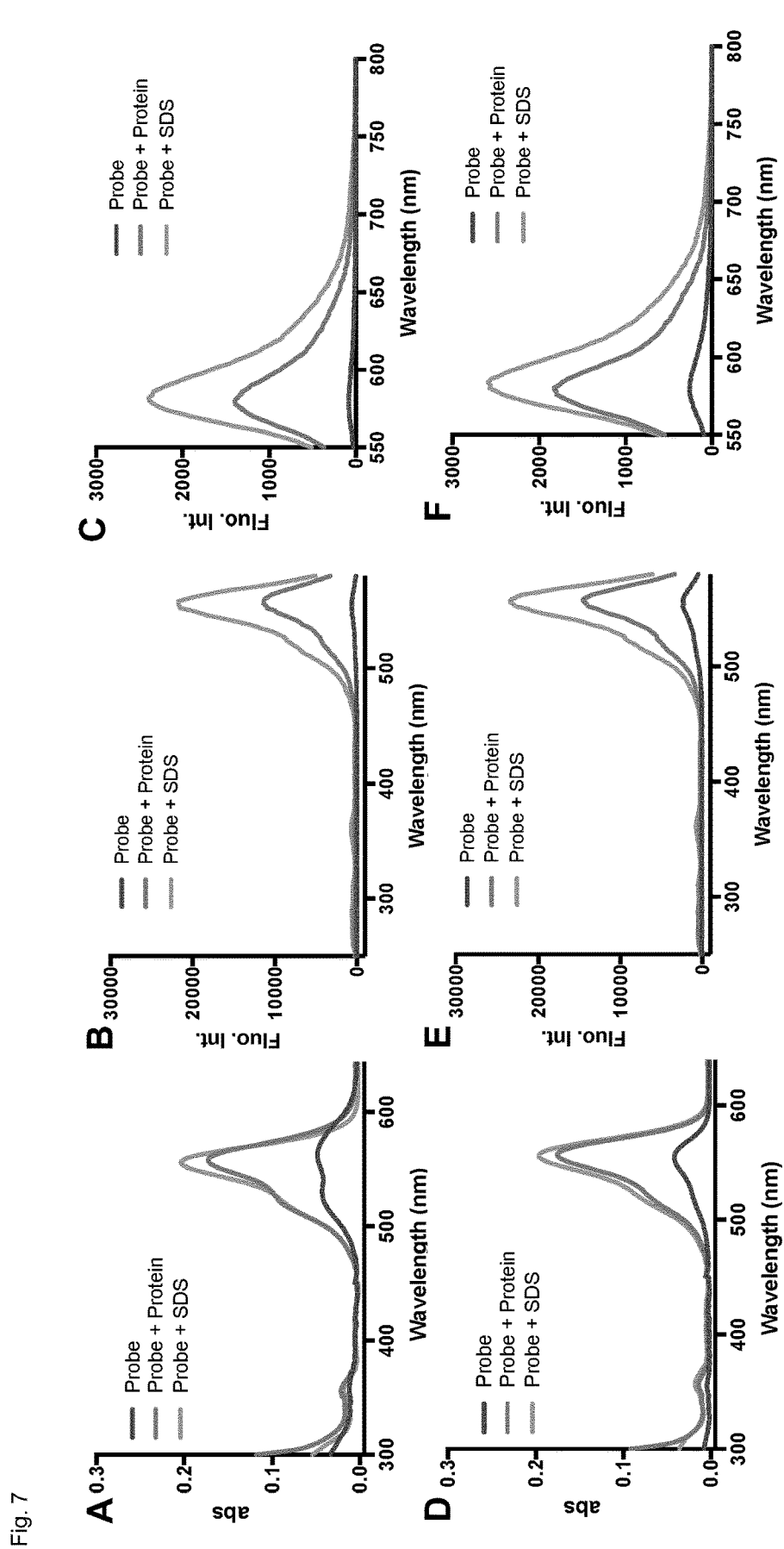
FIG. 7 The absorption (A,D), excitation (B,E) and emission (C,F) spectra of TMR-CN-SNAP (152) (A,B,C) and TMR-CN-HALO (153) (D,E,F) in the absence (blue line) and presence of tag proteins (red line) or SDS (green line). Experimental Conditions: probe: 2.5 μM, SNAP-HaloTag protein: 5 μM, SDS: 0.1%, incubation time: 1 h, 50 mM Hepes buffer (pH 7.3). $\lambda_{ex}$=530 nm, temperature: 25° C.
Figure 8:
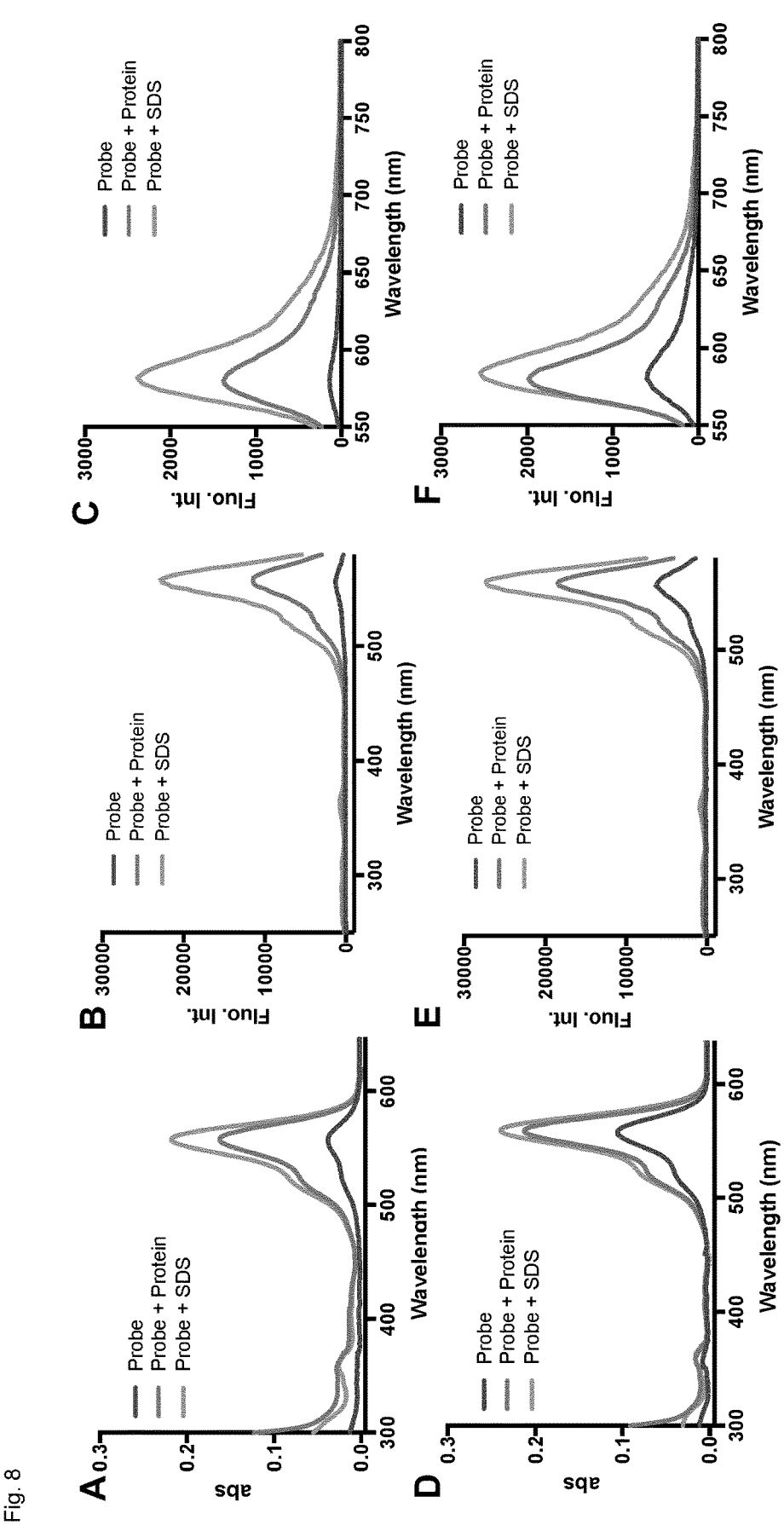
FIG. 8 The absorption (A,D), excitation (B,E) and emission (C,F) spectra of TMR-SCH3-SNAP (154) (A,B,C) and TMR-SCH3-HALO (155) (D,E,F) in the absence (blue line) and presence of tag proteins (red line) or SDS (green line). Experimental Conditions: probe: 2.5 μM, SNAP-HaloTag protein: 5 μM, SDS: 0.1%, incubation time: 1 h, 50 mM Hepes buffer (pH 7.3). $\lambda_{ex}$=530 nm, temperature: 25° C.
Figure 9:
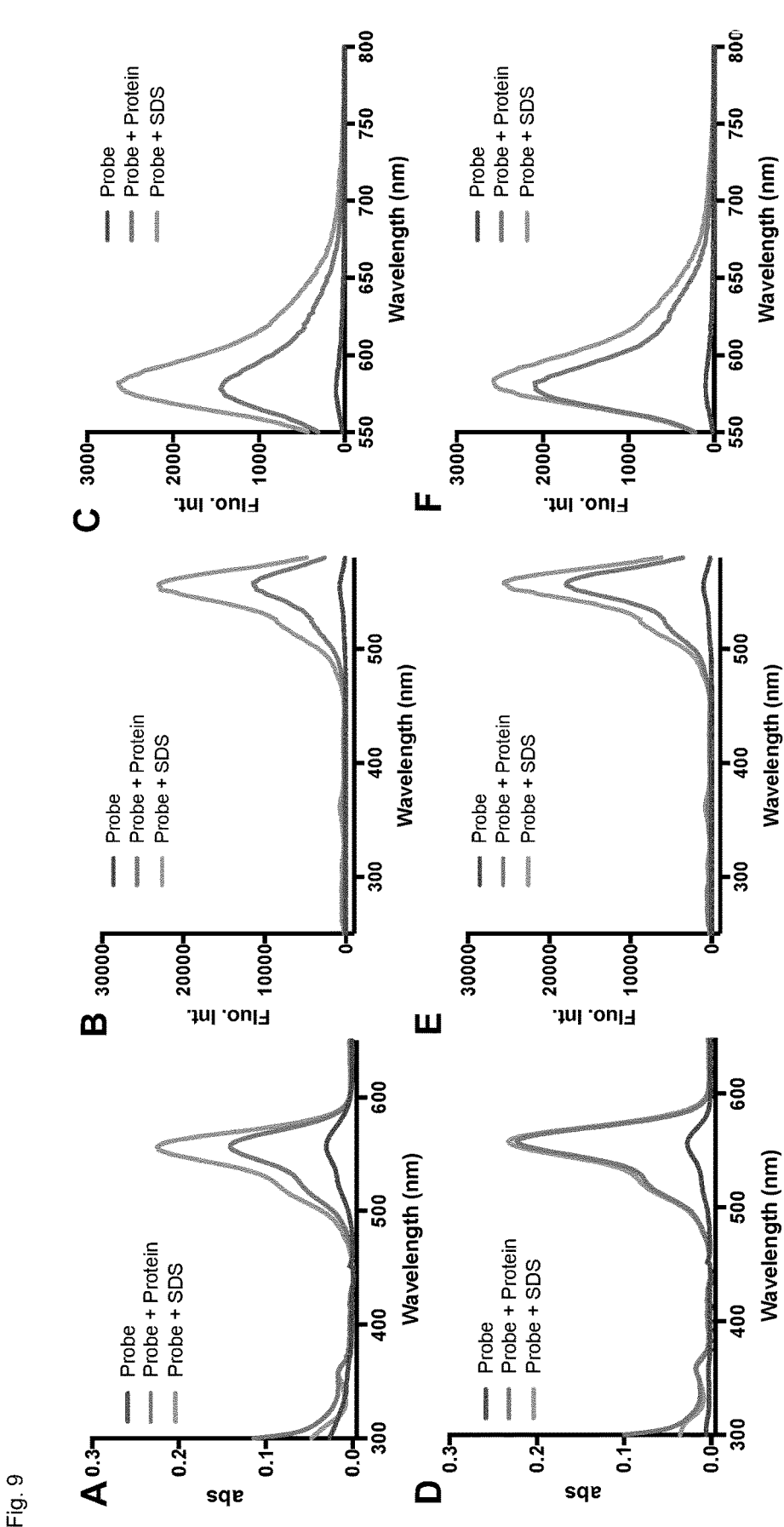
FIG. 9 The absorption (A,D), excitation (B,E) and emission (C,F) spectra of TMR-SNH2-SNAP (156) (A,B,C) and TMR-SNH2-HALO (157) (D,E,F) in the absence (blue line) and presence of tag proteins (red line) or SDS (green line). Experimental Conditions: probe: 2.5 μM, SNAP-HaloTag protein: 5 μM, SDS: 0.1%, incubation time: 1 h, 50 mM Hepes buffer (pH 7.3). $\lambda_{ex}$=530 nm, temperature: 25° C.
Figure 10:
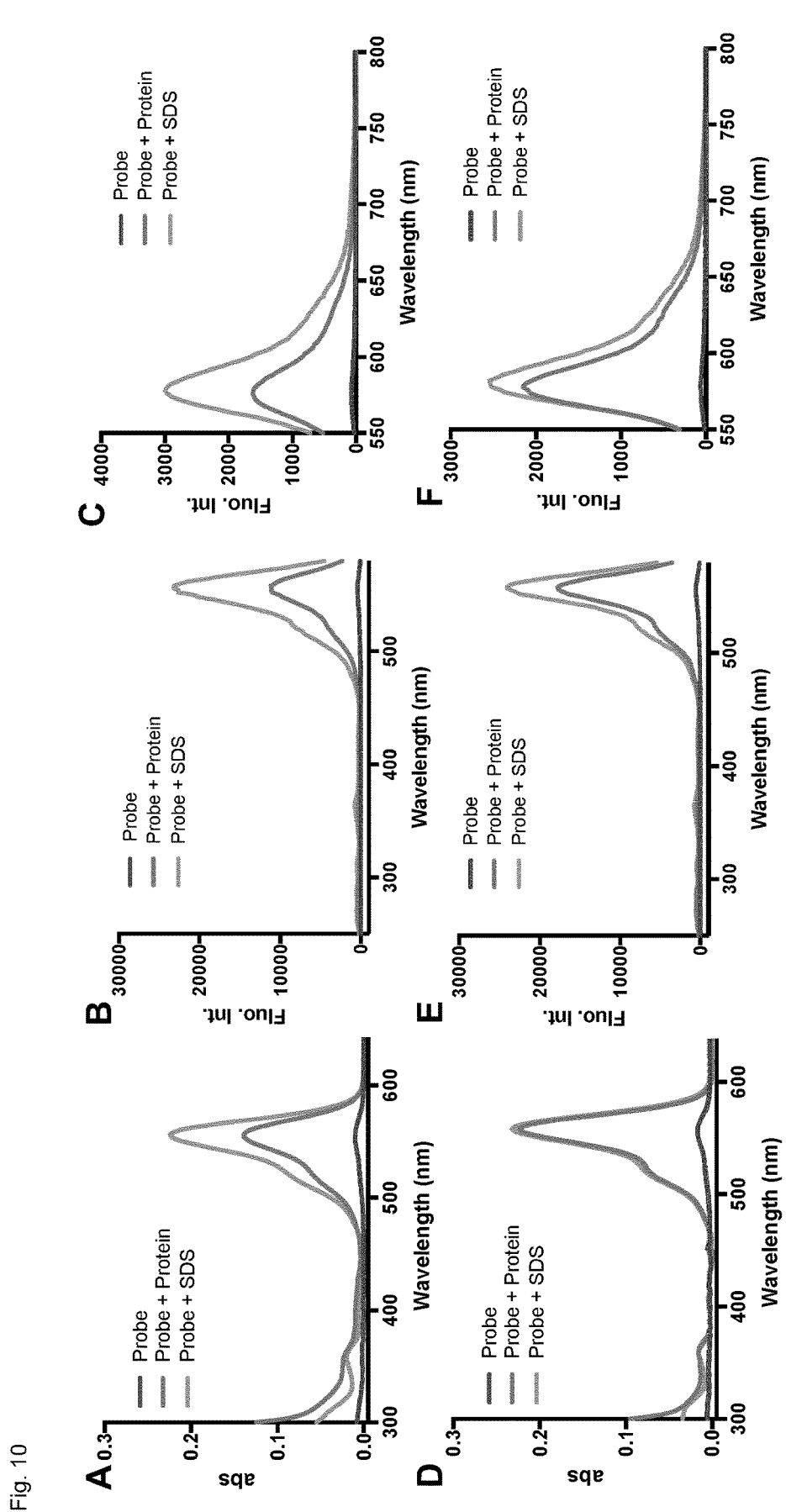
FIG. 10 The absorption (A,D), excitation (B,E) and emission (C,F) spectra of TMR-SNMe2-SNAP (158) (A,B,C) and TMR-SNMe2-HALO (159) (D,E,F) in the absence (blue line) and presence of tag proteins (red line) or SDS (green line). Experimental Conditions: probe: 2.5 μM, SNAP- HaloTag protein: 5 µM, SDS: 0.1%, incubation time: 1 h, 50 mM Hepes buffer (pH 7.3). $\lambda_{ex}$=530 nm, temperature: 25° C.
Figure 11:
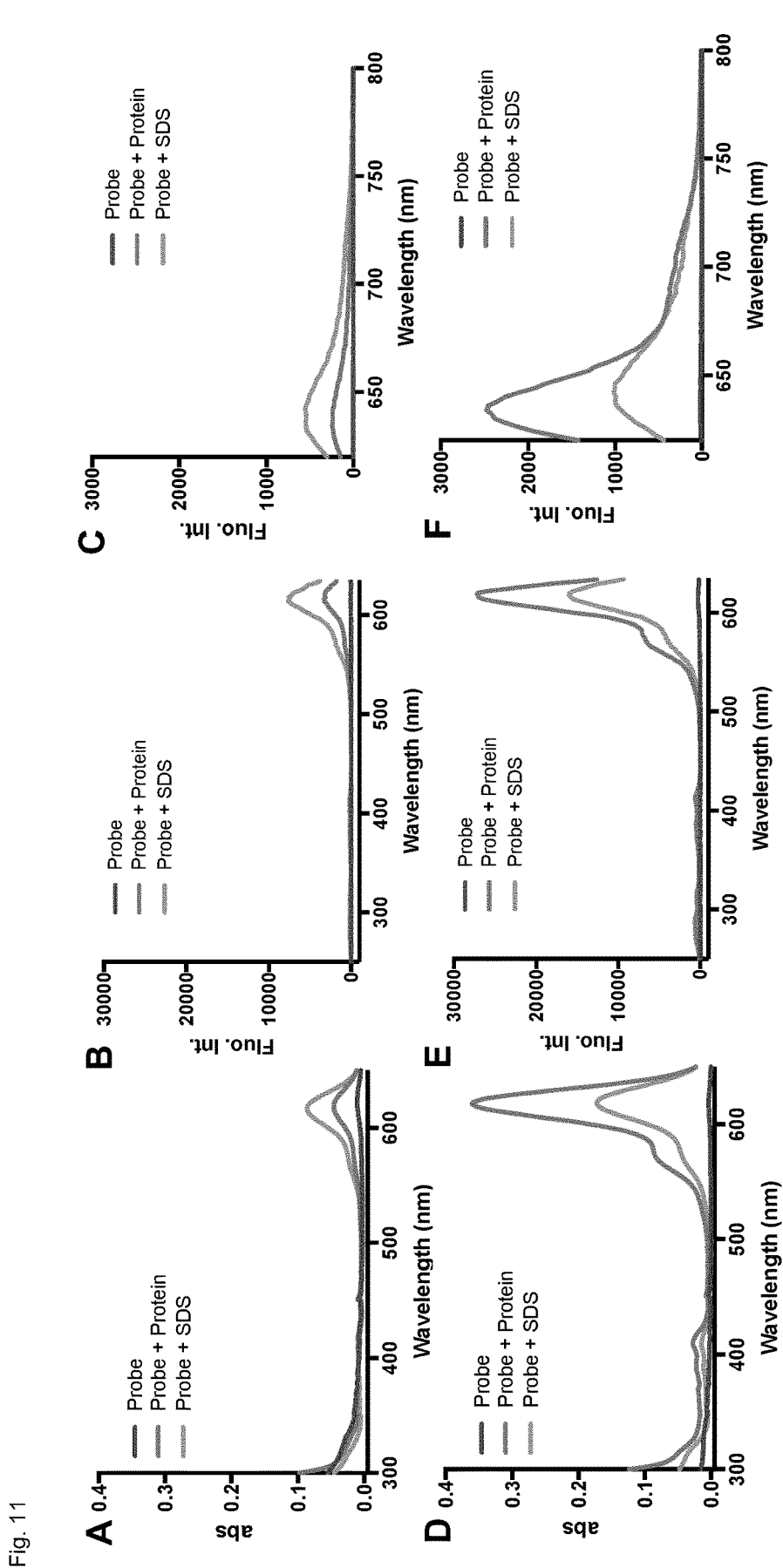
FIG. 11 The absorption (A,D), excitation (B,E) and emission (C,F) spectra of CPY-CN-SNAP (160) (A,B,C) and CPY-CN-HALO (161) (D,E,F) in the absence (blue line) and presence of tag proteins (red line) or SDS (green line). Experimental Conditions: probe: 2.5 µM, SNAP-HaloTag protein: 5 µM, SDS: 0.1%, incubation time: 1 h, 50 mM Hepes buffer (pH 7.3). $\lambda_{ex}$=600 nm, temperature: 25° C.
Figure 12:
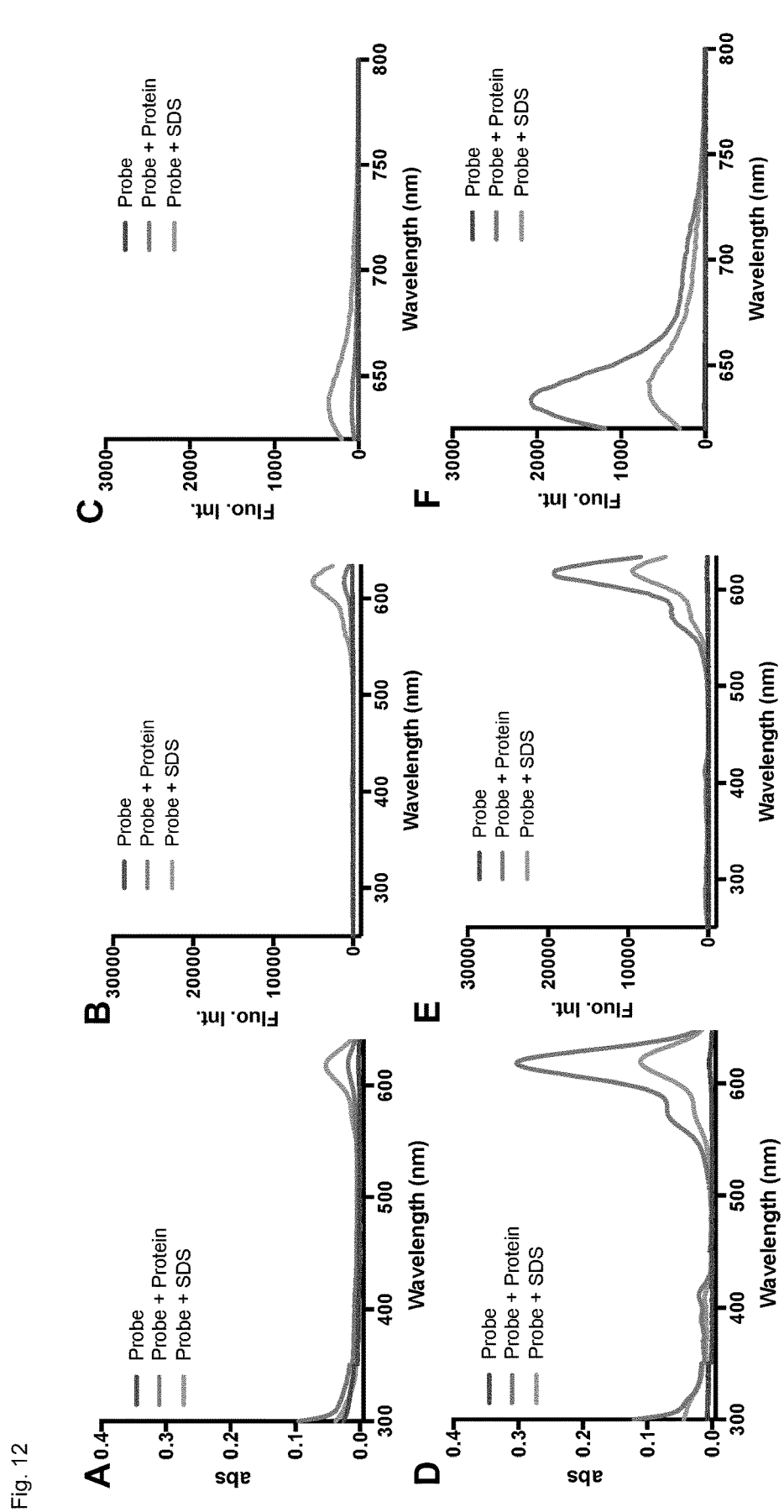
FIG. 12 The absorption (A,D), excitation (B,E) and emission (C,F) spectra of CPY-SCH3-SNAP (162) (A,B,C) and CPY-SCH3-HALO (163) (D,E,F) in the absence (blue line) and presence of tag proteins (red line) or SDS (green line). Experimental Conditions: probe: 2.5 µM, SNAP-HaloTag protein: 5 µM, SDS: 0.1%, incubation time: 1 h, 50 mM Hepes buffer (pH 7.3). $\lambda_{ex}$=600 nm, temperature: 25° C.
Figure 13:
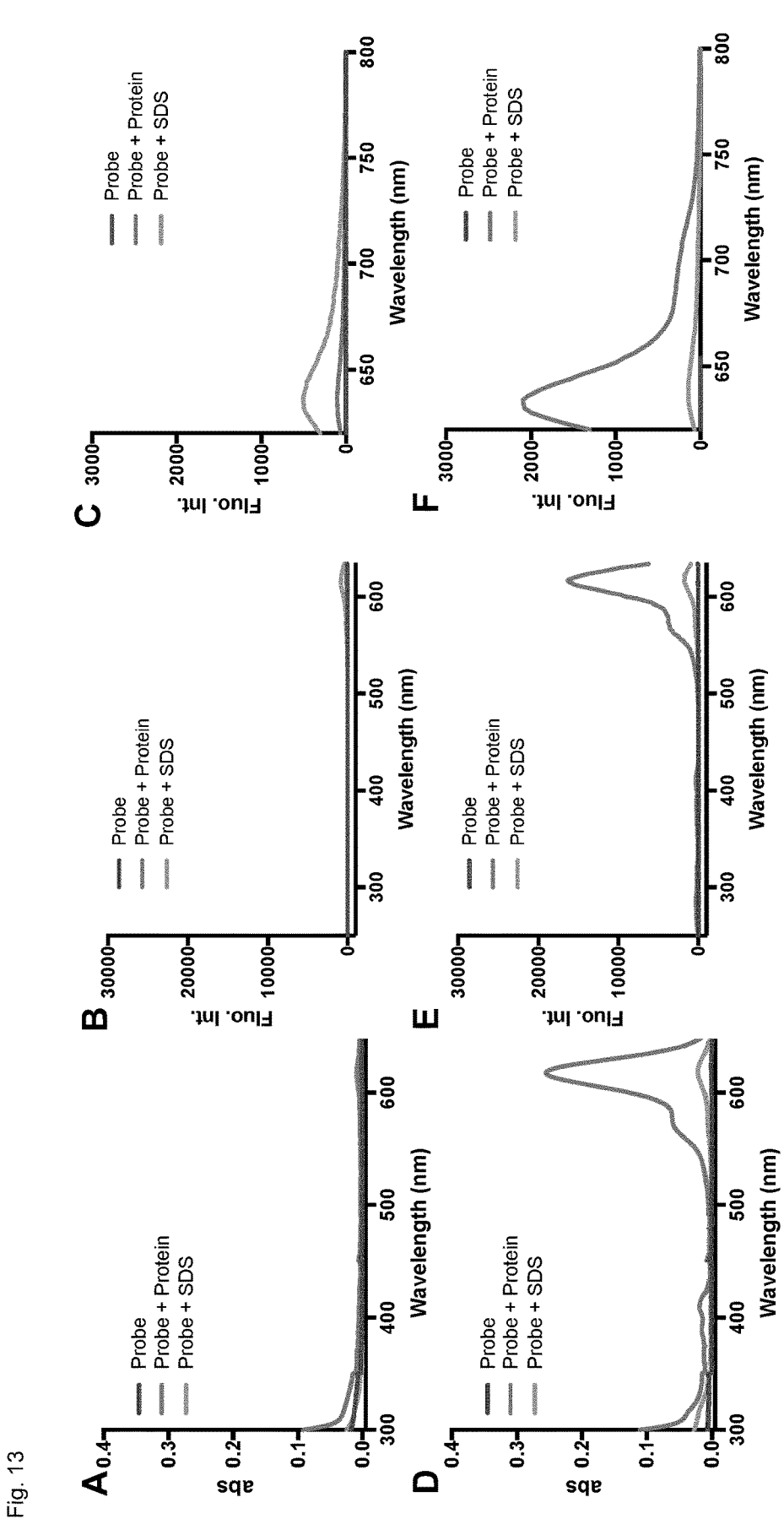
FIG. 13 The absorption (A,D), excitation (B,E) and emission (C,F) spectra of CPY-SNH2-SNAP (164) (A,B,C) and CPY-SNH2-HALO (165) (D,E,F) in the absence (blue line) and presence of tag proteins (red line) or SDS (green line). Experimental Conditions: probe: 2.5 µM, SNAP-HaloTag protein: 5 µM, SDS: 0.1%, incubation time: 1 h, 50 mM Hepes buffer (pH 7.3). $\lambda_{ex}$=600 nm, temperature: 25° C.
Figure 14:
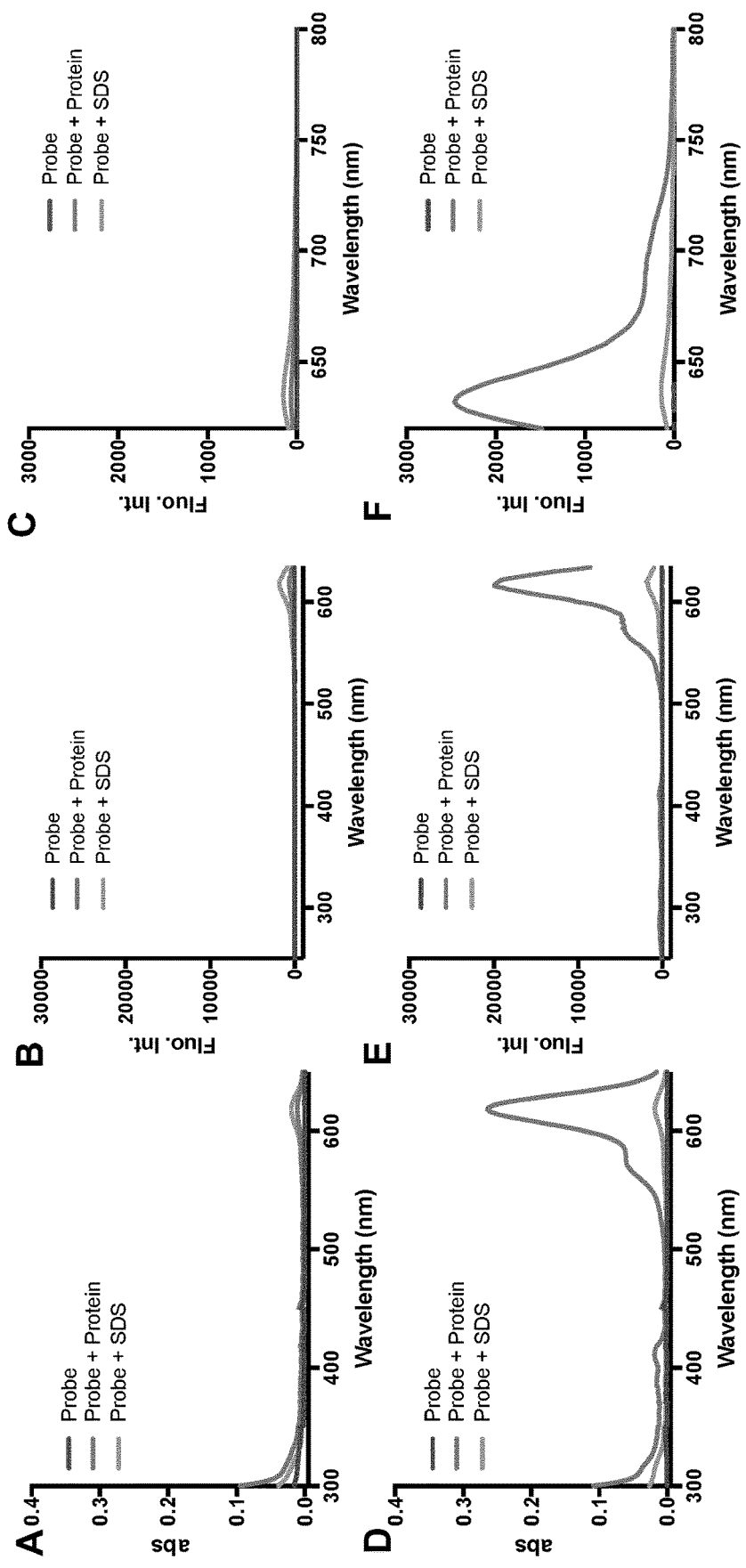
FIG. 14 The absorption (A,D), excitation (B,E) and emission (C,F) spectra of CPY-SNMe2-SNAP (166) (A,B,C) and CPY-SNMe2-HALO (167) (D,E,F) in the absence (blue line) and presence of tag proteins (red line) or SDS (green line). Experimental Conditions: probe: 2.5 µM, SNAP-HaloTag protein: 5 µM, SDS: 0.1%, incubation time: 1 h, 50 mM Hepes buffer (pH 7.3). $\lambda_{ex}$=600 nm, temperature: 25° C.
Figure 15:
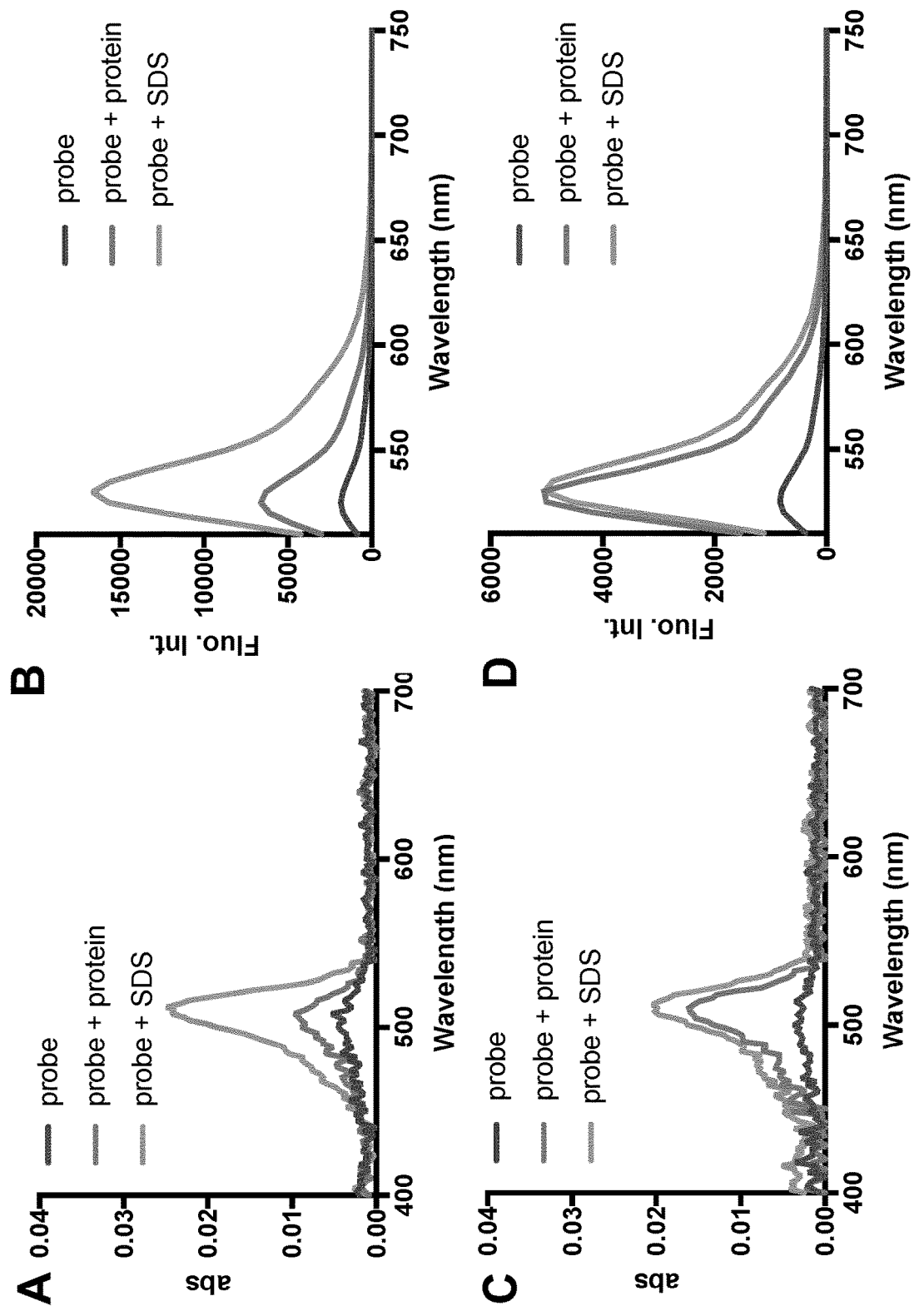
FIG. 15 The absorption (A,C) and emission (B,D) spectra of R110-SNMe2-SNAP (173) (A,B) and R110-SNMe2-HALO (174) (C,D) in the absence (blue line) and presence of tag proteins (red line) or SDS (green line). Experimental Conditions: probe: 1 µM, protein: 2 µM, SDS: 0.1%, incubation time: 1 h, 50 mM Hepes buffer (pH 7.3). $\lambda_{ex}$=480 nm.
Figure 16:
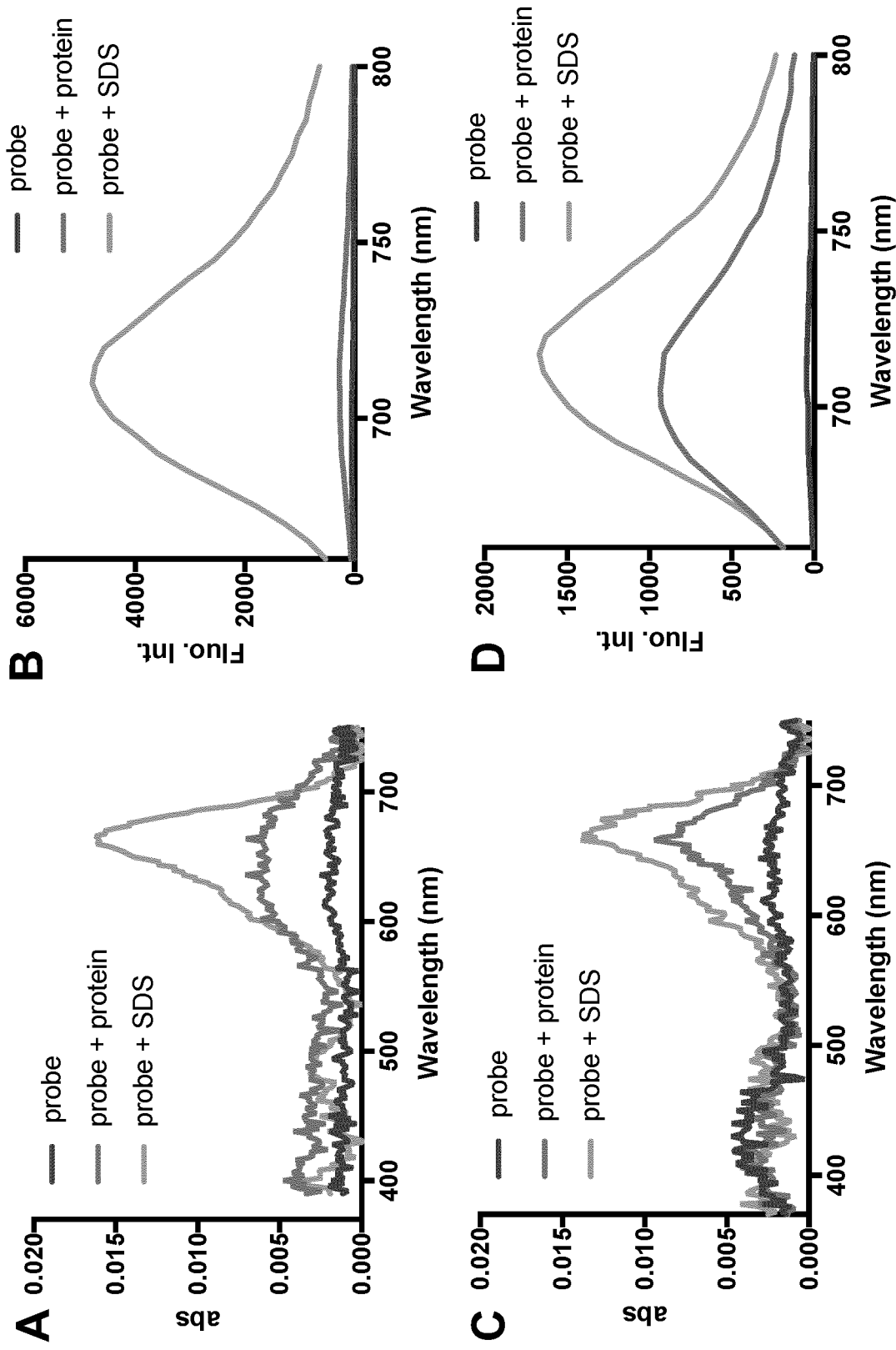
FIG. 16 The absorption (A,C) and emission (B,D) spectra of WS1-CN-SNAP (176) (A,B) and WS1-CN-HALO (177) (C,D) in the absence (blue line) and presence of tag proteins (red line) or SDS (green line). Experimental Conditions: probe: 1 µM, protein: 2 µM, SDS: 0.1%, incubation time: 1 h, 50 mM Hepes buffer (pH 7.3). $\lambda_{ex}$=630 nm.
Figure 17:
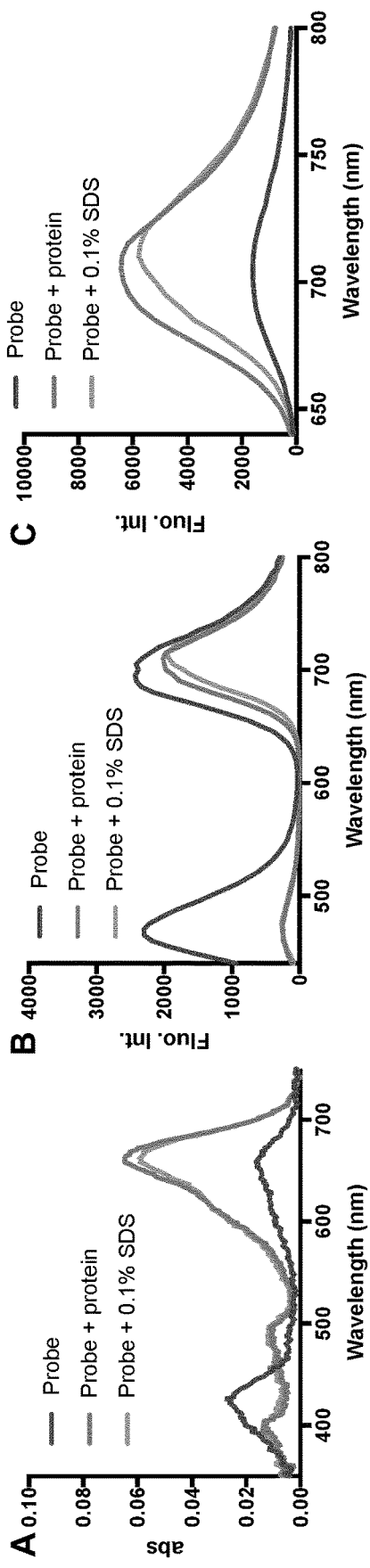
FIG. 17 The absorption (A) and emission (B,C) spectra of WS1-CN-HALO (177) in the absence (blue line) and presence of tag proteins (red line) or SDS (green line). Experimental Conditions: probe: 1.5 µM, protein: 3 µM, SDS: 0.1%, incubation time: 30 min, 0.1% Triton X-100, 50 mM Hepes buffer (pH 7.3). $\lambda_{ex}$=430 (B) and 630 (C) nm.
Figure 18:
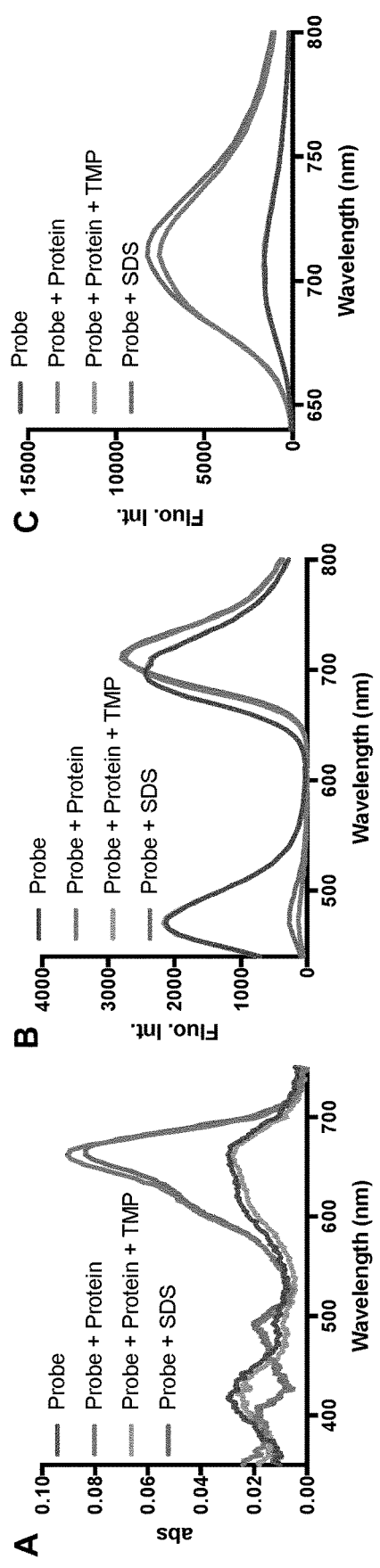
FIG. 18 The absorption (A) and emission (B,C) spectra of WS1-CN-TMP (178) in the absence (blue line) and presence of proteins ecDHFR (red line), Trimethoprim (TMP) or SDS (green line). Experimental Conditions: probe: 2.5 µM, protein: 5 µM, TMP: 1 mM, SDS: 0.1%, incubation time: 10 min, 0.1% Triton X-100, 50 mM Hepes buffer (pH 7.3). $\lambda_{ex}$=430 (B) and 630 (C) nm.
Figure 19:
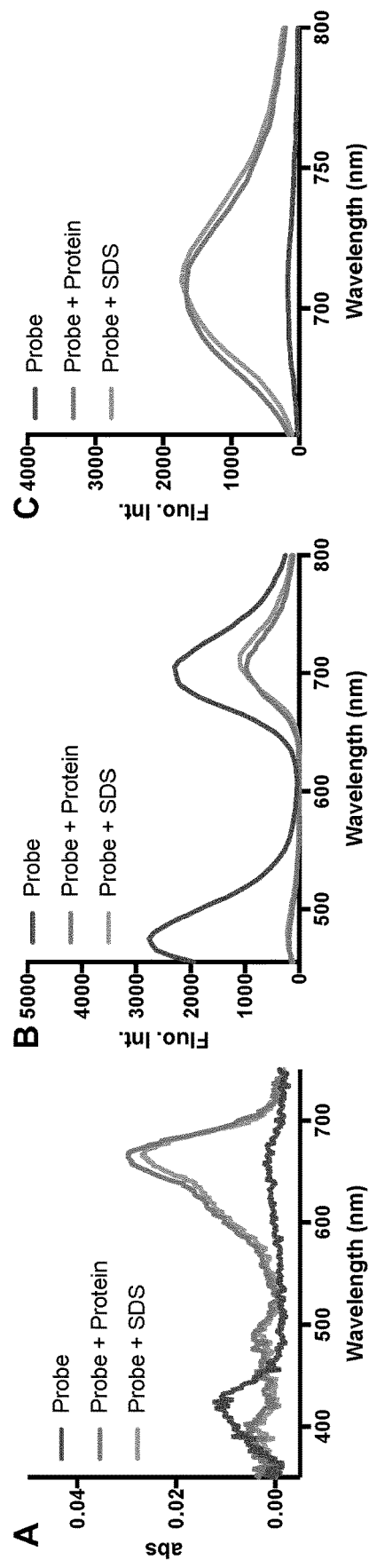
FIG. 19 The absorption (A) and emission (B,C) spectra of WS1-SCH3-HALO (179) in the absence (blue line) and presence of tag-proteins (red line) or SDS (green line). Experimental Conditions: probe: 1 µM, protein: 2 µM, SDS: 0.1%, incubation time: 30 min, 0.1% Triton X-100, 50 mM Hepes buffer (pH 7.3). $\lambda_{ex}$=430 (B) and 630 (C) nm.
Figure 20:
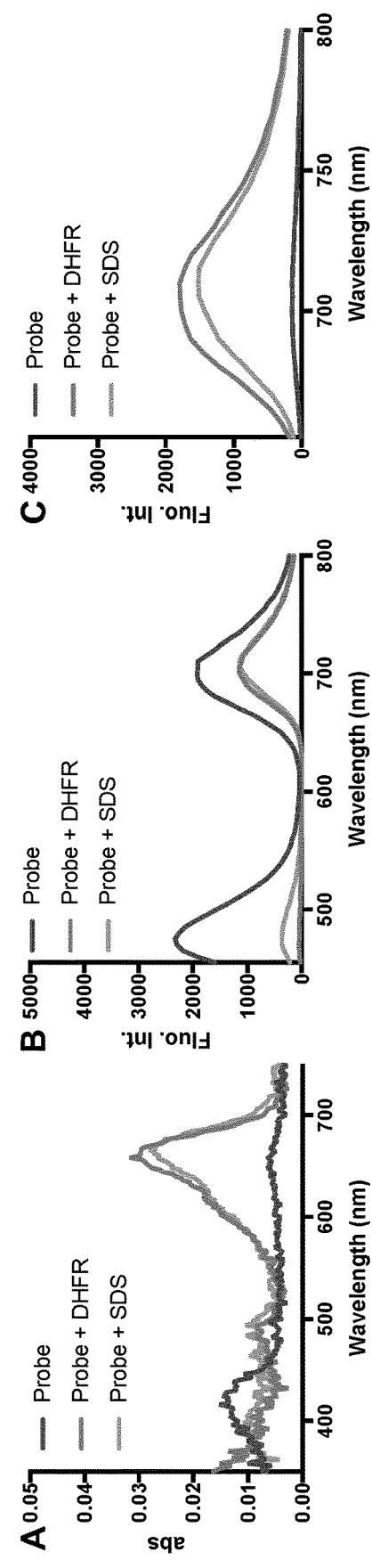
FIG. 20 The absorption (A) and emission (B,C) spectra of WS1-SCH3-TMP (180) in the absence (blue line) and presence of proteins ecDHFR (red line) or SDS (green line). Experimental Conditions: probe: 1 µM, protein: 5 µM, SDS: 0.1%, incubation time: 10 min, 0.1% Triton X-100, 50 mM Hepes buffer (pH 7.3). $\lambda_{ex}$=430 (B) and 630 (C) nm.
Figure 21:
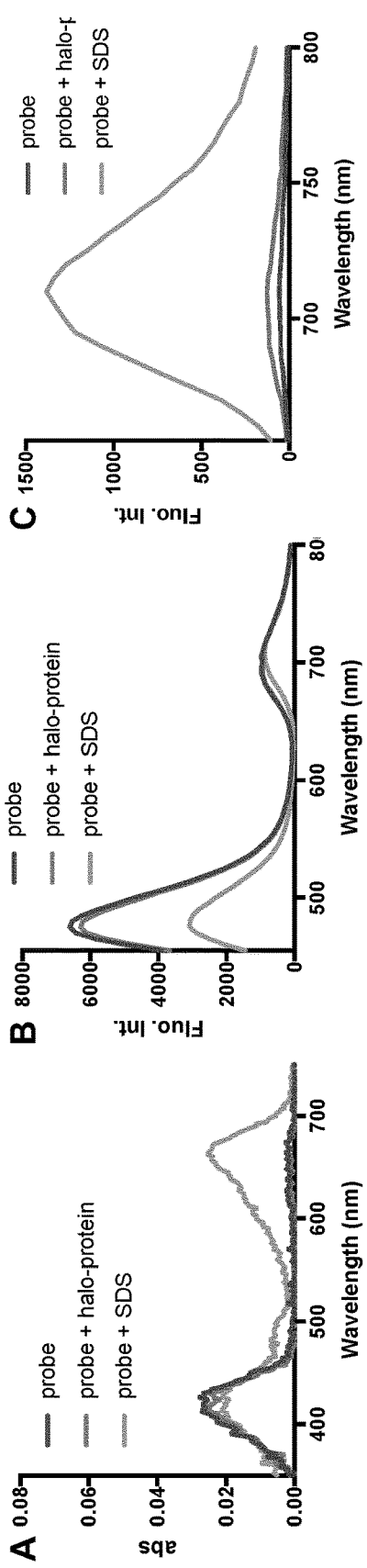
FIG. 21 The absorption (A) and emission (B,C) spectra of WS1-SNH2-HALO (181) in the absence (blue line) and presence of tag-proteins (red line) or SDS (green line). Experimental Conditions: probe: 1 µM, protein: 2 µM, SDS: 0.1%, incubation time: 30 min, 0.1% Triton X-100, 50 mM Hepes buffer (pH 7.3). $\lambda_{ex}$=430 (B) and 630 (C) nm.
Figure 22:
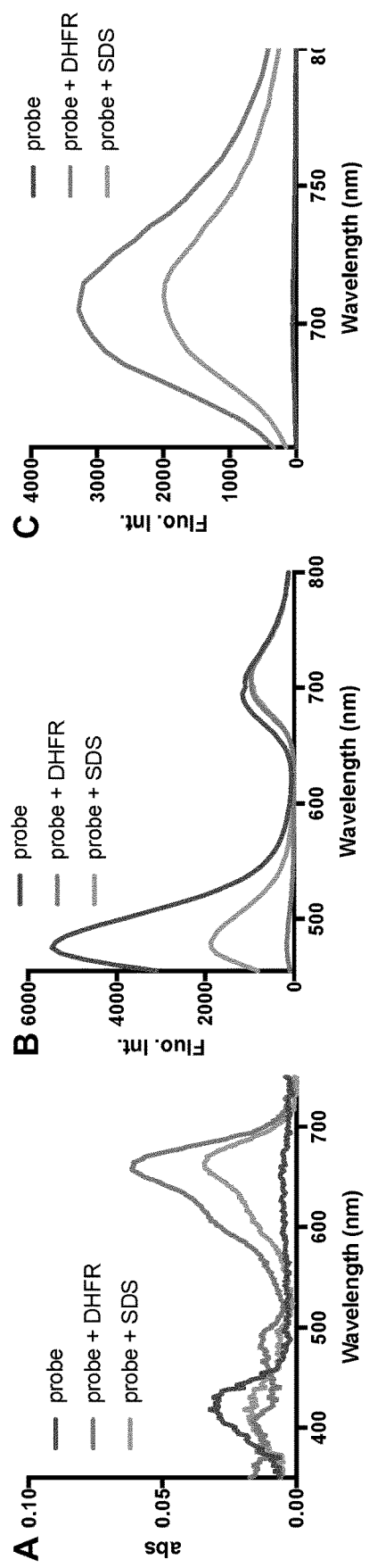
FIG. 22 The absorption (A) and emission (B,C) spectra of WS1-SNH2-TMP (182) in the absence (blue line) and presence of proteins ecDHFR (red line) or SDS (green line). Experimental Conditions: probe: 2 µM, protein: 5 µM, SDS: 0.1%, incubation time: 10 min, 0.1% Triton X-100, 50 mM Hepes buffer (pH 7.3). $\lambda_{ex}$=430 (B) and 630 (C) nm.
Figure 23:
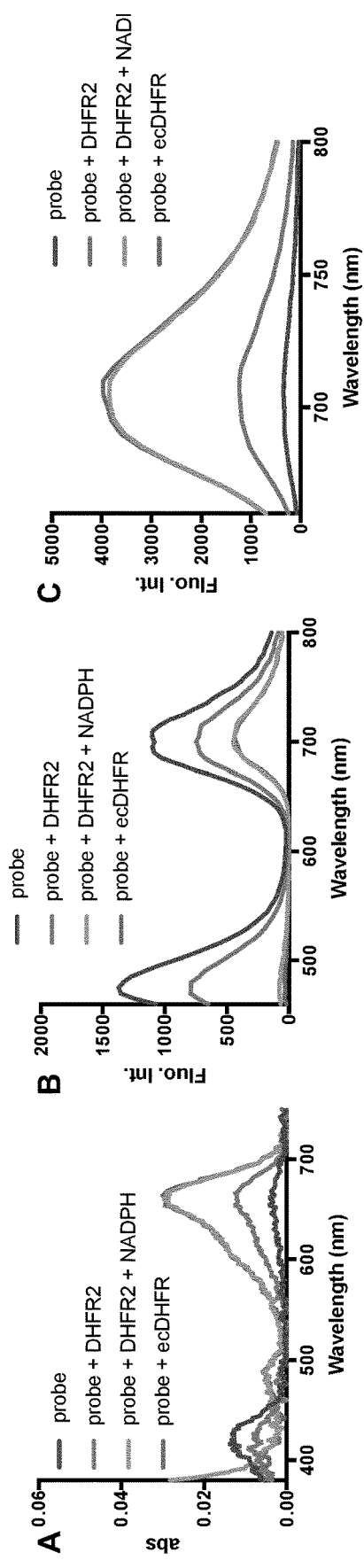
FIG. 23 The absorption (A) and emission (B,C) spectra of WS1-SCH3-TMP (180) in the absence (blue line) and presence of proteins DHFR2 and NADPH. Experimental Conditions: probe: 1 µM, protein: 5 µM, NADPH: 1, 10, 100 µM, incubation time: 10 min, 0.1% Triton X-100, 50 mM Hepes buffer (pH 7.3). $\lambda_{ex}$=430 (B) and 630 (C) nm.
Figure 24:
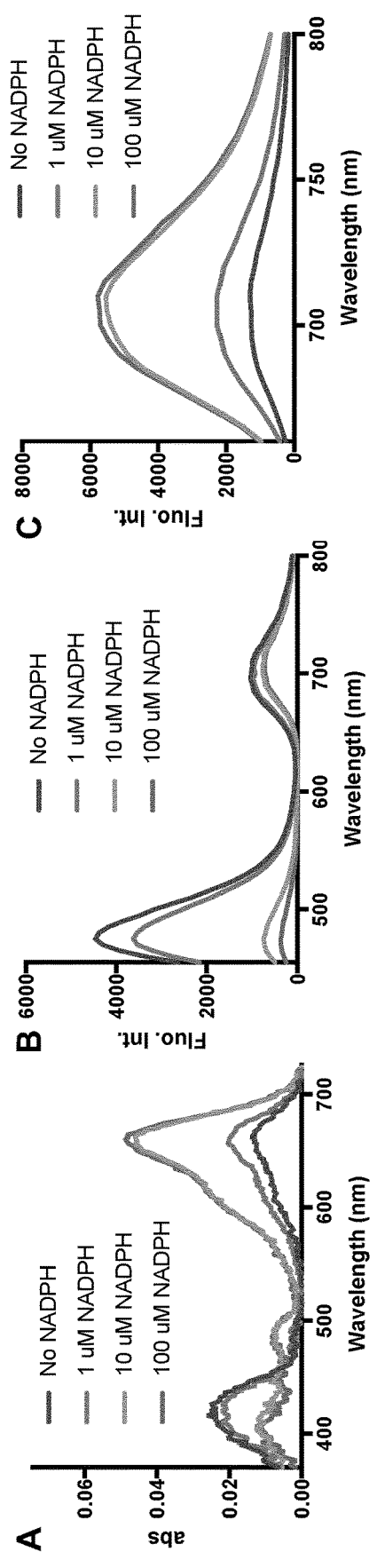
FIG. 24 The absorption (A) and emission (B,C) spectra of WS1-SNH2-TMP (182) in the absence (blue line) and presence of proteins DHFR2 and NADPH. Experimental Conditions: probe: 1.5 µM, protein: 5 µM, NADPH: 1, 10, 100 µM, incubation time: 10 min, 0.1% Triton X-100, 50 mM Hepes buffer (pH 7.3). $\lambda_{ex}$=430 (B) and 630 (C) nm.
Figure 25:
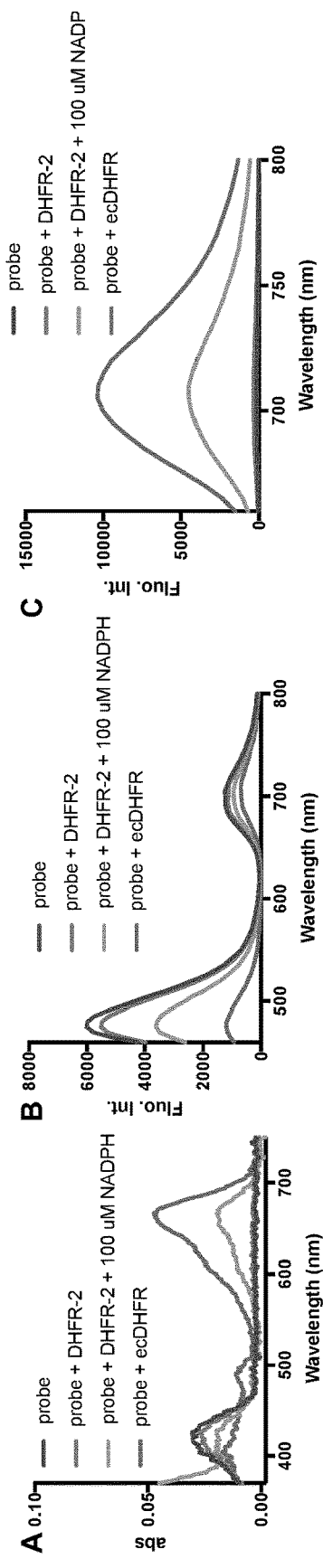
FIG. 25 The absorption (A) and emission (B,C) spectra of WS1-SNH2-TMP-C6 (183) in the absence (blue line) and presence of proteins DHFR2 and NADPH. Experimental Conditions: probe: 1.5 µM, protein: 5 µM, NADPH: 100 µM, incubation time: 10 min, 0.1% Triton X-100, 50 mM Hepes buffer (pH 7.3). $\lambda_{ex}$=430 (B) and 630 (C) nm.
Figure 26:
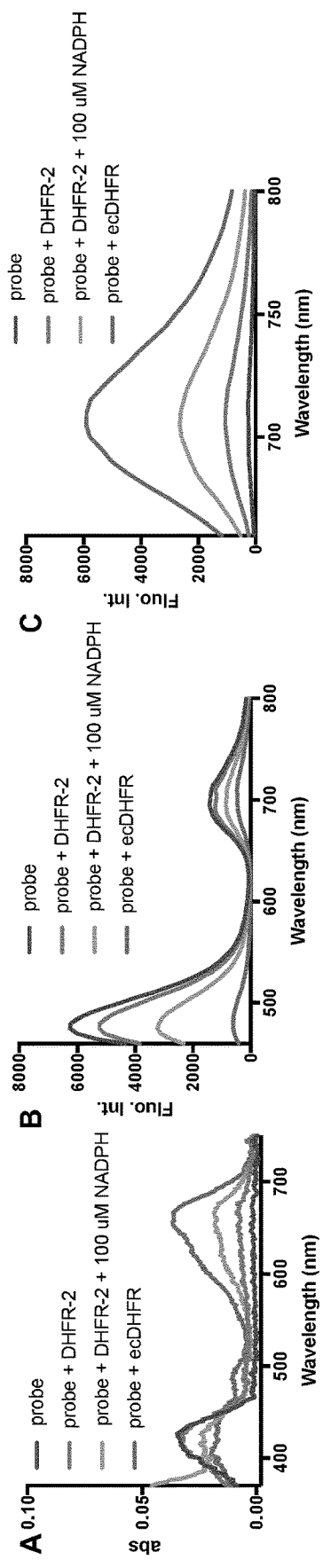
FIG. 26 The absorption (A) and emission (B,C) spectra of WS1-SNH2-TMP-C8 (184) in the absence (blue line) and presence of proteins DHFR2 and NADPH. Experimental Conditions: probe: 1.5 µM, protein: 5 µM, NADPH: 100 µM, incubation time: 10 min, 0.1% Triton X-100, 50 mM Hepes buffer (pH 7.3). $\lambda_{ex}$=430 (B) and 630 (C) nm.
Figure 27:
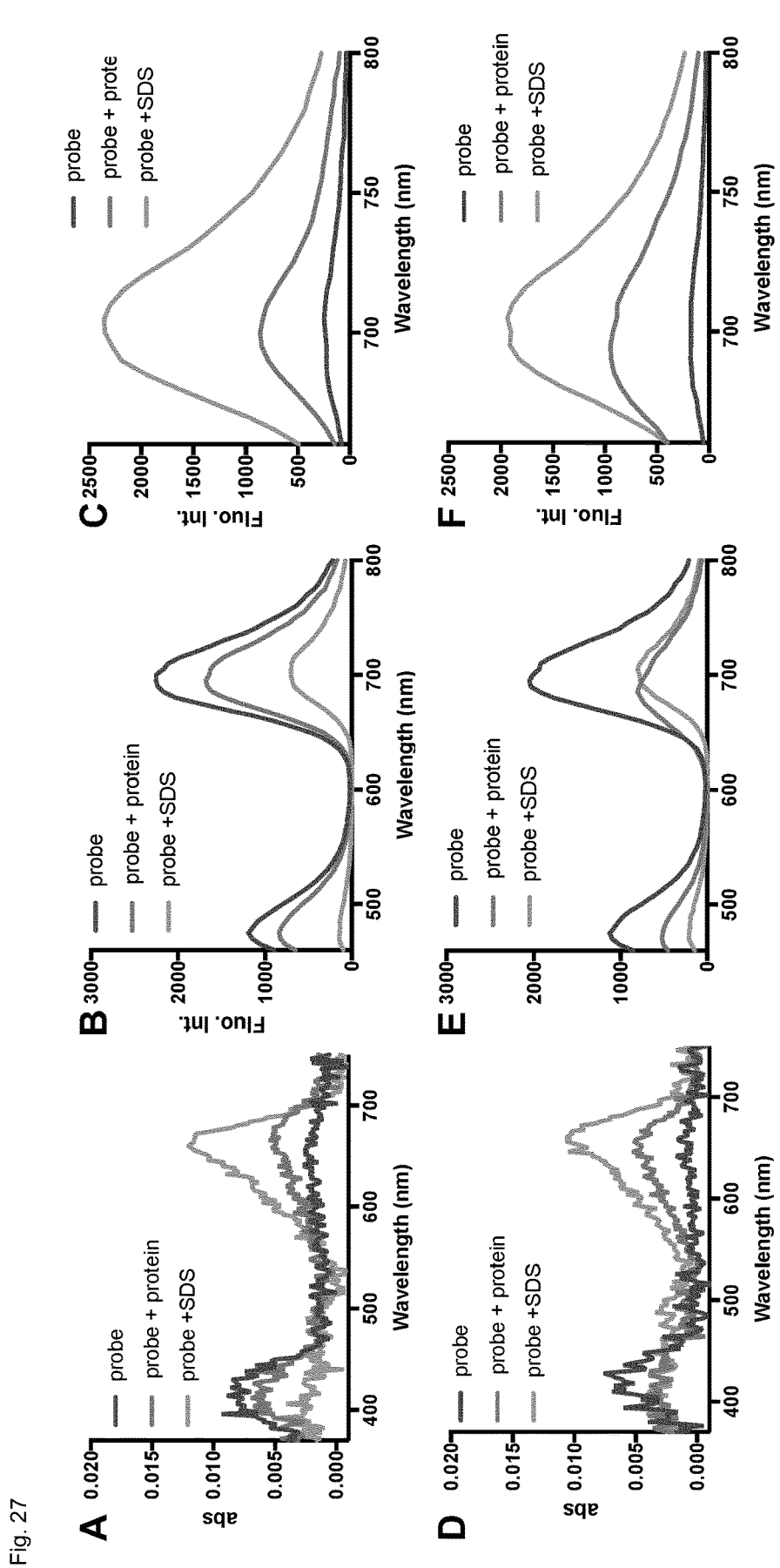
FIG. 27 The absorption (A,D) and emission (B,C,E,F) spectra of WS1-SCH2-C3-SNAP (125) (A-C) and WS1-SCH2-C3-HALO (126) (D-F) in the absence (blue line) and presence of tag-proteins (red line) or SDS (green line). Experimental Conditions: probe: 0.5 µM, protein: 1 µM, SDS: 0.1%, incubation time: 3 h, 0.1% Triton X-100, 50 mM Hepes buffer (pH 7.3). $\lambda_{ex}$=430 (B,E) and 630 (C,F) nm.
Figure 28:
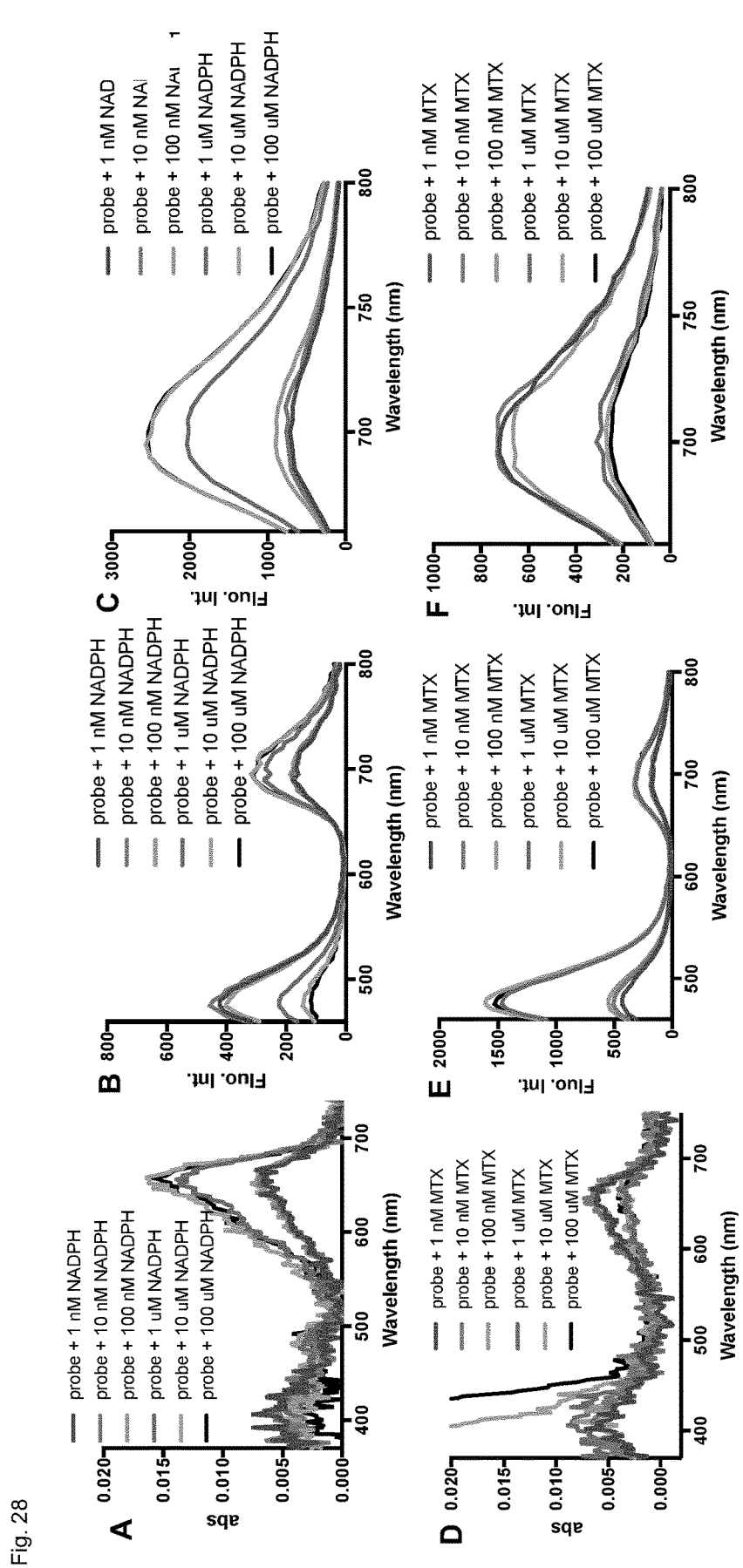
FIG. 28 A-I) The absorption (A,D,E) and emission (B,C,E,F,H,I) spectra of sensor protein WS1-SNH2-TMP-PEG5BG_DHFR2 (191) in the presence of NADPH (A-C), MTX (D-F), and (G-I). J,K) Titration of fluorescence intensity ratio (710 nm/485 nm) as a function of NADPH (I), MTX and TMP (K) concentration. Experimental Conditions: sensor protein: 0.5 µM, NADPH: 1 nM-100 µM, TMP: 100 nM-2.5 mM, MTX: 1 nM-100 µM, incubation time: 60 min, 50 mM Hepes buffer (pH 7.3) with 0.5 mg/mL BSA. $\lambda_{ex}$=430 (B,E,H) and 630 (C,F,I) nm.
Figure 28:
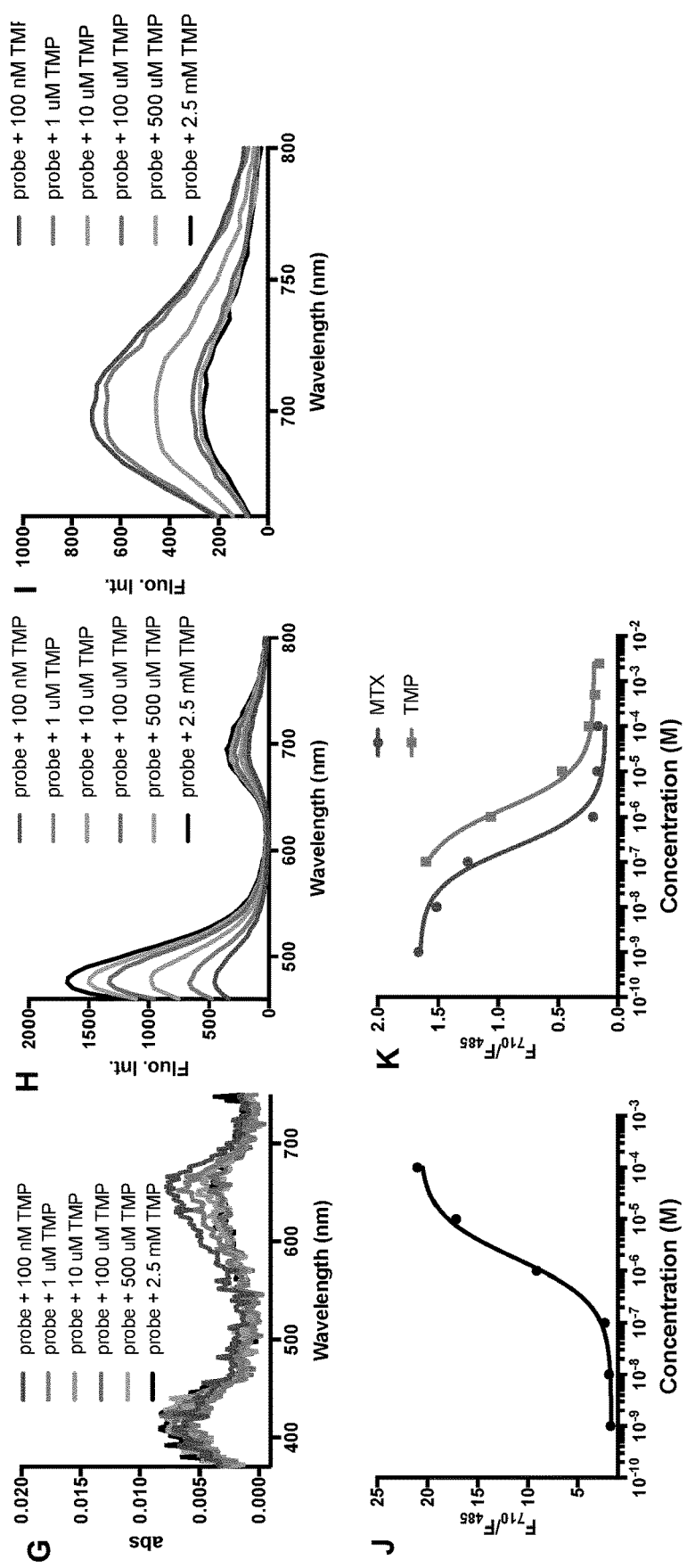
Figure 29:
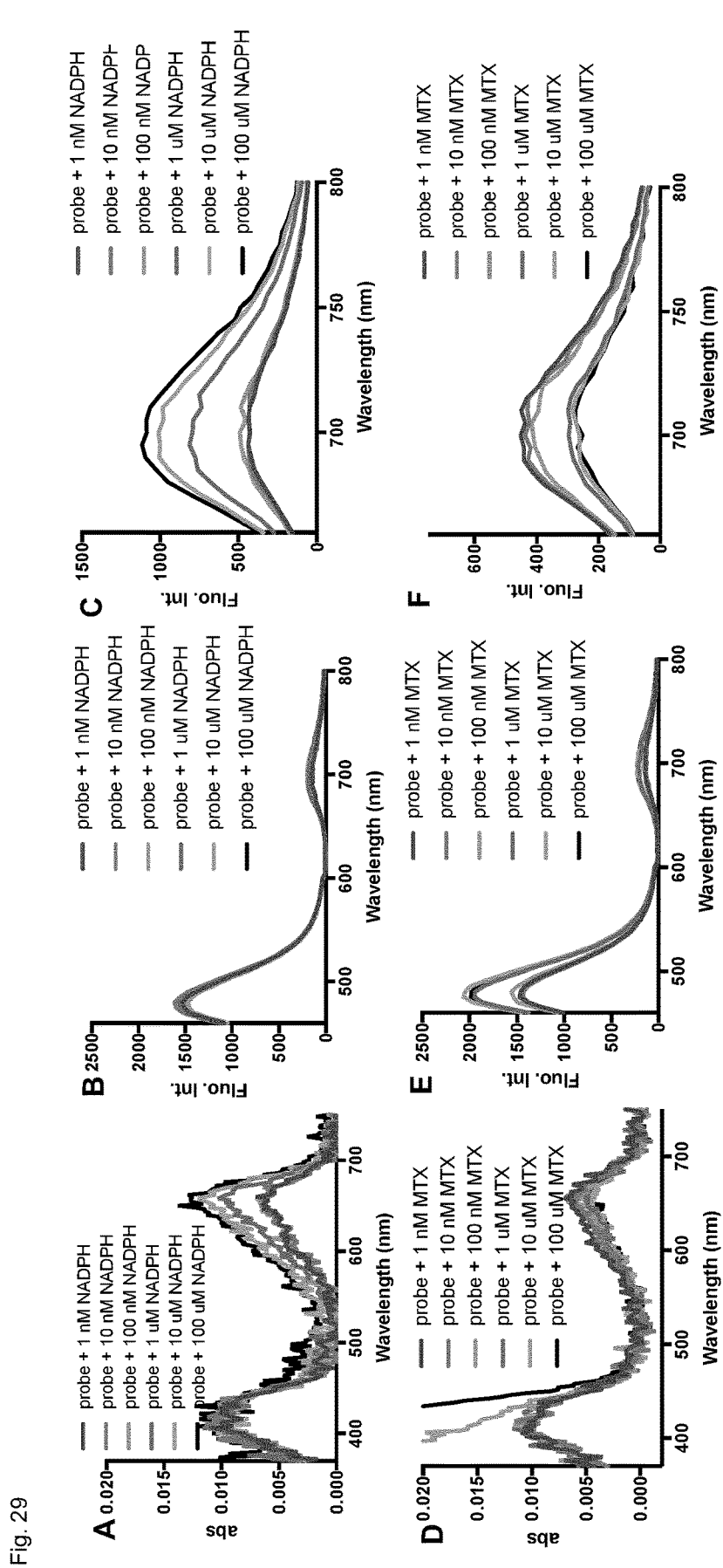
FIG. 29 A-I) The absorption (A,D,E) and emission (B,C,E,F,H,I) spectra of sensor protein WS1-SNH2-TMP-PEG2BG_DHFR2 (192) in the presence of NADPH (A-C), MTX (D-F), and (G-I). J,K) Titration of fluorescence intensity ratio (710 nm/485 nm) as a function of NADPH (I), MTX and TMP (K) concentration. Experimental Conditions: sensor protein: 0.5 µM, NADPH: 1 nM-100 µM, TMP: 100 nM-2.5 mM, MTX: 1 nM-100 µM, incubation time: 60 min, 50 mM Hepes buffer (pH 7.3) with 0.5 mg/mL BSA. $\lambda_{ex}$=430 (B,E,H) and 630 (C,F,I) nm.
Figure 29:
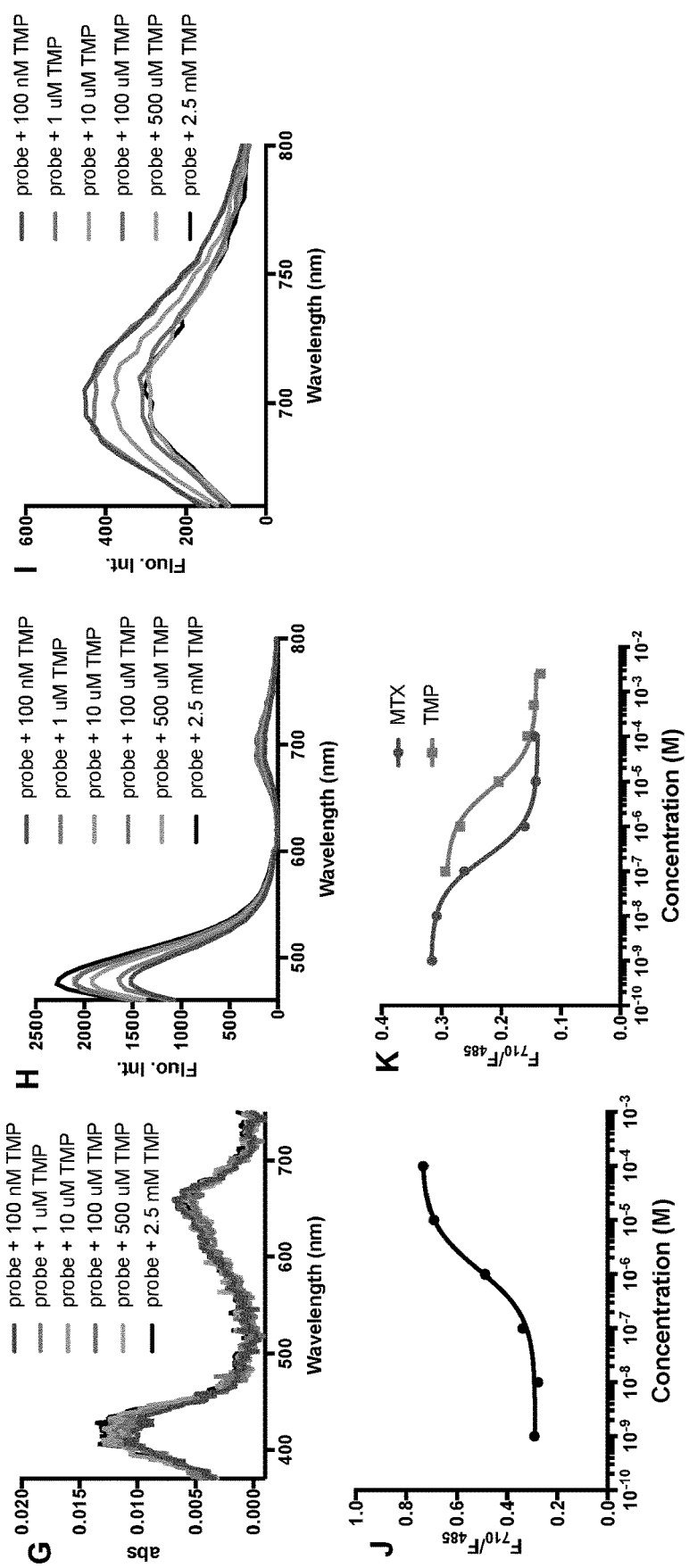

FIG. 3 shows that the fluorophores are not sensitive to physiological pH (pH 6-8).

FIG. 4-22 show that the fluorophores of the invention can change their absorbance and fluorescence intensities significantly after binding with targeting proteins. The term fluorogenicity is also applied to this behaviour.

FIG. 23-29 show that the fluorophores of the invention can be used to detect drugs, such as TMP (trimethoprim), MTX (methotrexate), and biomolecules, such as NADPH.

Figure 30:
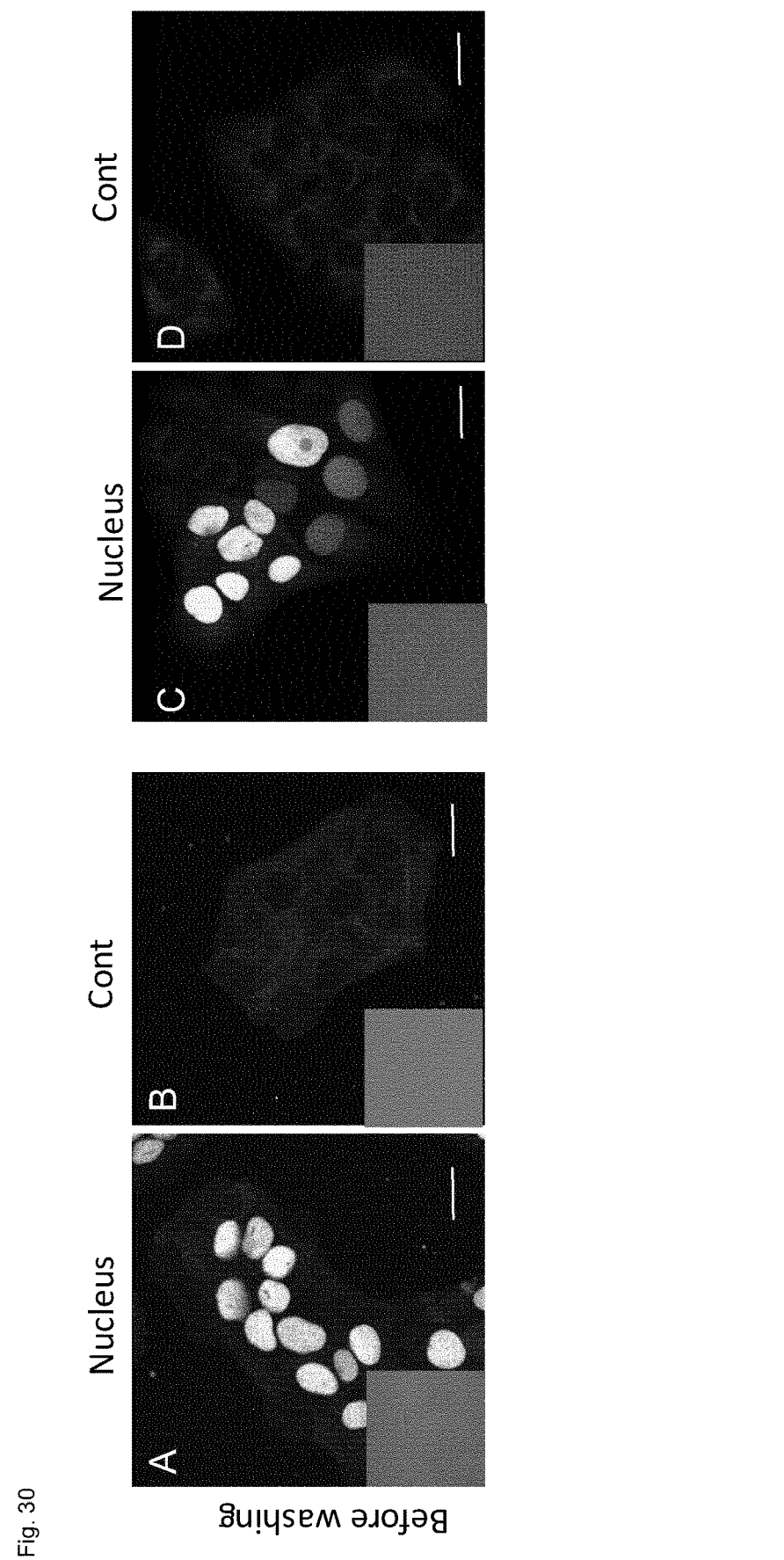
FIG. 30 Confocal fluorescence microscopy of live U2OS FlpIn Halo-SNAP-NLS expressing cells, labelled with 50 nM of RhB-SNH2-SNAP (146) (A) and RhB-SNH2-HALO (147) (C) for 1 h respectively and imaged directly without washing process. Confocal fluorescence microscopy of live empty U2OS cells stained with RhB-SNH2-SNAP (146) (B) and RhB-SNH2-HALO (147) (D) without washing process. Scale bar: 20 µm. Experimental conditions: $\lambda_{ex}$=540 nm, emission filter: 560-700 nm. Verapamil: 2 µM.
Figure 31:
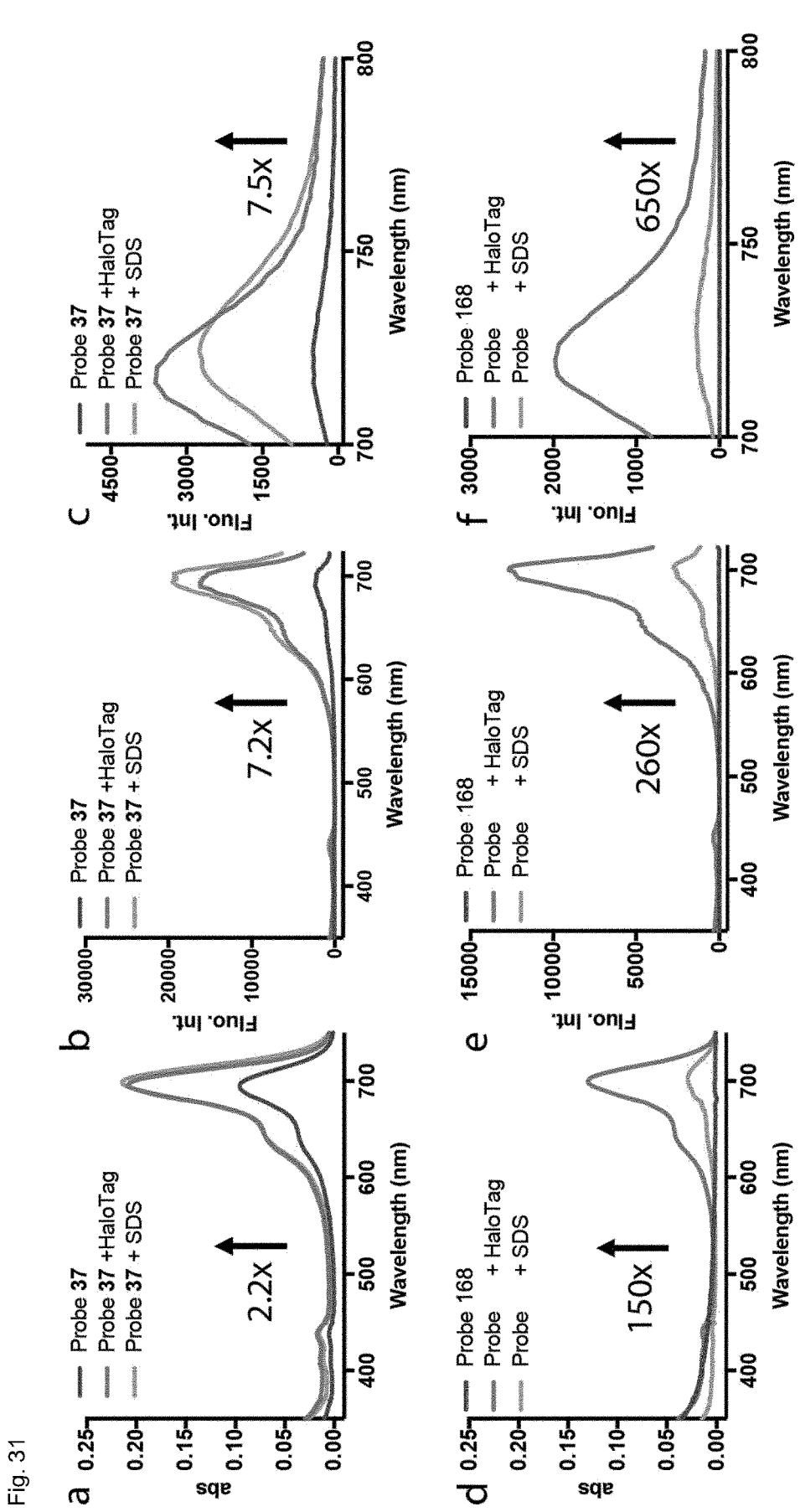
FIG. 31 Response of probe 37 and MaP700-Halo (168) to HaloTag. Absorption (a, d), excitation (b, e) and emission (c, f) spectra of 2.5 µM probe 37 (a-c), and MaP700-Halo (168) (d-f) measured in the absence (blue line) and presence of HaloTag (5 µM, red line) or SDS (0.1%, green line) after 1 h incubation. The numbers indicate the ratio of absorbance at 700 nm, fluorescence intensities at 740 nm ($\lambda_{ex}$: 700 nm) or fluorescence intensities at 720 nm ($\lambda_{ex}$: 670 nm) in the presence and absence of HaloTag. n=3. HEPES buffer: pH 7.3.

The cell image of FIG. 30 shows that the fluorophores of the invention can stain the target proteins with excellent signal to background ratio in live cells without any washing process.

Example 1: Designing Cell-Permeable and Fluorogenic Rhodamine Derivatives

Figure 32:
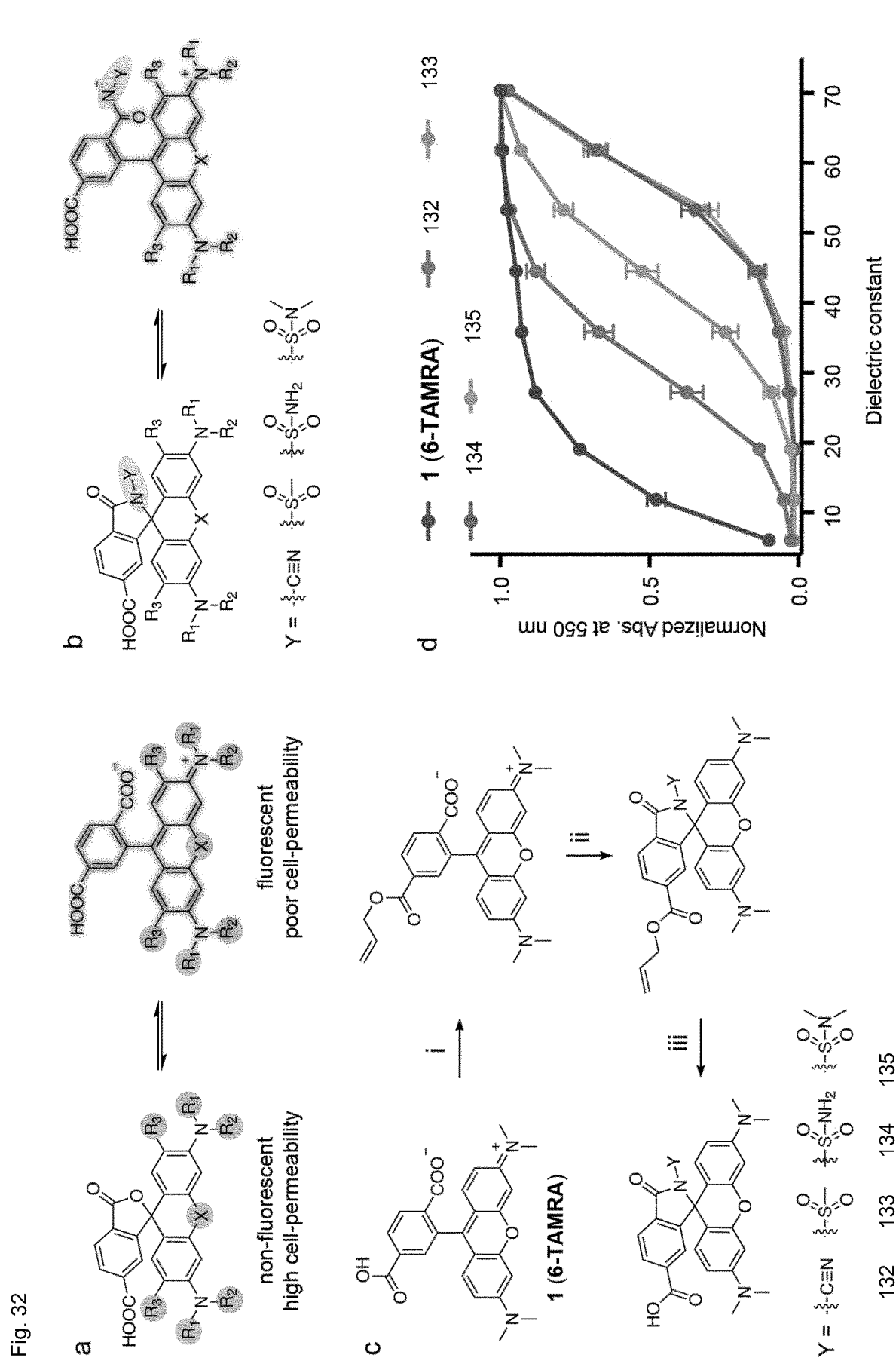
FIG. 32 Design strategies for developing cell permeable fluorophores. (a) General structure of rhodamines and the equilibrium between the fluorescent zwitterion and the non-fluorescent spirolactone. $R_1$-$R_3$ (blue circles) denote the positions used for introducing electron-withdrawing groups to favor spirolactone formation. (b) General structure of rhodamines and the equilibrium between the fluorescent zwitterion and the non-fluorescent spirolactam. Y (green circle) denotes position for introducing electron-withdrawing groups to disfavor spirolactam formation. (c) Synthetic route for preparation of rhodamines (132-135). (i) allyl bromide, $K_2CO_3$, $Et_3N$, DMF, r.t. 2 h; (ii) $POCl_3$, DCM, reflux, 3 h; amines, ACN, DIPEA, r.t. 1 h; (iii) 1,3-Dimethylbarbituric acid/Pd(PPh$_3$)$_4$, MeOH/DCM, r.t. 1 h. (d) Normalized absorbance at 550 nm in zwitterionic form of 5 µM of 6-TAMRA (1) and derivatives (132-135) in water-dioxane mixtures (v/v: 10/90-90/10) as a function of dielectric constant. Error bars show±s.d. n=3.

The inventors' efforts to improve the permeability and fluorogenicity of rhodamine derivatives for live-cell imaging focused on increasing the propensity of rhodamines to form the spirocyclic, non-fluorescent form without affecting the spectroscopic properties of the parental molecule. The inventors initially considered replacing the carboxylic acid responsible for formation of the spirolactone with an amide. However, such rhodamine derivatives have been reported to strongly favor spirolactams at physiological pH, making them unsuitable for live-cell imaging. The inventors therefore attempted to destabilize the spirolactam by attaching different electron-withdrawing groups to the underlying amides. Specifically, the inventors converted 6-carboxytetramethylrhodamine (6-TAMRA), a widely used fluorophore with good photophysical properties, into the corresponding acyl cyanamide (132), acyl sulfonamide (133) and acyl sulfamide (134 and 135), (FIG. 32c). The acyl cyanamide of rhodamine B was previously reported to exist as a fluorescent zwitterion at physiological pH. Acyl sulfonamides and acyl sulfamides are used in medicinal chemistry as anionic pharmacophores. Amides 132-135 were prepared in three simple steps from commercially available 6-TAMRA (FIG. 32c). To investigate the propensity of these amides to form the corresponding spirolactams, the inventors measured their absorbance spectra in water-dioxane mixtures with different ionic strength. The equilibrium between the zwitterionic and spirocyclic form can then be characterized by the $D_{50}$ value, which is defined as the dielectric constant at which absorbance of the fluorescent zwitterion is decreased by half compared to the highest recorded absorbance value measured in dioxane-water mixtures. Rhodamine-based fluorophore with $D_{50}$ values around 50 have been shown to be suitable candidates for the generation of fluorogenic probes. In comparison, the $D_{50}$ value of TAMRA is around 10 showing that in aqueous solution TAMRA exists predominantly in its open form and TAMRA-based probes are usually not fluorogenic. The measured $D_{50}$ values of amides 132-135 ranged from 32 to around 60 (FIG. 32d), which indicates the potential of these fluorophores for the generation of permeable and fluorogenic probes. Importantly, the spectroscopic properties of amides 132-135 do not differ significantly from 6-TAMRA. The possibility to tune the equilibrium between the open and closed form of the fluorophore by varying the substituents on the amide is an important feature of this approach.

Example 2: Cell-Permeable and Fluorogenic TAMRA Derivatives for No-Wash Live-Cell Imaging Self-labeling protein tags such as SNAP-tag and HaloTag are an efficient approach to attach synthetic fluorophores to proteins in living cells. The main challenge when using these tags for live-cell imaging is the low cell permeability of most fluorescent probes used for labeling and high background signal resulting from their unspecific binding. SNAP-tag fusion proteins can be specifically labeled with different fluorophores using appropriate $O^6$-benzlyguanine derivatives. A 6-TAMRA based probe (150) for SNAP-tag has been previously introduced for live-cell imaging, but its low cell-permeability and lack of fluorogenicity requires the use of high concentrations (5 μM) and repeated washing steps to remove excess and non-specifically bound probe. To address these problem, the inventors coupled fluorophores 132-135 to $O^6$-benzylguanine to obtain probes 152, 154, 156, and 158. In vitro characterization of the spectroscopic properties of these probes in the presence and absence of SNAP-tag showed that in particular probe 158 containing the N,N-dimethylsulfamide group (in the following abbreviated as MaP555-SNAP) showed a significant increase in absorbance and fluorescence upon binding to SNAP-tag: the absorbance at 555 nm increases 15-fold and the intensity of fluorescence emission at 580 nm increases 21-fold. The inventors then examined the performance of probes 150, 152, 154, 156, and 158 in live-cell imaging, in which U2OS cells stably expressing a nuclear localized SNAP-Halo fusion protein were co-cultured with regular U2OS cells not expressing any protein tags. The performance of the probes in the in vitro tests correlated also with their performance in live-cell imaging: MaP555-SNAP even at a very low concentration (250 nM) allowed to perform wash-free labeling with excellent nuclei to cytosol signal ratio ($F_{nuc}/F_{cyt}$=15), while labeling with control probe 150 under identical conditions only lead to a barely detectable signal. Furthermore, the kinetics of labeling of nuclear localized SNAP-tag with MaP555-SNAP were much faster than those of control probe 6. The inventors then prepared the corresponding 6-TAMRA-based probes 151, 153, 155, 157, and 159 for HaloTag. As for SNAP-tag, the probe with the largest enhancement in absorbance (16-fold) and fluorescence intensity (35-fold) in in vitro assays was based on the N,N-dimethylsulfamide derivative 159 (abbreviated as MaP555-Halo in the following). In no-wash live-cell imaging experiments, MaP555-Halo furthermore showed much lower background signal than control probe 151, as most of MaP555-Halo exist as the non-fluorescent spirolactam prior to binding to HaloTag. Furthermore, the intracellular kinetics of labeling of nuclear HaloTag with MaP555-Halo were about two-fold faster than with control probe 151. The excellent performance of MaP555-SNAP and MaP555-Halo in live-cell imaging experiments support the inventors' assumption that establishing a dynamic equilibrium between the fluorescent zwitterion and the more hydrophobic spirolactam enables the generation of highly cell-permeable and fluorogenic probes for live-cell imaging.

Fluorescent probes for live-cell imaging of cytoskeletal structures have become important tools in the life sciences. In particular, the far-red, SiR-based probes for F-actin (SiR-actin) and microtubules (SiR-tubulin) have become popular as they are fluorogenic and enable no-wash imaging with little background signal. SiR-actin and SiR-tubulin are based on SiR linked to the F-actin-binder jasplakinolide and microtubule-binder docetaxel, respectively. Binding to their targets shifts for both probes the equilibrium between the cell-permeable spirolactone and the fluorescent zwitterion towards the fluorescent form. To generate fluorescent stains for F-actin and microtubule in different colors, the inventors coupled jasplakinolide and docetaxel to 6-TAMRA and its N,N-dimethylsulfamide derivative (probes 169 and 172, named MaP555-actin and MaP555-tubulin in the following). As expected, the 6-TAMRA derivatives of jasplakinolide and docetaxel did not allow to perform live-cell imaging of F-actin and microtubules in U2OS cells, presumably because these probes predominantly exist as zwitterions with low permeability. In contrast, MaP555-actin and MaP555-tubulin enabled no-wash, high-contrast staining of F-actin and microtubules in U2OS cells. The specificity of MaP555-actin and MaP555-tubulin was further confirmed by co-staining with SiR-actin and SiR-tubulin. The performance of both probes can be rationalized by their fluorogenicity: In in vitro assays, MaP555-actin showed a large increase in absorbance (26-fold) and fluorescence intensity (107-fold) upon binding to F-actin. Similarly, binding of MaP555-tubulin to microtubules caused a high increase in absorbance (5.8-fold) and fluorescence (11-fold).

Example 3: Extension of the Strategy to Other Rhodamine Derivatives

Encouraged by the outstanding performance of these new TAMRA-based probes, the inventors extended their design strategy to other commonly used rhodamine derivatives with wavelengths ranging from cyan to near-infrared. Rhodamine 110 (R110) is a classic fluorophore emitting cyan fluorescence with good photostability and photophysical properties. However, its low $D_{50}$ value of 15 and the presence of two polar $NH_2$ groups results in low cell permeability of R110-based probes. Live-cell imaging of R110-based probes thus often requires high concentrations, long incubation times, and tedious washing steps. The introduction of N,N-dimethylsulfamide into R110 to yield fluorophore MaP510 shifted its $D_{50}$ from 15 to 70. The corresponding probe for HaloTag, MaP510-Halo showed a large increase response in absorbance and fluorescence (14-fold and 11-fold, respectively) upon binding to HaloTag in vitro. In contrast, the regular R110-based HaloTag probe showed no significant fluorogenicity. In addition, MaP510-Halo even at a low concentration (250 nM) resulted in fast staining (<30 min) of nuclear localized HaloTag in U2OS cells with high signal to background ratio (18-fold), whereas the control compound showed a much lower signal to background ratio (2.5-fold) under these conditions.

The inventors next applied this strategy to carbopyronine, an orange fluorophore whose brightness and photostability make it an attractive choice for confocal and superresolution microscopy. Introduction of the cyanamide, sulfonamide and the two sulfamides into carbopyronine, allowed the inventors to generate HaloTag probes 161, 163, 165, and 167. All four probes showed large increases in fluorescence intensities upon binding to HaloTag, with values ranging from 100- to a 1000-fold. In contrast, the regular carbopyronine HaloTag probe only showed a 3.8-fold increase in fluorescence upon HaloTag binding. The observed 1000-fold increase in fluorescence intensity of probe 167 (in the following named MaP618-Halo) and its brightness sets this probe apart from other fluorogenic HaloTag substrates reported previously. The outstanding fluorogenicity of MaP618-Halo and the other carbopyronine-based probes 161, 163, 165, and 167 make them powerful probe for live-cell imaging: no-wash live-cell imaging of U2OS cells expressing nuclear localized HaloTag showed bright nuclei with extremely low unspecific extranuclear fluorescence ($F_{nuc.}/F_{cyt.}$=58). In contrast, labeling with the regular carbopyronine probe resulted in significantly higher unspecific extranuclear fluorescence ($F_{nuc.}/F_{cyt.}$=6.8). Furthermore, labeling with MaP618-Halo was very rapid and reached saturation within 5 min.

In addition, the inventors coupled the acyl sulfonamide of carbopyronine to jasplakinolide, yielding the actin probe MaP618-actin (171). MaP618-actin possesses orange fluorescence ($\lambda_{ex}/\lambda_{em}$: 618/635 nm) and its absorbance and fluorescence intensity increase 122-fold and 449-fold upon incubation with F-actin. MaP618-actin is thus about four times more fluorogenic than the previously described SiR-actin. Micrographs of live U2OS cells incubated with 500 nM of MaP618-actin for 1 h without any washing steps clearly reveal F-actin structures, which were also verified by colocalization with SiR-actin. Overall, these data clearly demonstrate the potential of MaP618-actin for live-cell imaging of F-actin.

Fluorophores with absorption and emission wavelength in the NIR windows are attractive choices for live-cell and in vivo imaging because of the reduced autofluorescence, deep tissue penetration and decreased phototoxicity at this wavelength. The inventors have previously described the NIR probe silicon-rhodamine 700 (SiR700). SiR700 possesses fluorogenic properties and SiR700-based probes have been successfully used for live-cell imaging of microtubule, F-actin and lysosomes in no-wash live-cell imaging. However, a SiR700-based probe for HaloTag showed only modest fluorogenicity and relatively high background signal in live-cell imaging. To solve this problem, the inventors incorporated the acyl cyanamide into SiR700, which exists predominantly as the spirolactam in aqueous solution, was then used to prepare a probe for HaloTag (MaP700-Halo, 168). Incubation of MaP700-Halo with HaloTag resulted in a dramatic increase in absorbance (150-fold) and fluorescence intensity (650-fold). Most importantly, U2OS cells incubated with 250 nM of MaP700-Halo and imaged without any washing steps displayed bright nuclear fluorescence and negligible background ($F_{nuc.}/F_{cyt.}$=47). Furthermore, labeling of nuclear localized HaloTag in U2OS cells with MaP700-Halo (250 nM) was completed within 10 min. These features make MaP700-Halo an appealing probe for live-cell and in vivo imaging.

The experiments described above demonstrate how the introduction of acyl amides into rhodamine derivatives can be used to dramatically increase both their fluorogenicity and cell-permeability. The availability of different acyl amides that vary in their propensities for spirolactam formation facilitates for a given target the design of fluorescent probe that has the right balance between cell permeability, fluorogenicity and brightness.

Example 4: Applications in No-Wash, Multicolour Confocal and STED Microscopy

Mechanistic studies of most biological processes require the simultaneous imaging of multiple biomolecules and biochemical activities. Synthetic fluorescent probes for multi-colour, live-cell imaging need to be spectrally distinguishable, cell-permeable and ideally should be suitable for no-wash imaging. However, due to the paucity of suitable fluorescent probes that fulfil these requirements, very few no-wash, multicolour, live-cell imaging experiments have been reported so far. The cell-permeability and fluorogenicity of the here introduced MaP510, MaP555, MaP618 and MaP700 probes make them attractive candidates for no-wash, multicolour microscopy. In proof-of-principle experiments, U2OS cells stably expressing mitochondrial localized Cox8-Halo-SNAP were incubated with Hoechst (0.2 μg/mL), MaP555-tubulin (1 μM), MaP618-actin (500 nM), and MaP700-Halo (168, 250 nM) for 1.5 h and imaged directly without any washing steps. In addition, time-lapse movies enabled us to follow dynamic changes of the labelled structures. To underscore the potential of the inventors' MaP probes for multicolour imaging, various other combinations of fluorescent probes for no-wash, live-cell confocal imaging were successfully tested.

Stimulated Emission Depletion (STED) microscopy is a powerful tool to image biological structures in living cells on the nanoscale. As for conventional microscopy, the impact of live-cell STED nanoscopy is limited by the number of available fluorescent probes. The spectroscopic properties of the fluorophores on which the inventors' MaP probes are based are all compatible with STED nanoscopy and the inventors therefore investigated their performance in such experiments. The inventors first utilized MaP555-tubulin to image microtubules in live U2OS cells, using a 660 nm STED beam. In these experiments, U2OS cells were incubated with 1 μM of MaP555-tubulin for 1 h and subsequently imaged without any washing steps. The images showed both peripheral microtubules and the microtubules of the centrosomes. The apparent diameter of peripheral microtubules determined in these experiments was 39.5±10 nm, a value which is similar to the one obtained with SiR-tubulin. These images also provided a detailed view of the structure of the centriole, the structure around which the centrosome is assembled. Centrioles are cylindrical structures composed of nine triplets of microtubules, with the triplets forming the outer ring of the cylinder. The observed intensity maxima along the ring of the cylinder clearly revealed the nine-fold symmetry of the centriole. To the inventors' knowledge, it is the first time that the individual microtubule triplets are resolved in no-wash, live-cell imaging experiments. Similar to MaP555-tubulin, MaP555-actin also allowed to image the actin cytoskeleton in U2OS cells with nanoscale resolution.

The inventors previously used live-cell STED nanoscopy and SiR-actin to image the periodic arrangement of the actin subcortical cytoskeleton along the neurites of hippocampal neurons. To increase the signal-to-noise ratio in these experiments, excess probe needs to be removed through a washing step. Using MaP618-actin, the inventors were able to directly image this subcortical actin structure under no-wash conditions. The inventors attribute the increased signal-to-noise ratio of MaP618-actin relative to that of SiR-actin to its increased fluorogenicity.

Having a set of spectrally orthogonal and highly fluorogenic probes at hand, the inventors next tested their performance in no-wash, multicolour, live-cell STED nanoscopy. U2OS stably expressing vimentin-HaloTag were incubated with MaP510-Halo (green), MaP555-tubulin (red), and MaP618-actin (magenta) for 2 h and imaged directly. In these experiments, MaP555-tubulin and MaP618-actin were simultaneously imaged using a 775 nm depletion laser. Subsequently, MaP510-Halo was imaged using a 595 nm depletion laser. In this way, three-color, no-wash STED images at sub-diffraction resolution and without any crosstalk between the different channels were obtained.

Overall, these experiments clearly highlight the potential of the compounds shown herein for live-cell nanoscopy.
Description of Syntheses

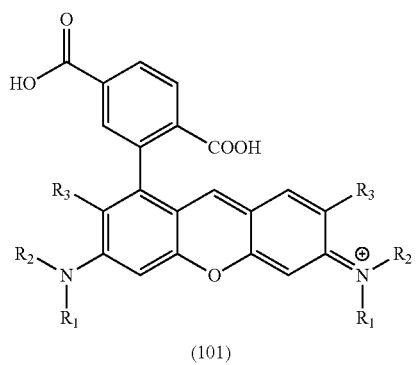

(101)

-continued
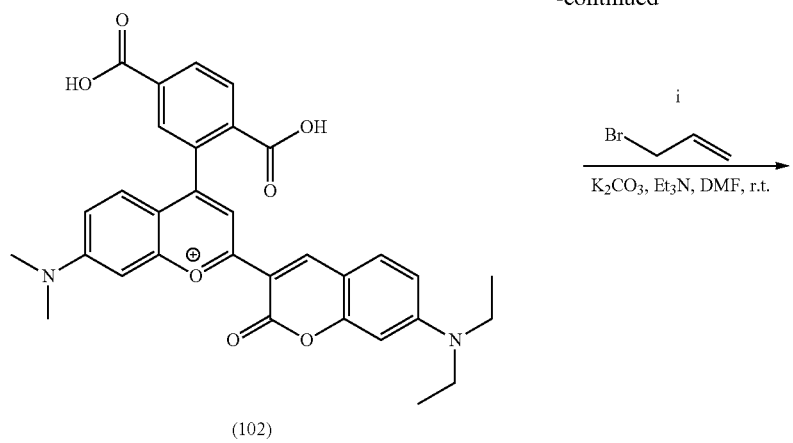
(102)
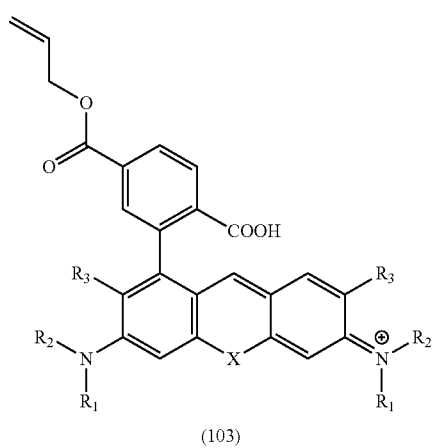
(103)
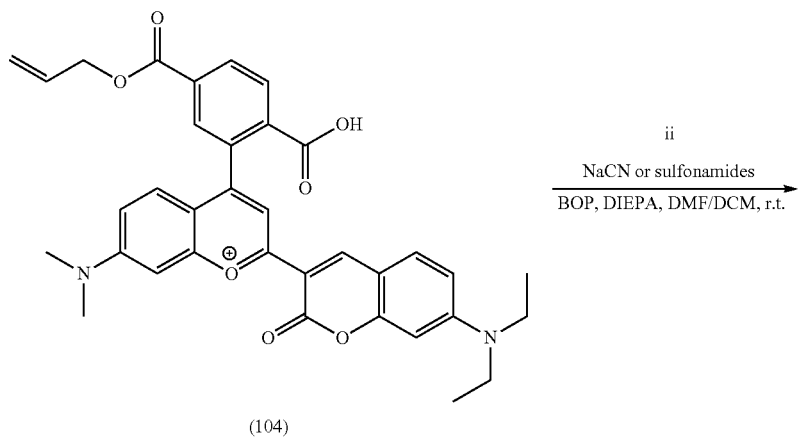
(104)
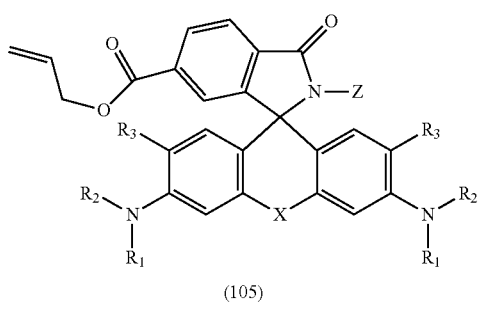
(105)

-continued

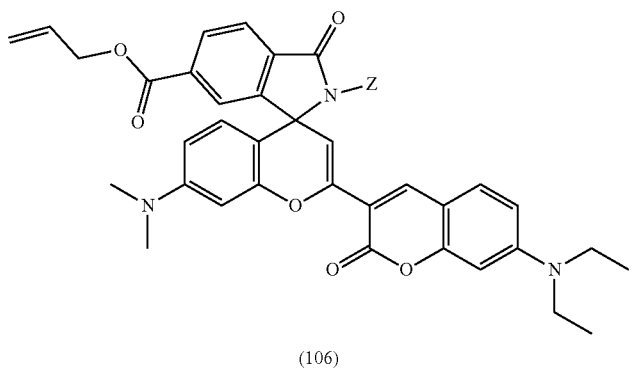

(106)

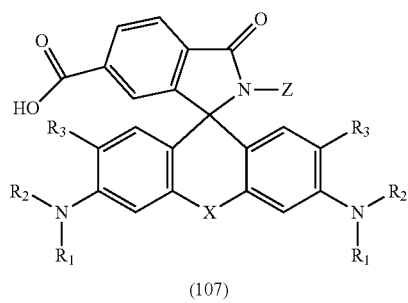

(107)

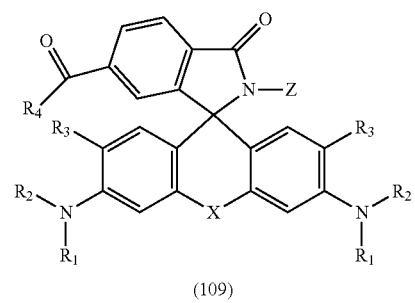

(109)

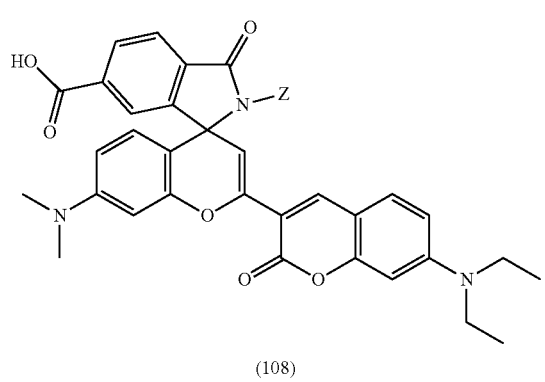

(108)

iv
BOP,
DIPEA,
DMF,
r.t.

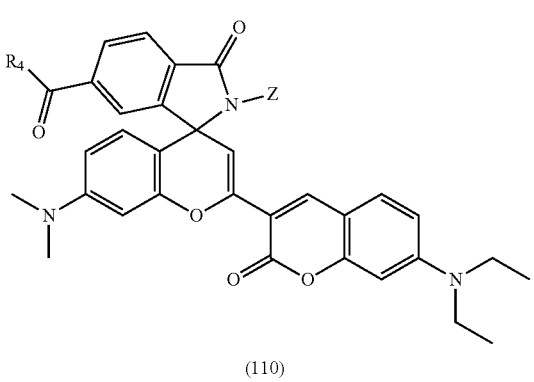

(110)

Step i.

The fluorophores were synthesized based on the reported method (Kvach et al. *Bioconjug Chem* 20, 1673-1682 (2009), Brem et al. *The Journal of Physical Chemistry C* 121, 15310-15317 (2017), Liu et al. *Analyst* 138, 2654-2660 (2013)). The fluorophores (1.0 eq) were dissolved in 3 mL DMF, and (2.0 eq) $K_2CO_3$ and 2.0 eq $Et_3N$ were added. Then allyl bromide (1.5 eq) was added slowly in the presence of ice bath. Then the mixture was stirred for 2 h at r.t. It was then diluted with water and extracted with $CH_2Cl_2$ (2×). The combined organics were washed with brine, dried (MgSO4), filtered, and concentrated in vacuo. The mixture was purified by flash chromatography on silica gel.

Step ii

Method 1 for $NH_2SONMe_2$, $NH_2SO_2CH_3$, and $NH_2CN$

The fluorophores (1.0 eq) were dissolved in dry 5 mL DCM. $POCl_3$ (20 eq.) was added and refluxed for 2-3 h. DCM and $POCl_3$ was removed by rotary evaporator and solid was obtained. Sulfonamide (10.0 eq.) and DIEPA (5.0 eq) were dissolved in dry 2-3 mL ACN. Then the mixture solution was poured into the solid with stirring. 4 mL more ACN was added and the reaction was stirred at r.t. The ACN was removed by rotary evaporator after 2 h. The mixture was washed by DCM and water. The combined organics were washed with brine, dried ($MgSO_4$), filtered, and concentrated in vacuo.

Method 2 for $NH_2SO_2NH_2$

The fluorophores (1.0 eq) and BOP (2.0 eq.), sulfonamide (10.0 eq.) and DIEPA (5 eq.) were dissolved in DMF/DCM (v/v=4/1). The mixture was stirred at r.t overnight. LCMS was used to check the reaction. The mixture was washed by DCM and water. The combined organics were washed with brine, dried ($MgSO_4$), filtered, and concentrated in vacuo.

Step iii

The fluorophores (1.0 eq), 1,3-dimethylbarbituric acid (5.0 eq.) and tetrakis(triphenyl-phosphine)palladium(0) (5.0 eq) were dissolved in methanol/DCM (5/1) and stirred at r.t for 1 h. The mixture was purified by pre-HPLC.

Step iv

The fluorophores (1.0 eq) and BOP (1.2 eq), and DIEPA (2 eq) were dissolved in 2 mL DMF. $O^6$-Benzylguanine or HaloTag(O2)amine (1.2 eq.) were added and stirred at r.t for 20 min.

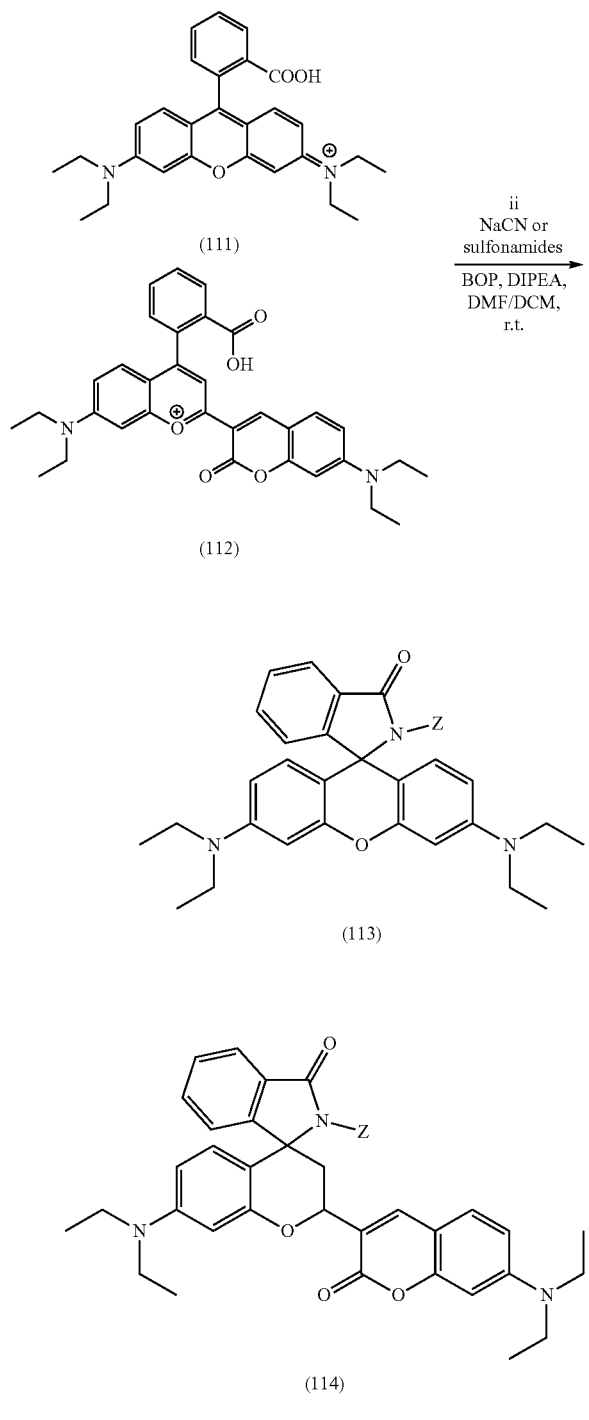

washed by DCM and water. The combined organics were washed with brine, dried (MgSO$_4$), filtered, and concentrated in vacuo. The mixture was purified by Pre-HPLC.

Method 2 for NH$_2$SO$_2$NH$_2$.

The fluorophores (1.0 eq) and BOP (2.0 eq.), sulfonamide (10.0 eq.) and DIEPA (5 eq.) were dissolved in DMF/DCM (v/v=4/1). The mixture was stirred at r.t overnight. LCMS was used to check the reaction. The mixture was washed by DCM and water. The combined organics were washed with brine, dried (MgSO$_4$), filtered, and concentrated in vacuo. The mixture was purified by Pre-HPLC.

(115)

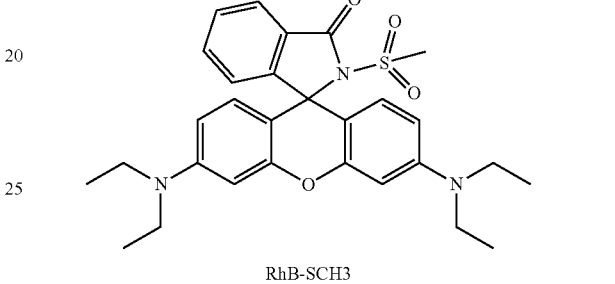

RhB-SCH3

$^1$H NMR (400 MHz, CD$_3$OD/CDCl$_3$) δ 8.13 (d, J=7.6 Hz, 1H), 7.75 (dt, J=23.7, 7.2 Hz, 2H), 7.26 (d, J=7.6 Hz, 1H), 6.80 (d, J=8.8 Hz, 2H), 6.62 (d, J=2.5 Hz, 2H), 6.57 (dd, J=9.2, 2.6 Hz, 2H), 3.54 (q, J=7.1 Hz, 8H), 3.01 (s, 3H), 1.33 (t, J=7.1 Hz, 12H). $^{13}$C NMR (101 MHz, CD$_3$OD/CDCl$_3$) δ 168.60, 154.14, 150.22, 149.76, 134.44, 129.67, 129.14, 128.76, 125.50, 124.66, 108.72, 106.83, 97.45, 44.45, 40.97, 12.05. HRMS (ESI): m/z calc. for C$_{29}$H$_{33}$N$_3$O$_4$S 520.2265; found 520.2271, [M+H]$^+$ (116)

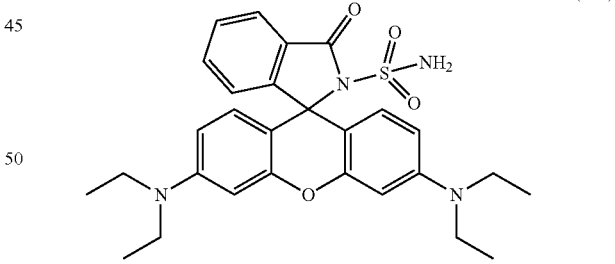

RhB-SNH2

Step ii
Method 1 for NH$_2$SONMe$_2$, NH$_2$SO$_2$CH$_3$, and NH$_2$CN

The fluorophores (1.0 eq) were dissolved in dry 5 mL DCM. POCl$_3$ (20 eq.) was added and refluxed for 2-3 h. DCM and POCl$_3$ was removed by rotary evaporator and solid was obtained. Sulfonamide (10.0 eq.) and DIEPA (5.0 eq) were dissolved in dry 2-3 mL ACN. Then the mixture solution was poured into the solid with stirring. 4 mL more ACN was added and the reaction was stirred at r.t. The ACN was removed by rotary evaporator after 2 h. The mixture was $^1$H NMR (400 MHz, Methanol-d$_4$) δ 7.99 (dd, J=7.5, 1.4 Hz, 1H), 7.89-7.74 (m, 2H), 7.45 (d, J=7.4 Hz, 1H), 7.17 (d, J=9.4 Hz, 2H), 7.02 (dd, J=9.3, 2.4 Hz, 2H), 6.97 (d, J=2.4 Hz, 2H), 3.68 (q, J=7.1 Hz, 8H), 1.30 (t, J=7.1 Hz, 12H). $^{13}$C NMR (101 MHz, CD$_3$OD_SPE) δ 167.56, 158.79, 134.61, 133.54, 132.31, 131.33, 129.22, 122.23, 119.33, 116.44, 115.20, 114.85, 113.54, 97.94, 47.09, 12.70. HRMS (ESI): m/z calc. for C$_{28}$H$_{32}$N$_4$O$_4$S 521.2217; found 521.2215, [M+H]$^+$ (117)
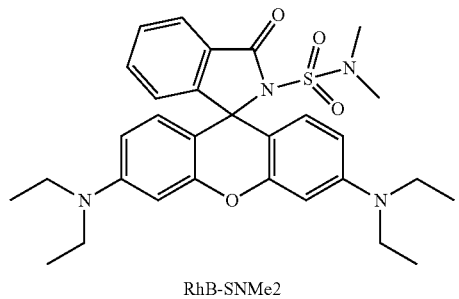
RhB-SNMe2
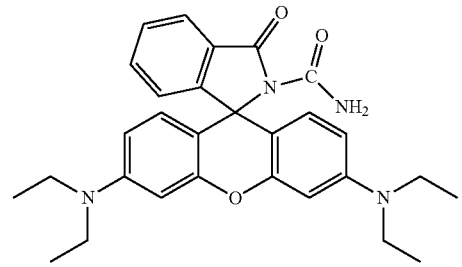
(118)
RhB-CONH2
(119)
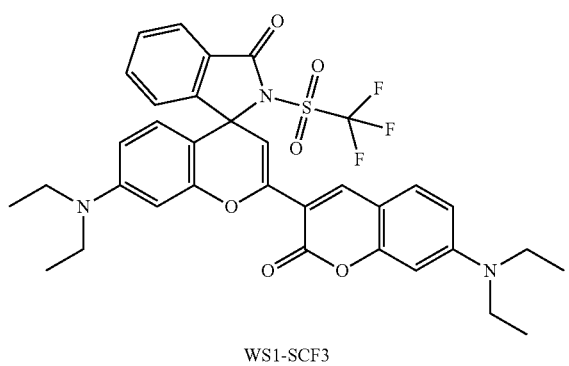
WS1-SCF3
$^1$H NMR (400 MHz, CDCl$_3$) δ 7.91 (d, J=7.6 Hz, 1H), 7.52 (dt, J=24.2, 7.4 Hz, 2H), 7.11 (d, J=7.6 Hz, 1H), 6.53 (d, J=8.8 Hz, 2H), 6.41 (s, 2H), 6.27 (d, J=9.1 Hz, 2H), 3.33 (q, J=7.1 Hz, 8H), 2.72 (s, 6H), 1.15 (t, J=7.0 Hz, 13H). $^{13}$C NMR (101 MHz, CDCl$_3$) δ 167.39, 153.93, 153.63, 148.97, 134.52, 128.74, 128.60, 128.32, 124.85, 123.43, 107.36, 106.25, 97.81, 69.19, 44.32, 37.87, 12.62. HRMS (ESI): m/z calc. for C$_{30}$H$_{36}$N$_4$O$_4$S 549.2530; found 549.2536, [M+H]$^+$
(120)
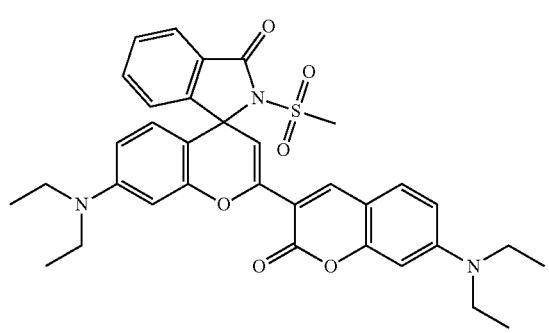
WS1-SCH3
(121)
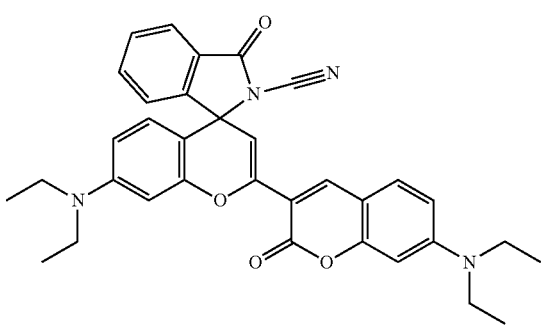
WS1-CN
(122)
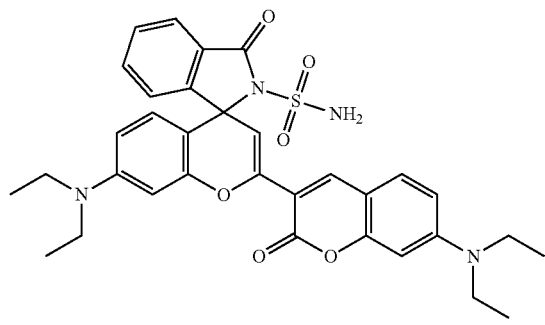
WS1-SNH2
(123)
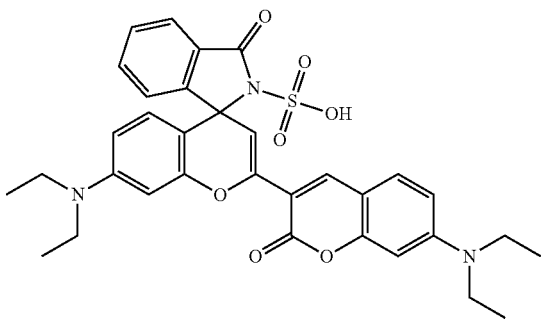
WS1-SO (124)
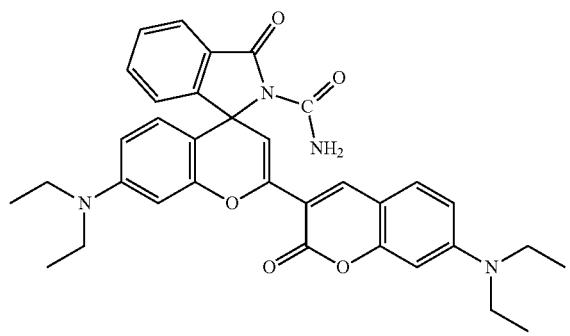
WS1-UREA
(125)
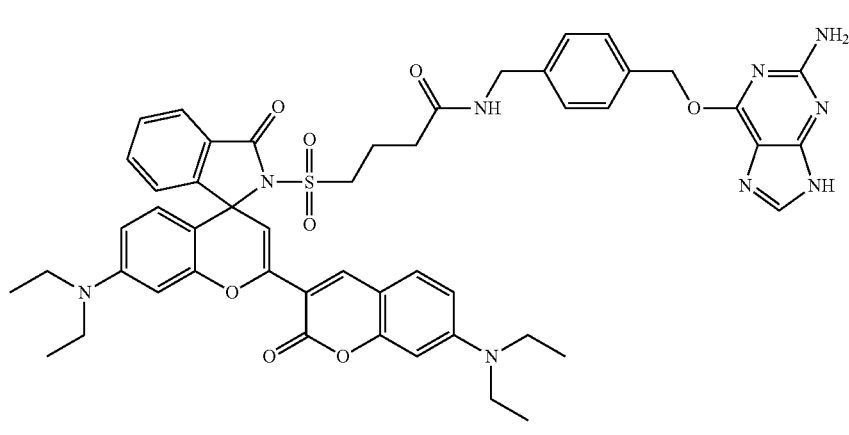
WS1-SCH2-C3-SNAP
(126)
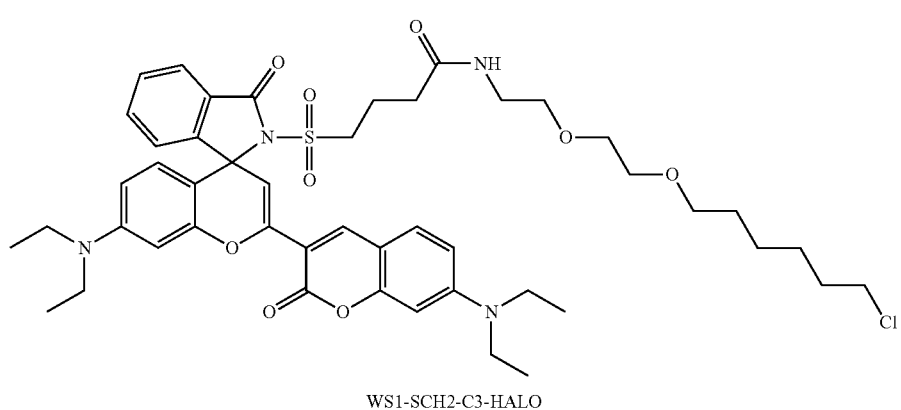
WS1-SCH2-C3-HALO
(127)
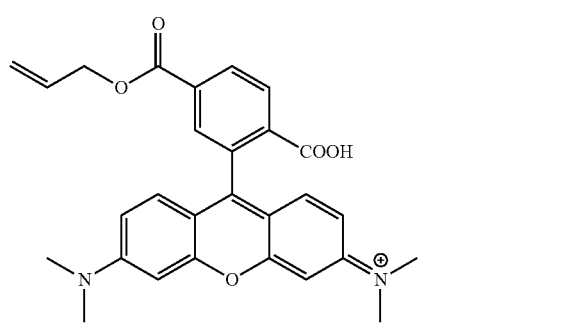

Yield: 90%. ¹H NMR (400 MHz, Chloroform-d) δ 8.33-8.19 (m, 1H), 8.09 (dd, J=7.9, 4.0 Hz, 1H), 7.83 (s, 1H), 6.62 (dd, J=8.8, 4.0 Hz, 2H), 6.50 (d, J=3.1 Hz, 2H), 6.44-6.33 (m, 2H), 6.04-5.84 (m, 1H), 5.35 (d, J=17.1 Hz, 1H), 5.26 (d, J=10.5 Hz, 1H), 4.76 (d, J=5.6 Hz, 2H), 2.98 (s, 12H). ¹³C NMR (101 MHz, CDCl₃) δ 168.88, 165.05, 153.36, 152.58, 135.70, 132.05, 131.73, 130.74, 128.97, 125.91, 125.45, 119.29, 109.16, 106.72, 98.45, 66.44, 40.33. HRMS (ESI): m/z calc. for $C_{28}H_{26}N_2O_5$ 471.1914; found 471.1916, $[M+H]^+$ (128)

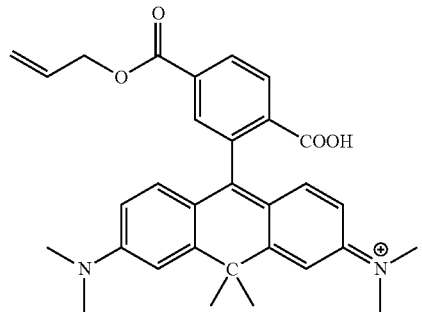

¹H NMR (400 MHz, Chloroform-d) δ 8.37-8.13 (m, 2H), 7.78 (s, 1H), 7.12 (d, J=2.5 Hz, 2H), 6.81 (d, J=9.0 Hz, 2H), 6.67 (dd, J=9.2, 2.4 Hz, 2H), 5.99 (ddt, J=16.6, 11.3, 5.9 Hz, 1H), 5.44-5.32 (m, 1H), 5.29 (d, J=10.4 Hz, 1H), 4.80 (d, J=5.8 Hz, 2H), 3.15 (s, 12H), 1.84 (s, 3H). ¹³C NMR (101 MHz, CDCl₃) δ 167.37, 164.89, 153.21, 152.95, 134.09, 133.84, 131.61, 130.40, 129.03, 128.34, 121.47, 119.19, 113.10, 111.13, 66.40, 41.26, 40.63, 35.43, 32.28. HRMS (ESI): m/z calc. for $C_{31}H_{32}N_2O_4$ 497.2435; found 497.2441, $[M+H]^+$ (129)

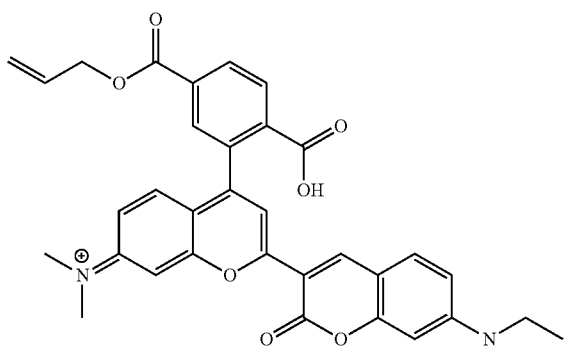

(130)

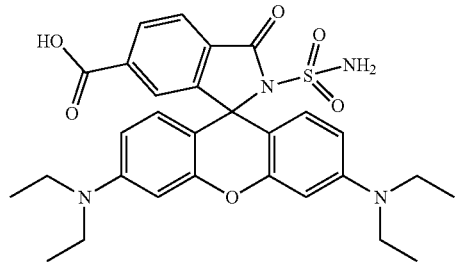

(131)

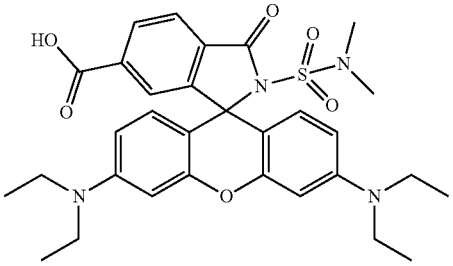

(132)

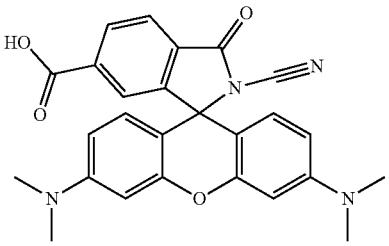

¹H NMR (400 MHz, DMSO-d₆) δ 8.16 (q, J=8.2 Hz, 2H), 7.51 (s, 1H), 6.71 (d, J=9.3 Hz, 2H), 6.52 (d, J=7.0 Hz, 4H), 2.96 (s, 12H). ¹³C NMR (101 MHz, DMSO-d₆) δ 165.80, 165.46, 152.25, 151.99, 137.65, 130.56, 129.11, 128.30, 125.20, 124.84, 118.08, 109.58, 106.91, 102.95, 98.06, 54.91, 48.60. HRMS (ESI): m/z calc. for $C_{26}H_{22}N_4O_4$ 455.1714; found 455.1714, $[M+H]^+$ (133)

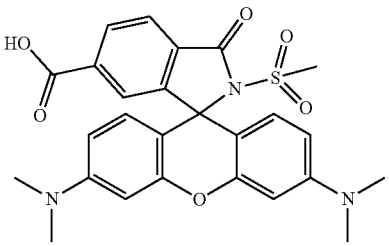

¹H NMR (400 MHz, Methanol-d₄) δ 8.41 (d, J=8.1 Hz, 1H), 8.09 (d, J=8.1 Hz, 1H), 8.04 (s, 1H), 7.16 (d, J=9.4 Hz, 2H), 7.04 (dd, J=9.5, 2.3 Hz, 2H), 6.96 (d, J=2.4 Hz, 2H), 3.30 (s, 12H), 2.96 (d, J=1.3 Hz, 3H). ¹³C NMR (101 MHz, DMSO) δ 166.39, 166.17, 154.02, 152.50, 151.72, 137.52, 130.84, 130.47, 128.50, 125.13, 124.92, 109.05, 106.21, 98.73, 68.62, 55.38, 49.06, 42.44. HRMS (ESI): m/z calc. for $C_{26}H_{25}N_3O_6S$ 508, 1537; found 508.1540, $[M+H]^+$ (134)

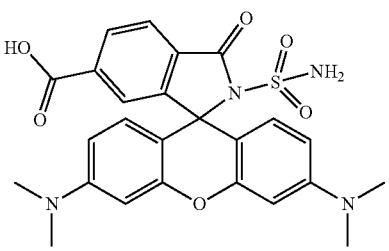

¹H NMR (400 MHz, DMSO-d₆) δ 8.09 (dd, J=8.0, 1.4 Hz, 1H), 8.02 (d, J=8.0 Hz, 1H), 7.70 (s, 2H), 7.34 (s, 1H), 6.53

(d, J=8.6 Hz, 2H), 6.41 (d, J=8.0 Hz, 4H), 2.92 (s, 12H). $^{13}$C NMR (101 MHz, DMSO) δ 166.51, 165.74, 154.38, 152.34, 151.47, 136.94, 131.18, 130.23, 128.42, 125.00, 124.35, 109.08, 106.80, 98.79, 67.96, 40.28. HRMS (ESI): m/z calc. for $C_{25}H_{24}N_4O_6S$ 509, 1489; found 509, 1489, [M+H]$^+$ (135)

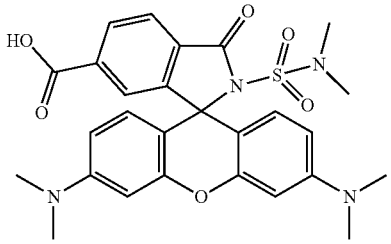

1H NMR (400 MHz, DMSO-d6) δ 8.12 (d, J=8.1 Hz, 1H), 8.04 (d, J=8.0 Hz, 1H), 7.38 (s, 1H), 6.56 (d, J=8.6 Hz, 2H), 6.42 (d, J=11.3 Hz, 4H), 2.93 (s, 12H). $^{13}$C NMR (101 MHz, DMSO) δ 166.04, 165.61, 153.71, 152.45, 151.12, 136.70, 130.75, 129.89, 128.58, 124.92, 124.10, 108.32, 106.21, 98.24, 68.10, 54.92, 37.50. HRMS (ESI): m/z calc. for $C_{27}H_{28}N_4O_6S$ 537, 1802; found 537.1802, [M+H]$^+$ (136)

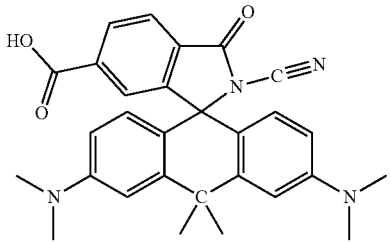

$^1$H NMR (400 MHz, DMSO-d$_6$) δ 8.14 (s, 2H), 7.32 (s, 1H), 6.92 (s, 2H), 6.63 (d, J=9.0 Hz, 2H), 6.58 (d, J=8.7 Hz, 2H), 2.97 (s, 12H), 1.84 (s, 3H), 1.79 (s, 3H). $^{13}$C NMR (101 MHz, DMSO) δ 166.32, 165.79, 154.40, 150.55, 146.38, 137.66, 130.08, 128.49, 128.05, 125.13, 124.40, 114.82, 112.67, 109.45, 106.83, 71.15, 37.66, 35.36, 34.65. HRMS (ESI): m/z calc. for $C_{29}H_{28}N_4O_3$ 481.2234; found 481.2236, [M+H]$^+$ (137)

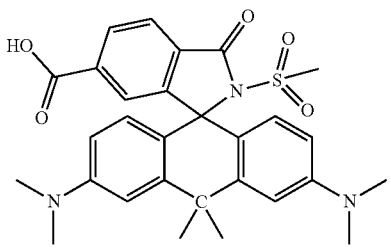

$^1$H NMR (400 MHz, DMSO-d$_6$) δ 8.13-7.97 (m, 2H), 7.12 (s, 1H), 7.00 (s, 2H), 6.77-6.63 (m, 4H), 3.12 (d, J=1.7 Hz, 3H), 2.97 (d, J=1.8 Hz, 12H), 1.83 (s, 3H), 1.76 (s, 3H). $^{13}$C NMR (101 MHz, DMSO) δ 166.69, 165.85, 155.43, 149.06, 144.85, 136.94, 129.43, 129.33, 127.38, 124.73, 123.95, 119.31, 112.91, 111.01, 71.05, 42.24, 40.63, 37.62, 35.82, 32.67. HRMS (ESI): m/z calc. for $C_{29}H_{31}N_3O_5S$ 534.2057; found 534.2059, [M+H]$^+$ (138)

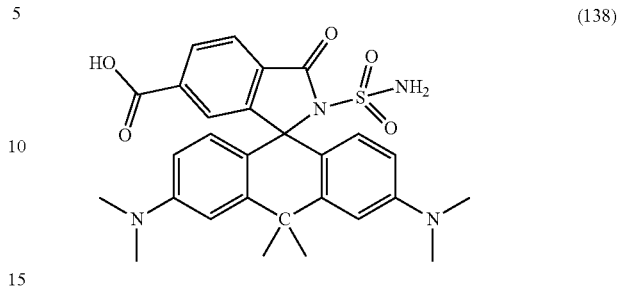

$^1$H NMR (400 MHz, DMSO-d$_6$) δ 8.00 (s, 2H), 7.08 (s, 1H), 7.01 (s, 2H), 6.67 (d, J=9.1 Hz, 2H), 6.62 (d, J=8.6 Hz, 2H), 2.97 (s, 12H), 1.85 (s, 3H), 1.74 (s, 3H). $^{13}$C NMR (101 MHz, DMSO) δ 166.60, 166.43, 155.85, 149.17, 145.02, 136.70, 130.30, 129.66, 127.71, 124.69, 124.40, 113.66, 111.65, 71.24, 41.25, 38.02, 36.00, 33.69. HRMS (ESI): m/z calc. for $C_{28}H_{30}N_4O_5S$ 535.2010; found 536.2041, [M+H]$^+$ (139)

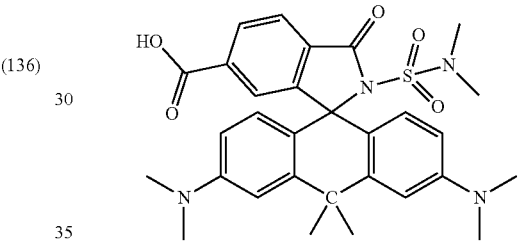

$^1$H NMR (400 MHz, DMSO-d$_6$) δ 8.02 (s, 2H), 7.10 (s, 1H), 6.97 (s, 2H), 6.63 (s, 4H), 2.96 (d, J=1.6 Hz, 12H), 2.71 (d, J=1.7 Hz, 6H), 1.81 (s, 3H), 1.78 (s, 3H). $^{13}$C NMR (101 MHz, DMSO) δ 166.71, 165.97, 155.76, 149.07, 145.28, 136.52, 129.74, 129.26, 128.22, 124.34, 124.25, 112.41, 110.64, 70.98, 40.58, 37.59, 35.97, 32.73. HRMS (ESI): m/z calc. for $C_{30}H_{34}N_4O_5S$ 563.2323; found 563.2324, [M+H]$^+$ (140)

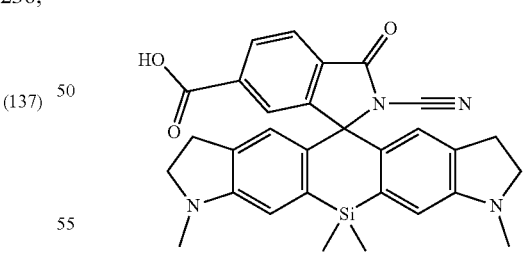

1H NMR (400 MHz, DMSO-d6) δ 8.16-8.04 (m, 2H), 7.38 (s, 1H), 6.79 (d, J=2.3 Hz, 2H), 6.58 (s, 2H), 3.25 (dt, J=26.5, 8.6 Hz, 4H), 2.88-2.66 (m, 10H), 0.57 (d, J=2.3 Hz, 3H), 0.53 (d, J=2.3 Hz, 3H). $^{13}$C NMR (101 MHz, DMSO) δ 166.90, 165.74, 155.11, 152.58, 137.54, 134.03, 133.52, 129.79, 128.99, 127.19, 125.67, 123.97, 122.72, 109.66, 106.89, 75.11, 54.65, 35.00, 27.95, 0.30, −0.23. HRMS (ESI): m/z calc. for $C_{30}H_{28}N_4O_3Si$ 521.2003; found 521.2002, [M+H]$^+$ (141)
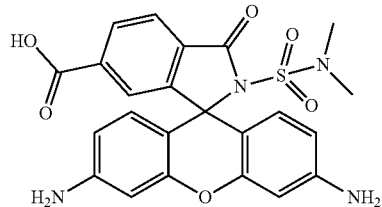
¹H NMR (400 MHz, DMSO-d₆) δ 8.11 (d, J=8.1 Hz, 1H), 8.00 (d, J=8.0 Hz, 1H), 7.41 (s, 1H), 6.48-6.31 (m, 4H), 6.25 (d, J=8.5 Hz, 2H), 2.62 (s, 6H).
(142)
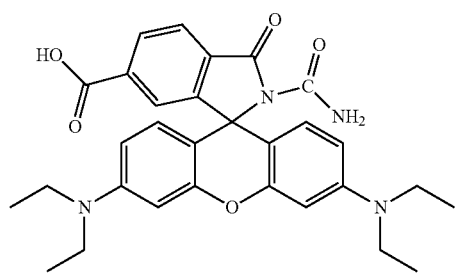
(143)
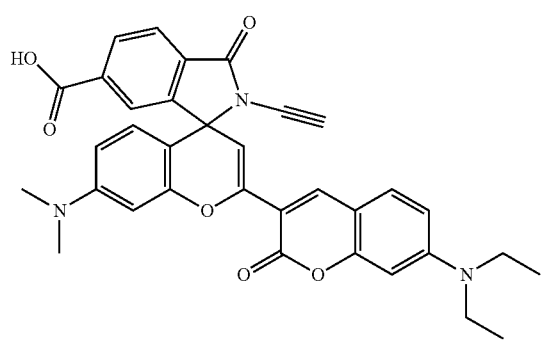
(144)
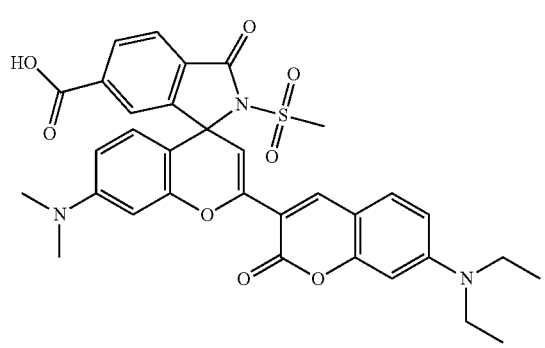
(145)
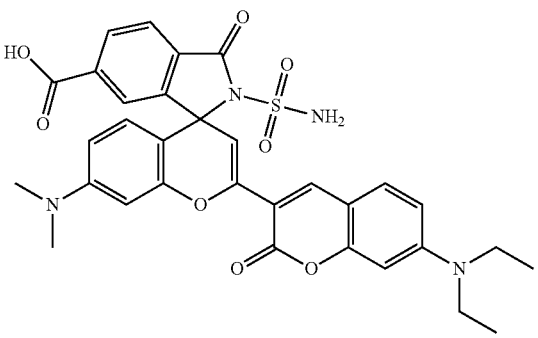
(146)
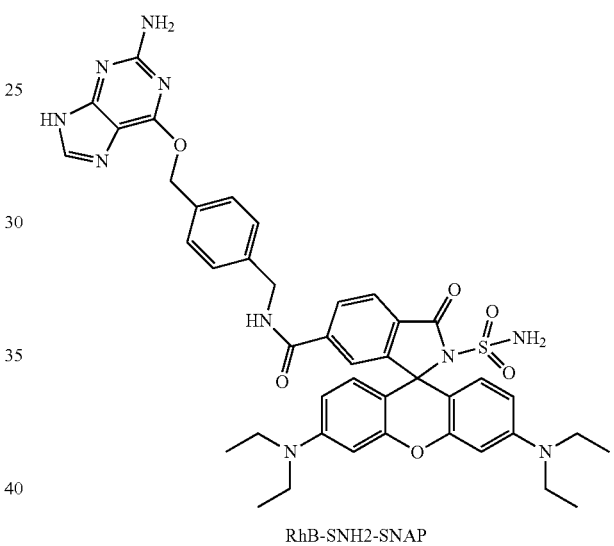
RhB-SNH2-SNAP
(147)
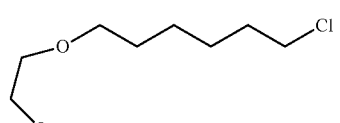
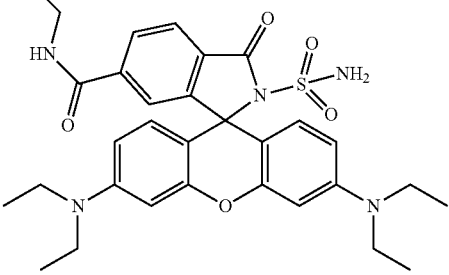
RhB-SNH2-HALO (148)
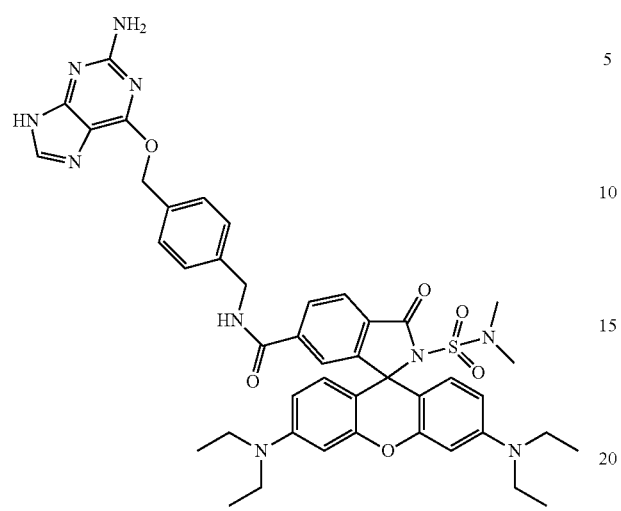
RhB-SNMe2-SNAP
(150)
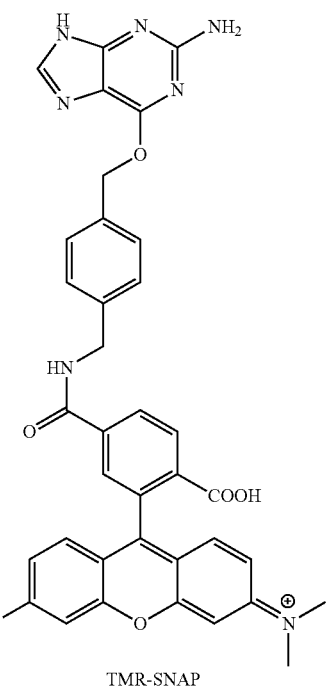
TMR-SNAP
(149)
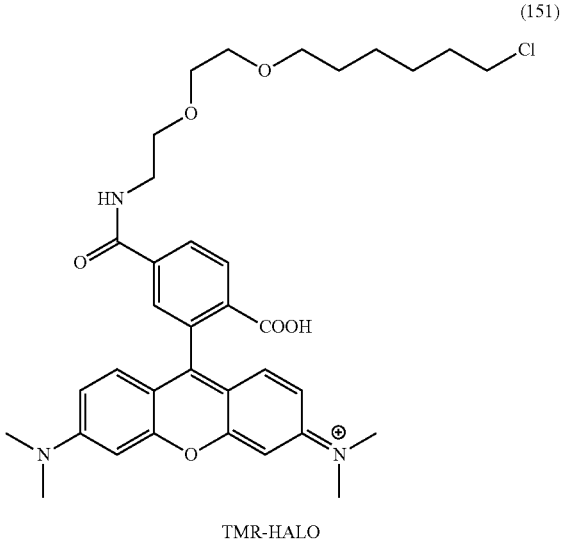
RhB-SNMe2-HALO
(151)
TMR-HALO

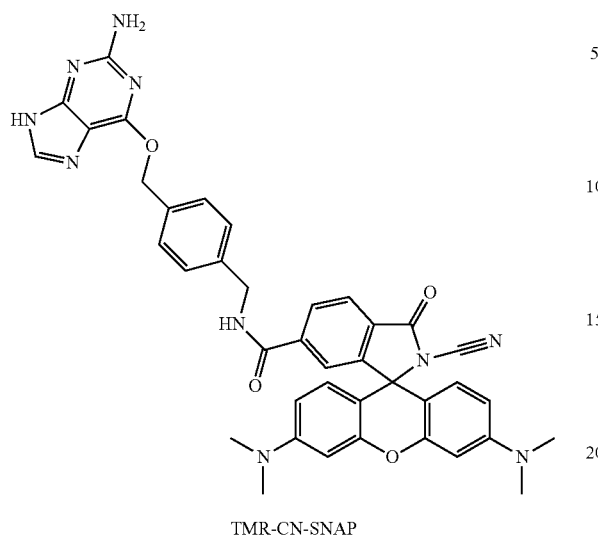

TMR-CN-SNAP (152)

1H NMR (400 MHz, DMSO-d6) δ 8.50 (s, 1H), 8.20-8.09 (m, 2H), 7.61 (s, 1H), 7.46 (d, J=7.8 Hz, 2H), 7.29 (d, J=7.8 Hz, 2H), 6.68 (d, J=8.6 Hz, 2H), 6.51 (d, J=8.0 Hz, 4H), 5.50 (s, 2H), 4.40 (d, J=5.9 Hz, 2H), 2.95 (s, 12H). HRMS (ESI): m/z calc. for $C_{39}H_{34}N_{10}O_4$ 354, 1455; found 354, 1457, $[M+2H]^{2+}$

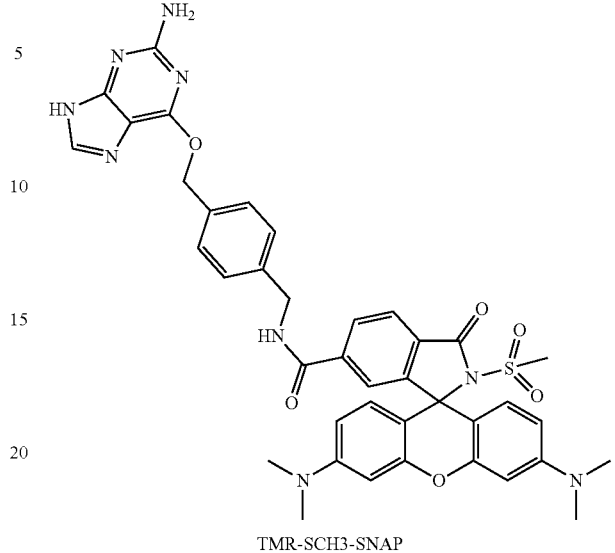

TMR-SCH3-SNAP (154)

$^1$H NMR (400 MHz, Methanol-$d_4$) δ 8.29 (s, 1H), 8.17 (dd, J=8.2, 1.7 Hz, 1H), 8.05 (d, J=8.2 Hz, 1H), 7.79 (d, J=1.7 Hz, 1H), 7.48 (d, J=7.8 Hz, 2H), 7.36 (d, J=7.9 Hz, 2H), 6.99 (d, J=9.2 Hz, 2H), 6.84 (dd, J=9.2, 2.6 Hz, 2H), 6.80 (d, J=2.5 Hz, 2H), 5.60 (s, 2H), 4.55 (s, 2H), 3.19 (s, 12H), 2.93 (s, 3H). HRMS (ESI): m/z calc. for $C_{39}H_{37}N_9O_6S$ 380.6367; found 380.6369, $[M+2H]^{2+}$

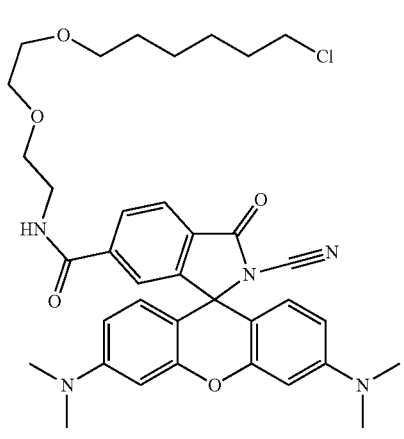

TMR-CN-HALO (153)

$^1$H NMR (400 MHz, Methanol-$d_4$) δ 8.12 (d, J=1.1 Hz, 2H), 7.68 (d, J=1.2 Hz, 1H), 6.87 (d, J=9.1 Hz, 2H), 6.77 (dd, J=9.1, 2.6 Hz, 2H), 6.73 (d, J=2.5 Hz, 2H), 3.61-3.55 (m, 4H), 3.51 (dt, J=5.6, 2.0 Hz, 6H), 3.39 (t, J=6.5 Hz, 2H), 3.13 (s, 12H), 1.73-1.66 (m, 2H), 1.50-1.44 (m, 2H), 1.41-1.35 (m, 2H), 1.32-1.25 (m, 2H). HRMS (ESI): m/z calc. for $C_{36}H_{42}ClN_5O_5$ 660, 2947; found 660.2954, $[M+H]^+$

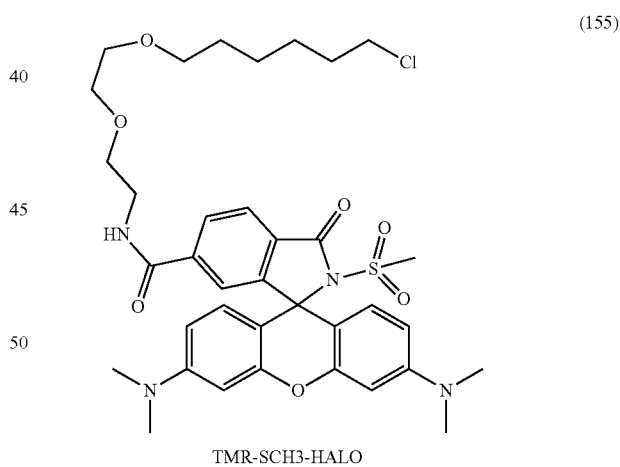

TMR-SCH3-HALO (155)

$^1$H NMR (400 MHz, Methanol-$d_4$) δ 8.18 (d, J=8.3 Hz, 1H), 8.08 (d, J=8.1 Hz, 1H), 7.76 (s, 1H), 6.99 (d, J=9.3 Hz, 2H), 6.84 (d, J=9.2 Hz, 2H), 6.79 (s, 2H), 3.62 (dd, J=11.4, 5.2 Hz, 4H), 3.54 (dd, J=11.2, 5.6 Hz, 6H), 3.41 (d, J=6.7 Hz, 2H), 2.95 (s, 3H), 1.72 (p, J=7.0 Hz, 2H), 1.51 (p, J=7.0 Hz, 2H), 1.40 (q, J=7.2, 6.7 Hz, 2H), 1.32 (p, J=7.7 Hz, 2H). HRMS (ESI): m/z calc. for $C_{36}H_{44}ClN_5O_7S$ 713.2770; found 713.2768, $[M+H]^+$ (156)

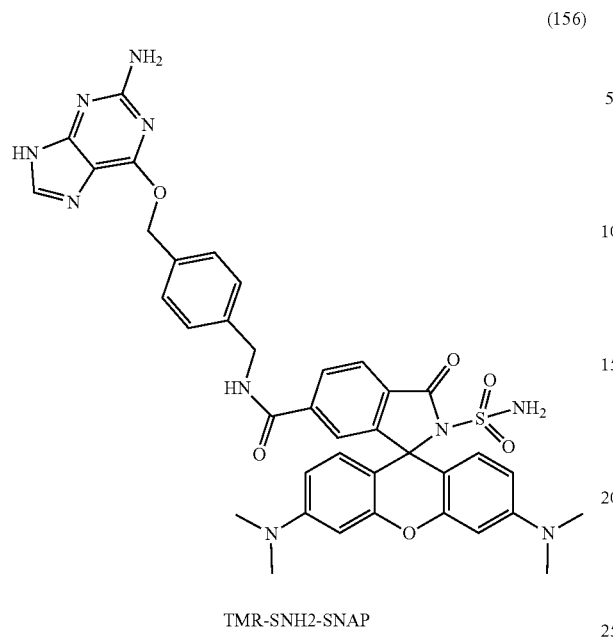

TMR-SNH2-SNAP (158)

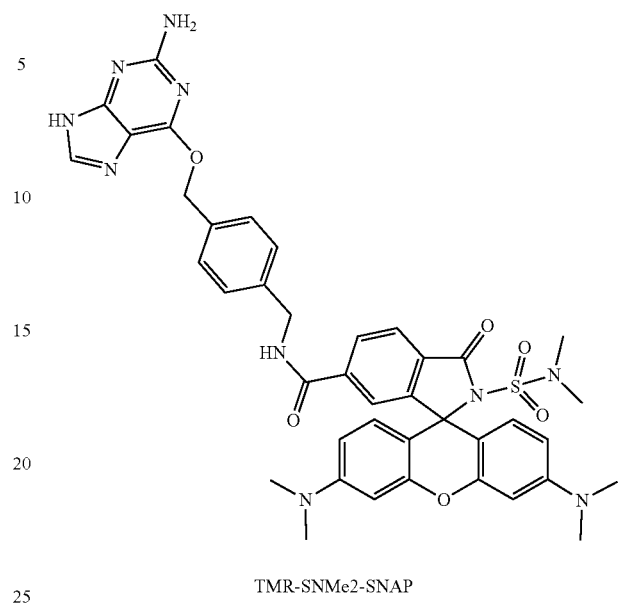

TMR-SNMe2-SNAP $^1$H NMR (400 MHz, Methanol-d$_4$) δ 8.29 (d, J=1.6 Hz, 1H), 8.18 (d, J=8.3 Hz, 1H), 8.02 (dd, J=8.1, 1.7 Hz, 1H), 7.80 (s, 1H), 7.52-7.46 (m, 2H), 7.37 (d, J=7.8 Hz, 2H), 7.04 (d, J=9.3 Hz, 2H), 6.89 (d, J=9.4 Hz, 2H), 6.84 (s, 2H), 5.60 (s, 2H), 4.56 (s, 2H), 3.22 (s, 12H). HRMS (ESI): m/z calc. for C$_{38}$H$_{36}$N$_{10}$O$_6$S 381.1343; found 381.1342, [M+2H]$^{2+}$ $^1$H NMR (400 MHz, DMSO-d$_6$) δ 8.53 (s, 1H), 8.11 (d, J=8.1 Hz, 1H), 8.01 (d, J=7.9 Hz, 1H), 7.46 (d, J=6.9 Hz, 3H), 7.28 (d, J=7.8 Hz, 2H), 6.52 (d, J=8.7 Hz, 2H), 6.39 (d, J=8.1 Hz, 4H), 5.50 (s, 2H), 4.38 (d, J=5.7 Hz, 2H), 2.91 (s, 12H), 2.62 (s, 6H). HRMS (ESI): m/z calc. for C$_{40}$H$_{40}$N$_{10}$O$_6$S 395.1499; found 395.1499, [M+2H]$^{2+}$ (157)

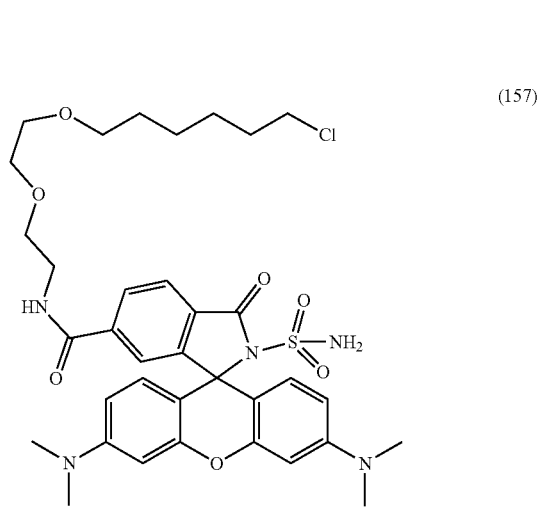

TMR-SNH2-HALO (159)

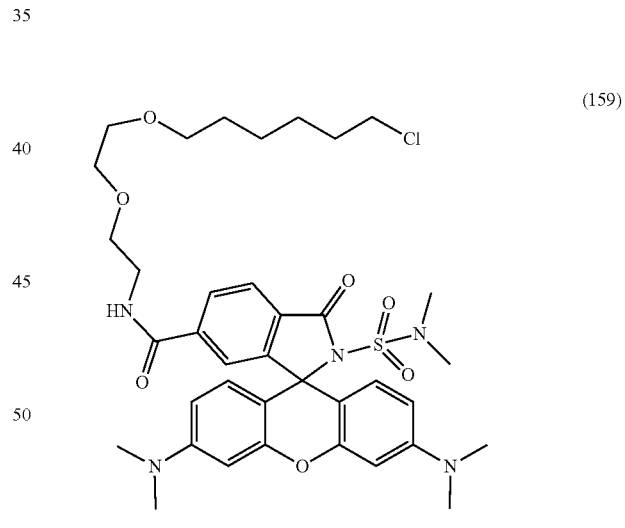

TMR-SNMe2-HALO $^1$H NMR (400 MHz, Methanol-d$_4$) δ 8.17 (d, J=8.1 Hz, 1H), 8.03 (dd, J=8.2, 1.7 Hz, 1H), 7.77 (s, 1H), 7.03 (s, 2H), 6.86 (d, J=23.2 Hz, 4H), 3.67-3.58 (m, 4H), 3.57-3.49 (m, 6H), 3.41 (td, J=6.6, 1.6 Hz, 2H), 3.21 (s, 12H), 1.76-1.65 (m, 2H), 1.49 (p, J=7.2 Hz, 2H), 1.39 (h, J=6.7, 6.1 Hz, 2H), 1.32 (q, J=7.6 Hz, 2H). HRMS (ESI): m/z calc. for C$_{35}$H$_{44}$ClN$_5$O$_7$S 714.2723; found 714.2724, [M+H]$^+$ $^1$H NMR (400 MHz, DMSO-d$_6$) δ 8.06 (d, J=8.0 Hz, 1H), 7.98 (dd, J=8.2, 1.7 Hz, 1H), 7.44 (s, 1H), 6.52 (dd, J=8.6, 1.6 Hz, 2H), 6.39 (dd, J=9.3, 1.9 Hz, 4H), 3.59 (td, J=6.6, 1.7 Hz, 2H), 3.43-3.37 (m, 6H), 3.33-3.25 (m, 4H), 2.92 (d, J=1.6 Hz, 12H), 2.62 (d, J=1.6 Hz, 6H), 1.71-1.60 (m, 2H), 1.40 (p, J=7.2 Hz, 2H), 1.36-1.28 (m, 2H), 1.24 (q, J=7.9 Hz, 2H). HRMS (ESI): m/z calc. for C$_{37}$H$_{48}$ClN$_5$O$_7$S 742.3036; found 742.3031, [M+H]$^+$

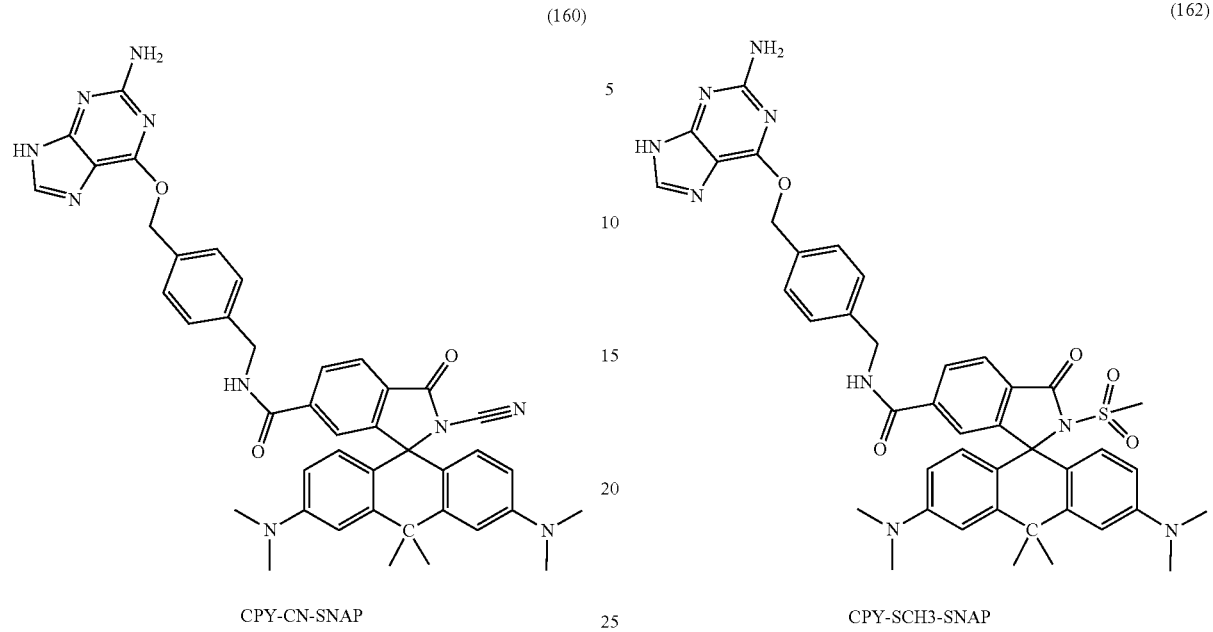

(160) CPY-CN-SNAP (162) CPY-SCH3-SNAP

¹H NMR (400 MHz, Methanol-d₄) δ 8.35 (d, J=1.8 Hz, 1H), 8.11 (dd, J=8.0, 1.7 Hz, 1H), 8.07 (d, J=8.1 Hz, 1H), 7.46 (dd, J=8.2, 1.8 Hz, 2H), 7.41 (s, 1H), 7.34-7.28 (m, 2H), 7.11 (d, J=2.3 Hz, 2H), 6.82-6.75 (m, 2H), 6.65 (dd, J=8.9, 1.7 Hz, 2H), 5.61 (d, J=1.8 Hz, 2H), 4.48 (d, J=4.8 Hz, 2H), 3.04 (d, J=1.7 Hz, 12H), 1.90 (d, J=1.8 Hz, 3H), 1.85 (d, J=1.8 Hz, 3H). HRMS (ESI): m/z calc. for $C_{42}H_{40}N_{10}O_3$ 367.1715; found 367.1717, [M+2H]²⁺

¹H NMR (400 MHz, Methanol-d₄) δ 8.32 (d, J=1.7 Hz, 1H), 8.11-8.03 (m, 1H), 7.96 (d, J=7.9 Hz, 1H), 7.51-7.42 (m, 2H), 7.29 (d, J=7.4 Hz, 2H), 7.22 (t, J=2.4 Hz, 3H), 6.88-6.82 (m, 2H), 6.80 (dd, J=8.8, 1.7 Hz, 2H), 5.60 (s, 2H), 4.46 (d, J=4.7 Hz, 2H), 3.35 (d, J=1.7 Hz, 3H), 3.07 (d, J=1.7 Hz, 12H), 1.89 (s, 3H), 1.84 (d, J=1.7 Hz, 3H). HRMS (ESI): m/z calc. for $C_{42}H_{43}N_9O_5S$ 393.6627; found 393.6628, [M+2H]²⁺

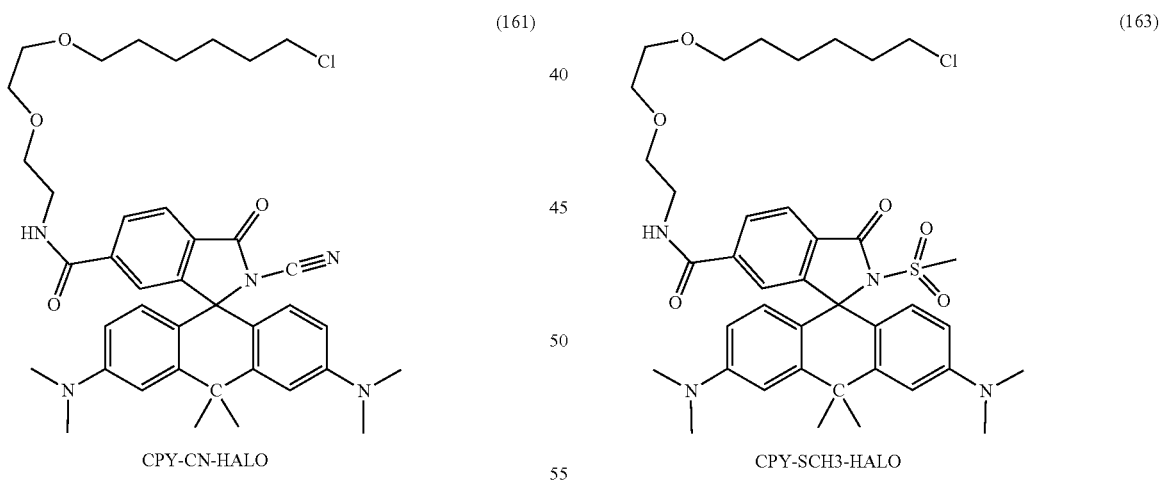

(161) CPY-CN-HALO (163) CPY-SCH3-HALO

¹H NMR (400 MHz, Methanol-d₄) δ 8.11 (d, J=7.7 Hz, 1H), 8.06 (d, J=8.0 Hz, 1H), 7.38 (s, 1H), 7.17 (d, J=2.7 Hz, 2H), 6.84 (dt, J=9.1, 2.1 Hz, 2H), 6.68 (dd, J=8.8, 1.7 Hz, 2H), 3.54 (dd, J=5.8, 2.3 Hz, 4H), 3.51-3.43 (m, 6H), 3.40-3.35 (m, 2H), 3.06 (d, J=1.6 Hz, 12H), 1.92 (d, J=1.7 Hz, 3H), 1.86 (s, 3H), 1.69 (p, J=6.9 Hz, 2H), 1.47 (p, J=7.0 Hz, 2H), 1.41-1.34 (m, 2H), 1.30 (q, J=6.7, 4.8 Hz, 2H). HRMS (ESI): m/z calc. for $C_{39}H_{48}ClN_5O_4$ 686.3468; found 686.3471, [M+H]⁺

¹H NMR (400 MHz, Methanol-d₄) δ 8.07 (d, J=8.0 Hz, 1H), 7.97 (d, J=8.0 Hz, 1H), 7.35 (s, 2H), 7.18 (s, 1H), 6.95 (d, J=8.8 Hz, 2H), 6.87 (d, J=9.1 Hz, 2H), 3.54 (d, J=5.4 Hz, 4H), 3.50 (d, J=5.3 Hz, 4H), 3.44 (t, J=5.1 Hz, 2H), 3.39 (t, J=6.6 Hz, 2H), 3.13 (d, J=4.5 Hz, 12H), 3.08 (s, 3H), 1.93 (s, 3H), 1.85 (s, 3H), 1.70 (p, J=7.2 Hz, 2H), 1.48 (h, J=6.5, 6.1 Hz, 2H), 1.39 (h, J=6.7, 6.3 Hz, 2H), 1.30 (td, J=8.3, 7.9, 3.9 Hz, 2H). HRMS (ESI): m/z calc. for $C_{39}H_{51}ClN_4O_6S$ 739.3291; found 739.3291, [M+H]⁺

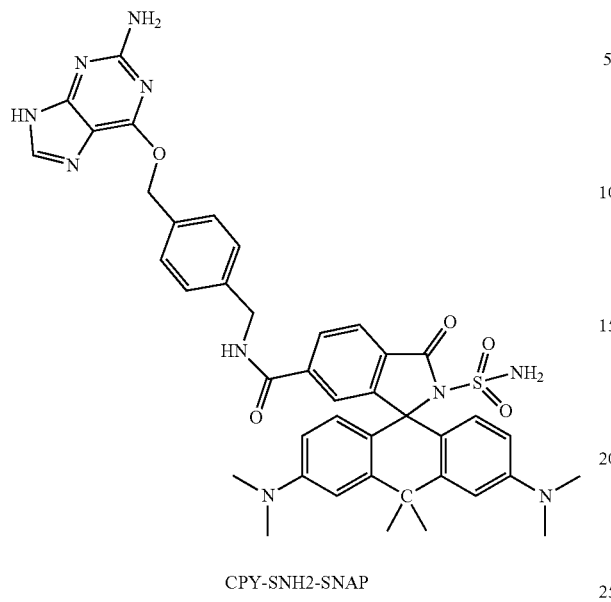

CPY-SNH2-SNAP (164)

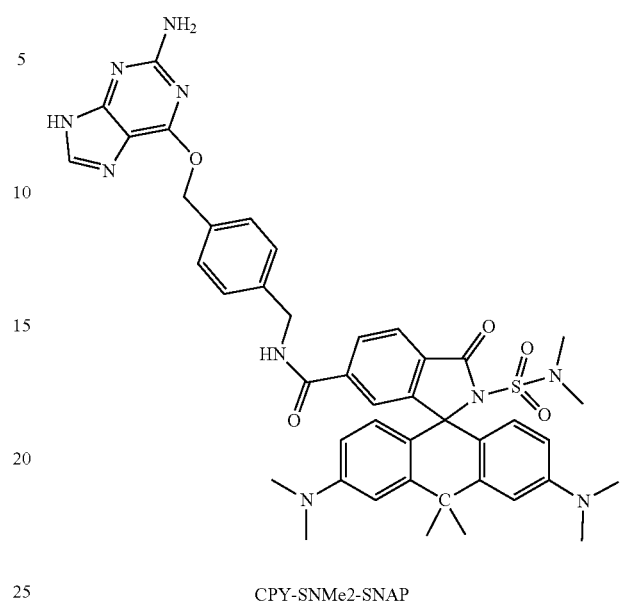

CPY-SNMe2-SNAP (166)

¹H NMR (400 MHz, Methanol-d₄) δ 8.30 (d, J=1.6 Hz, 1H), 8.04 (d, J=8.1 Hz, 1H), 7.93 (d, J=8.1 Hz, 1H), 7.48-7.42 (m, 2H), 7.28 (d, J=6.8 Hz, 4H), 7.16 (s, 1H), 6.89 (d, J=8.6 Hz, 2H), 6.80 (d, J=9.0 Hz, 2H), 5.59 (s, 2H), 4.45 (d, J=4.8 Hz, 2H), 3.08 (d, J=1.7 Hz, 12H), 1.91 (s, 3H), 1.83 (s, 3H). HRMS (ESI): m/z calc. for $C_{41}H_{42}N_{10}O_5S$ 787.3133; found 787.3133, $[M+H]^+$ ¹H NMR (400 MHz, Methanol-d₄) δ 7.97 (d, J=8.1 Hz, 1H), 7.91 (d, J=8.1 Hz, 1H), 7.87 (d, J=1.6 Hz, 1H), 7.41 (d, J=7.3 Hz, 2H), 7.24 (d, J=7.5 Hz, 2H), 7.17 (s, 1H), 6.91 (d, J=2.4 Hz, 2H), 6.64-6.55 (m, 4H), 5.49 (s, 2H), 4.43 (d, J=4.1 Hz, 2H), 2.93 (d, J=1.8 Hz, 12H), 2.73 (d, J=1.7 Hz, 6H), 1.83 (s, 3H), 1.82 (s, 3H). HRMS (ESI): m/z calc. for $C_{43}H_{46}N_{10}O_5S$ 408.1759; found 408.1762, $[M+2H]^{2+}$

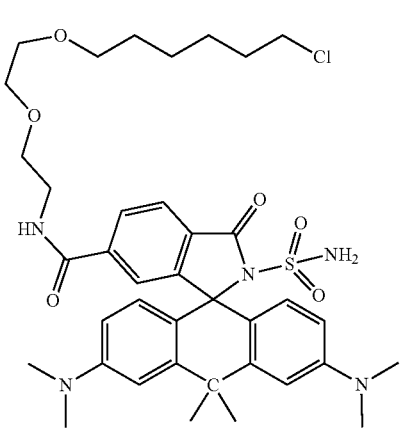

CPY-SNH2-HALO (165)

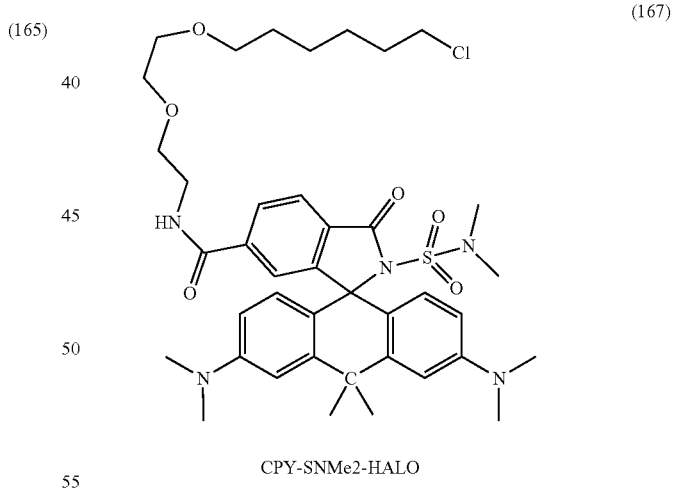

CPY-SNMe2-HALO (167)

¹H NMR (400 MHz, Methanol-d₄) δ 8.04 (dd, J=8.1, 1.7 Hz, 1H), 7.93 (d, J=8.1 Hz, 1H), 7.31 (s, 2H), 7.14 (s, 1H), 6.91 (d, J=8.9 Hz, 2H), 6.83 (d, J=8.7 Hz, 2H), 3.58-3.53 (m, 4H), 3.53-3.48 (m, 4H), 3.45 (q, J=5.8 Hz, 2H), 3.40 (dd, J=5.9, 1.5 Hz, 2H), 3.10 (s, 12H), 1.95 (d, J=1.7 Hz, 3H), 1.85 (d, J=1.9 Hz, 3H), 1.70 (p, J=6.5 Hz, 2H), 1.49 (p, J=6.6 Hz, 2H), 1.40 (h, J=7.2, 6.1 Hz, 2H), 1.33 (d, J=8.1 Hz, 2H). HRMS (ESI): m/z calc. for $C_{38}H_{50}ClN_5O_6S$ 740.3243; found 740.3246, $[M+H]^+$ ¹H NMR (400 MHz, Methanol-d₄) δ 8.03 (d, J=8.2 Hz, 1H), 7.96 (d, J=8.1 Hz, 1H), 7.42 (s, 2H), 7.15 (s, 1H), 6.99 (d, J=8.9 Hz, 2H), 6.86 (d, J=8.8 Hz, 2H), 3.54 (d, J=5.0 Hz, 4H), 3.52-3.48 (m, 4H), 3.45 (d, J=5.6 Hz, 2H), 3.41-3.37 (m, 2H), 3.14 (s, 12H), 2.75 (s, 6H), 1.92 (s, 3H), 1.89 (s, 3H), 1.70 (p, J=6.9 Hz, 2H), 1.49 (p, J=6.8 Hz, 2H), 1.40 (h, J=6.7, 6.0 Hz, 2H), 1.34-1.28 (m, 2H). HRMS (ESI): m/z calc. for $C_{49}H_{54}ClN_5O_6S$ 768.3556; found 768.3557, $[M+H]^+$

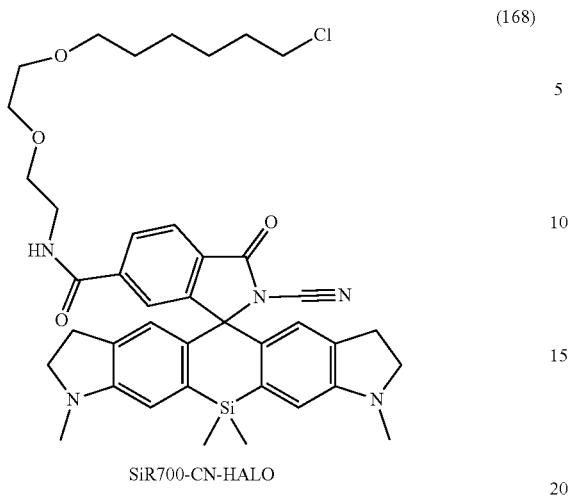

(168) SiR700-CN-HALO

¹H NMR (400 MHz, Chloroform-d) δ 8.05 (dd, J=8.0, 2.2 Hz, 1H), 7.88 (dd, J=8.1, 2.0 Hz, 1H), 7.36 (s, 1H), 6.59 (d, J=2.3 Hz, 2H), 6.48 (s, 2H), 3.60 (dt, J=11.6, 4.0 Hz, 6H), 3.54 (dt, J=6.9, 3.5 Hz, 4H), 3.40 (dt, J=8.7, 4.4 Hz, 2H), 3.34 (t, J=8.5 Hz, 4H), 2.95-2.70 (m, 10H), 1.77 (q, J=7.4 Hz, 2H), 1.54 (p, J=6.8, 6.3 Hz, 2H), 1.44 (p, J=7.8 Hz, 2H), 1.38-1.31 (m, 2H), 0.60 (d, J=2.2 Hz, 3H), 0.57 (d, J=2.3 Hz, 3H). HRMS (ESI): m/z calc. for $C_{40}H_{46}ClN_5O_4Si$ 726.3237; found 726.3238, $[M+H]^+$

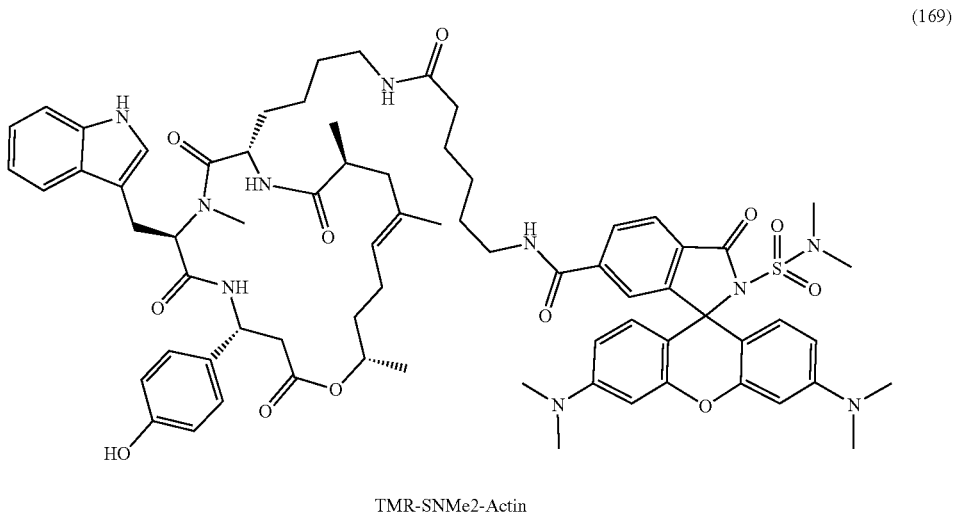 [SMILES: C/C1=C\CC[C@H](C)OC(=O)C[C@H](c2ccc(O)cc2)NC(=O)[C@@H](Cc2c[nH]c3ccccc23)N(C)C(=O)[C@H](CCCCNC(=O)CCCCCNC(=O)c2ccc3c(c2)C2(c4ccc(N(C)C)cc4Oc4cc(N(C)C)ccc42)N(S(=O)(=O)N(C)C)C3=O)NC(=O)[C@@H](C)C1]

(169) TMR-SNMe2-Actin

¹H NMR (400 MHz, Methanol-d₄) δ 8.34 (d, J=8.6 Hz, 1H), 8.18 (d, J=8.2 Hz, 1H), 8.01-7.96 (m, 1H), 7.86 (s, 1H), 7.55 (d, J=7.8 Hz, 1H), 7.26 (d, J=8.0 Hz, 1H), 7.17-6.80 (m, 11H), 6.74-6.67 (m, 2H), 5.58 (t, J=7.9 Hz, 1H), 5.20 (d, J=10.7 Hz, 1H), 5.00 (s, 1H), 4.73 (s, 1H), 3.40 (t, J=7.0 Hz, 2H), 3.24 (s, 12H), 3.13 (d, J=8.1 Hz, 2H), 3.06 (d, J=2.0 Hz, 3H), 2.97 (dt, J=14.0, 7.1 Hz, 1H), 2.88 (dt, J=13.4, 6.9 Hz, 1H), 2.68 (d, J=5.1 Hz, 1H), 2.58 (d, J=2.0 Hz, 6H), 2.25 (t, J=13.1 Hz, 1H), 2.16 (t, J=7.6 Hz, 2H), 1.86 (q, J=5.8 Hz, 3H), 1.62 (q, J=7.0, 6.1 Hz, 4H), 1.59-1.53 (m, 1H), 1.50 (s, 3H), 1.39 (q, J=8.3, 6.9 Hz, 3H), 1.30 (d, J=14.1 Hz, 3H), 1.22-1.10 (m, 5H), 1.08-1.02 (m, 3H), 1.01-0.84 (m, 3H), 0.78 (d, J=9.2 Hz, 1H). HRMS (ESI): m/z calc. for $C_{71}H_{88}N_{10}O_{12}S$ 653.3225; found 625.3222, $[M+2H]^{2+}$

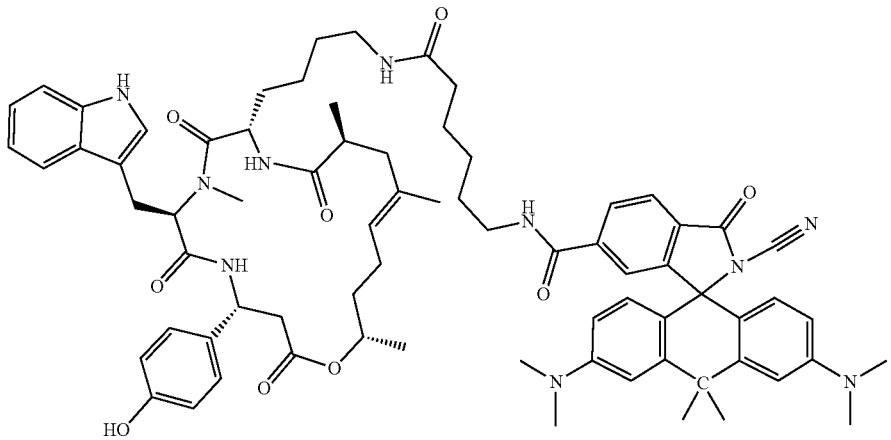

(170)

CPY-CN-Actin $^1$H NMR (400 MHz, Methanol-$d_4$) δ 8.38 (d, J=8.6 Hz, 1H), 8.16-8.09 (m, 1H), 8.09-8.03 (m, 1H), 7.59 (d, J=7.9 Hz, 1H), 7.37 (d, J=2.1 Hz, 1H), 7.32-7.21 (m, 3H), 7.04 (dd, J=13.1, 5.9 Hz, 4H), 7.00-6.94 (m, 1H), 6.93-6.84 (m, 2H), 6.77-6.66 (m, 4H), 5.63 (t, J=8.1 Hz, 1H), 5.24 (s, 1H), 5.03 (s, 1H), 4.74 (s, 1H), 3.26 (d, J=6.0 Hz, 2H), 3.17 (d, J=8.4 Hz, 2H), 3.09 (s, 15H), 3.01-2.84 (m, 2H), 2.77-2.64 (m, 2H), 2.60 (s, 1H), 2.26 (t, J=12.8 Hz, 1H), 2.11 (t, J=7.4 Hz, 2H), 1.95-1.91 (m, 3H), 1.90 (s, 2H), 1.87 (d, J=2.4 Hz, 3H), 1.59 (q, J=7.7 Hz, 3H), 1.52 (s, 5H), 1.45-1.38 (m, 1H), 1.31 (s, 3H), 1.23-1.13 (m, 5H), 1.06 (d, J=6.5 Hz, 3H), 1.02-0.94 (m, 2H), 0.93-0.87 (m, 1H), 0.80 (d, J=8.6 Hz, 1H). HRMS (ESI): m/z calc. for $C_{73}H_{88}N_{10}O_9$ 625.3441; found 625.3440, $[M+2H]^{2+}$

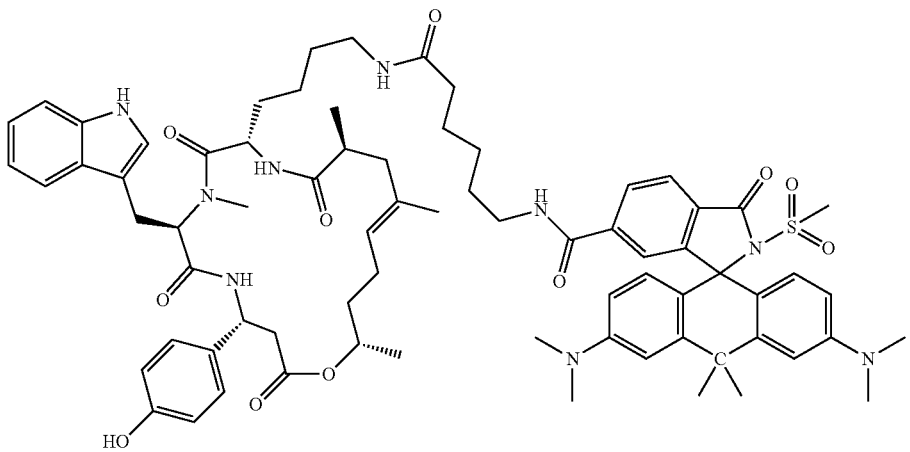

(171)

CPY-SCH3-Actin $^1$H NMR (400 MHz, Methanol-$d_4$) δ 8.37 (d, J=8.6 Hz, 1H), 8.07 (dd, J=8.0, 2.1 Hz, 1H), 7.95 (d, J=7.9 Hz, 1H), 7.58 (d, J=8.1 Hz, 1H), 7.40 (s, 2H), 7.31-7.24 (m, 1H), 7.17 (s, 1H), 7.08-7.00 (m, 4H), 6.96 (tt, J=7.7, 4.9, 4.3 Hz, 3H), 6.88 (d, J=8.7 Hz, 2H), 6.75-6.66 (m, 2H), 5.62 (t, J=8.1 Hz, 1H), 5.23 (d, J=10.0 Hz, 1H), 5.01 (d, J=7.3 Hz, 1H), 4.74 (d, J=5.7 Hz, 1H), 3.27-3.21 (m, 2H), 3.16 (d, J=8.2 Hz, 2H), 3.12 (d, J=2.7 Hz, 12H), 3.08 (d, J=2.2 Hz, 6H), 3.02-2.83 (m, 3H), 2.76-2.64 (m, 2H), 2.59 (d, J=9.1 Hz, 1H), 2.25 (t, J=12.9 Hz, 1H), 2.10 (t, J=7.8 Hz, 2H), 1.92 (d, J=2.2 Hz, 3H), 1.88 (d, J=8.4 Hz, 3H), 1.85 (d, J=2.2 Hz, 3H), 1.57 (q, J=7.0 Hz, 3H), 1.51 (s, 3H), 1.48 (d, J=7.5 Hz, 1H), 1.40 (dt, J=14.3, 6.9 Hz, 1H), 1.28 (q, J=8.0 Hz, 2H), 1.16 (dd, J=6.4, 2.1 Hz, 5H), 1.05 (dd, J=6.8, 2.1 Hz, 3H), 0.98 (q, J=6.6 Hz, 2H), 0.94-0.86 (m, 1H), 0.79 (d, J=8.8 Hz, 1H). HRMS (ESI): m/z calc. for $C_{73}H_{91}N_9O_{11}S$ 651.8352; found 651.8350, $[M+2H]^{2+}$ (172)
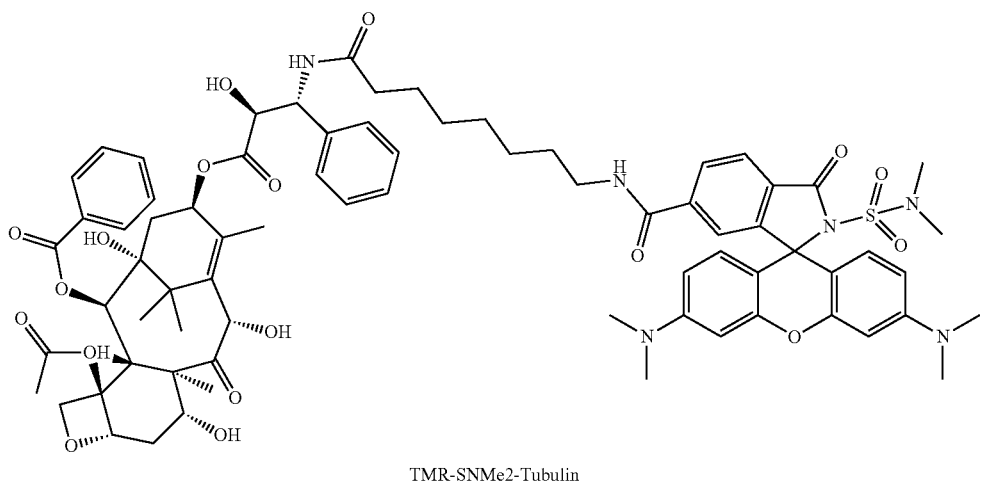
TMR-SNMe2-Tubulin
(173)
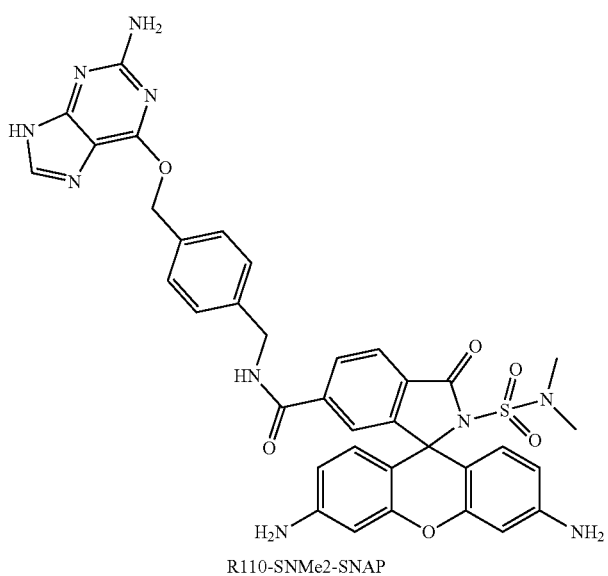
R110-SNMe2-SNAP
$^1$H NMR (400 MHz, Methanol-d$_4$) δ 8.31 (s, 1H), 8.21-8.13 (m, 1H), 8.01 (dd, J=8.1, 0.6 Hz, 1H), 7.76 (s, 1H), 7.54-7.47 (m, 2H), 7.38 (d, J=8.1 Hz, 2H), 6.91 (s, 2H), 6.77 (d, J=2.1 Hz, 2H), 6.72 (s, 2H), 5.62 (s, 2H), 4.56 (s, 2H), 2.63 (s, 6H).

73
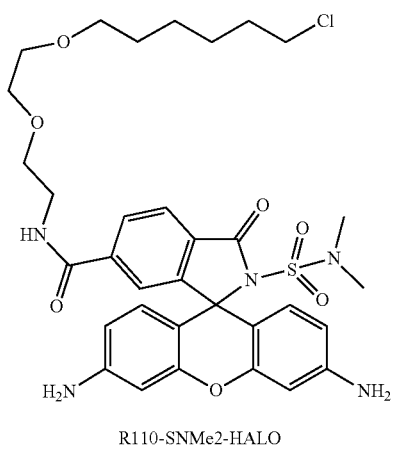
(174)
R110-SNMe2-HALO
74
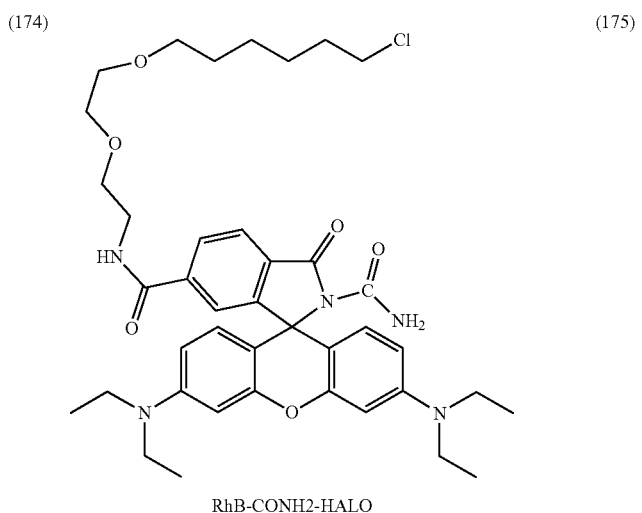
(175)
RhB-CONH2-HALO
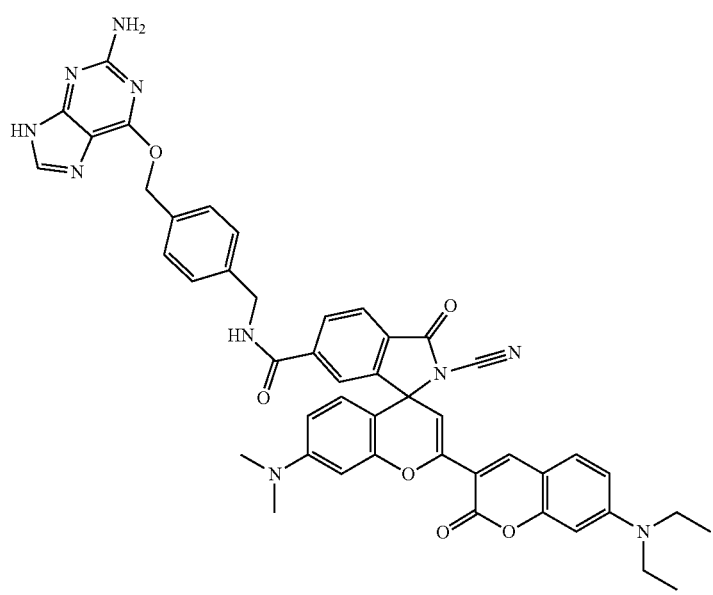
(176)
WS1-CN-SNAP (177)
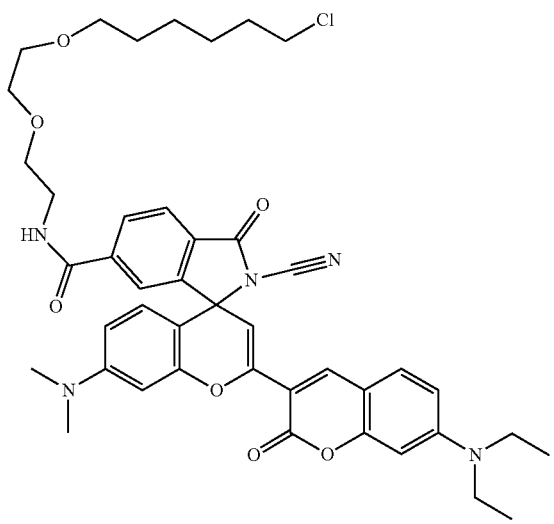
WS1-CN-HALO
(178)
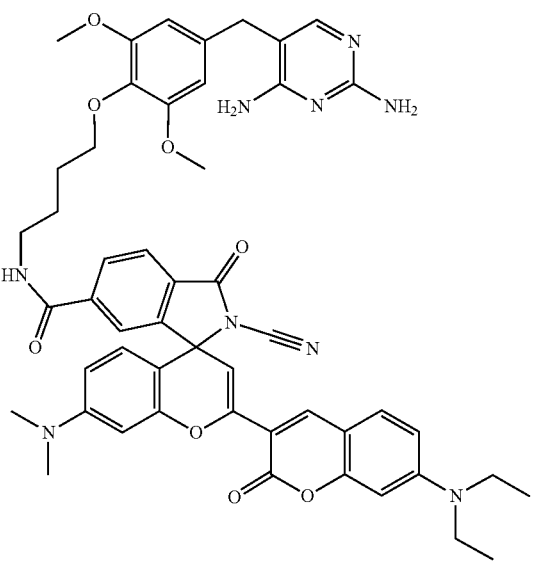
WS1-CN-TMP
(179)
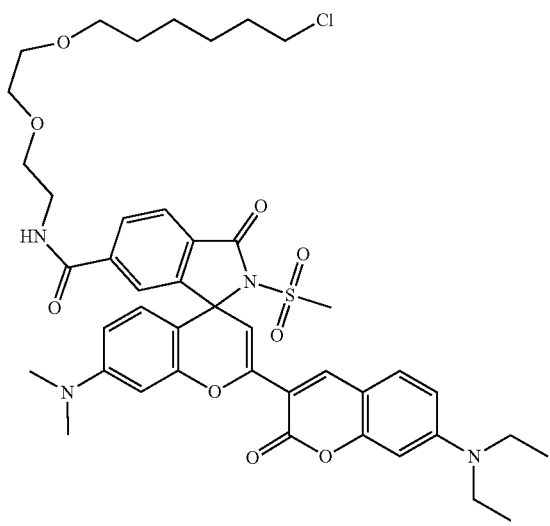
WS1-SCH3-HALO
(180)
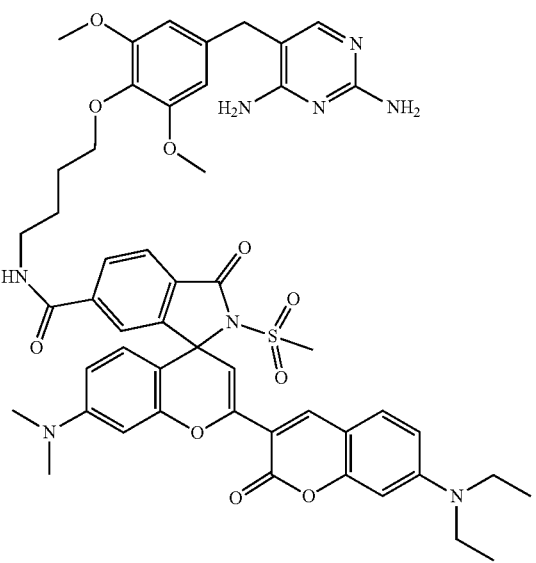
WS1-SCH3-TMP (181)
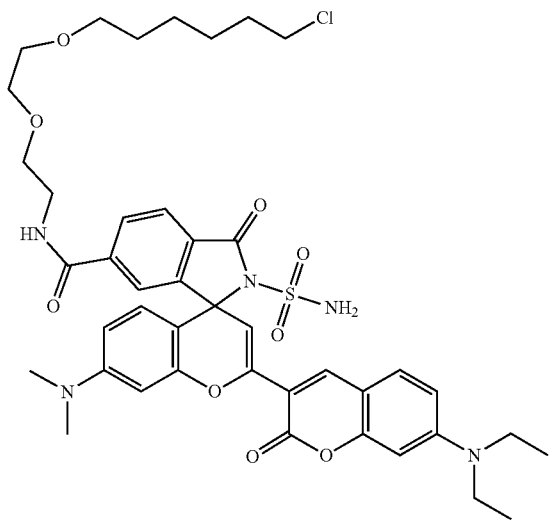
WS1-SNH2-HALO
(182)
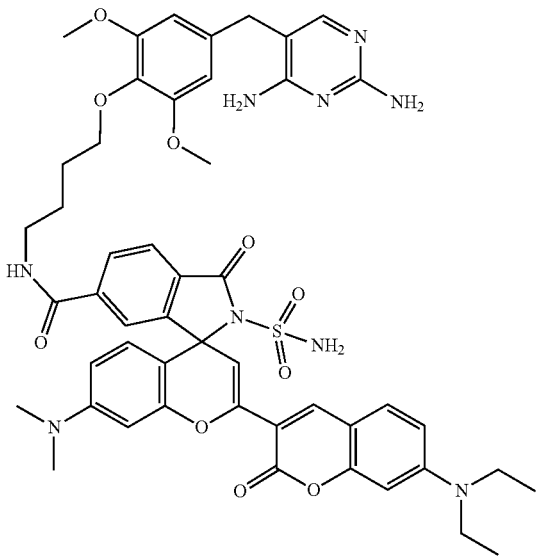
WS1-SNH2-TMP
(183)
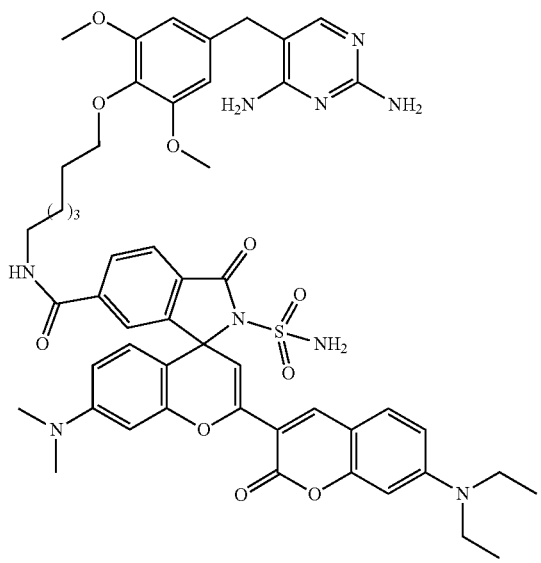
WS1-SNH2-TMP-C6
(184)
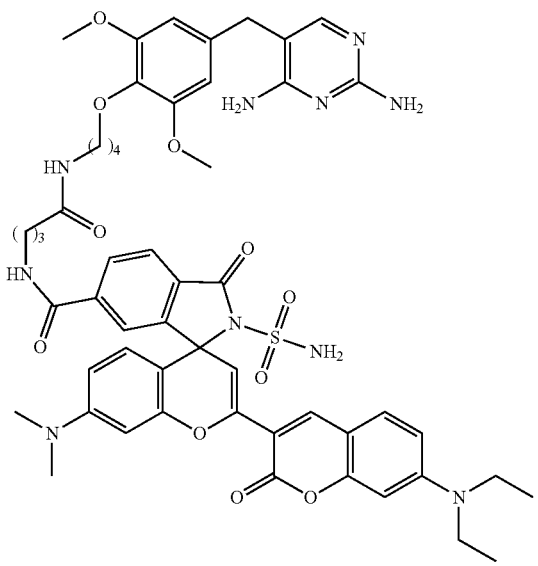
WS1-SNH2-TMP-C8
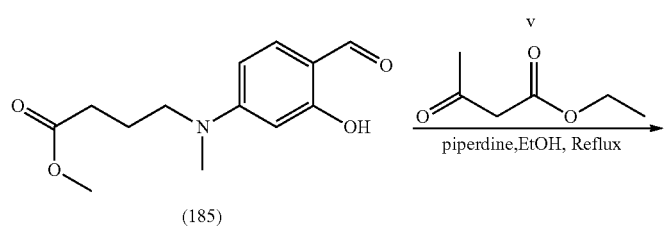
(185)

-continued
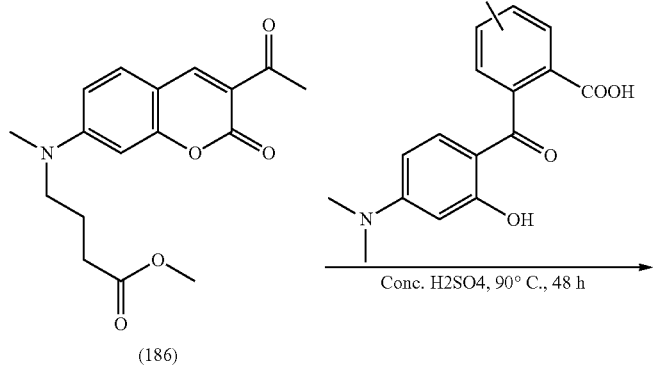
(186)
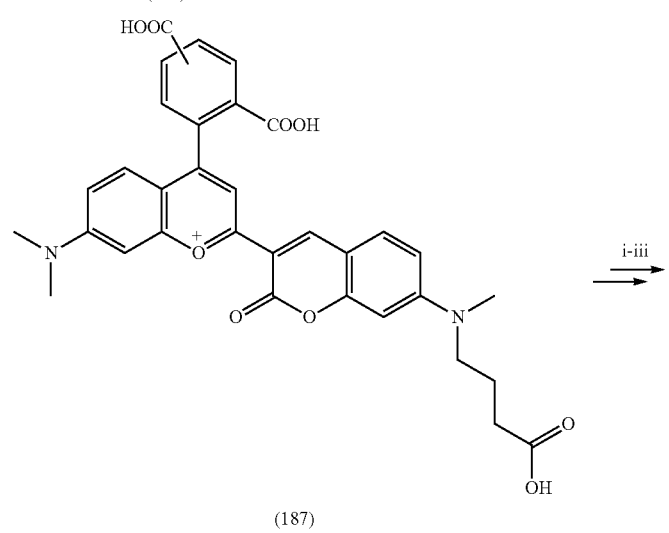
(187)
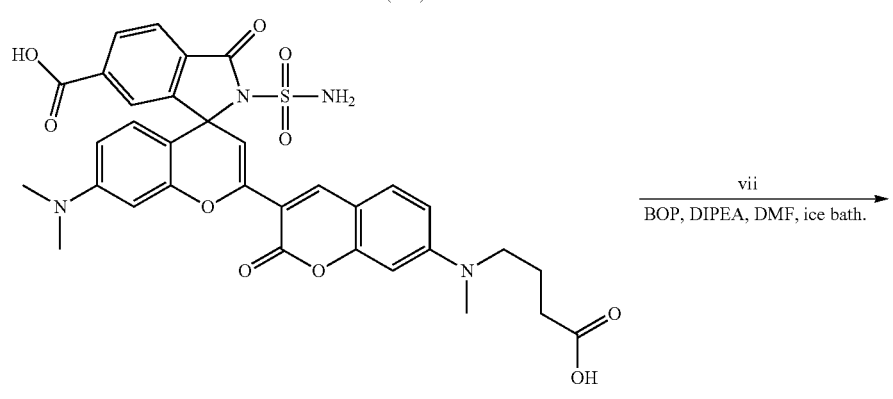
(188)
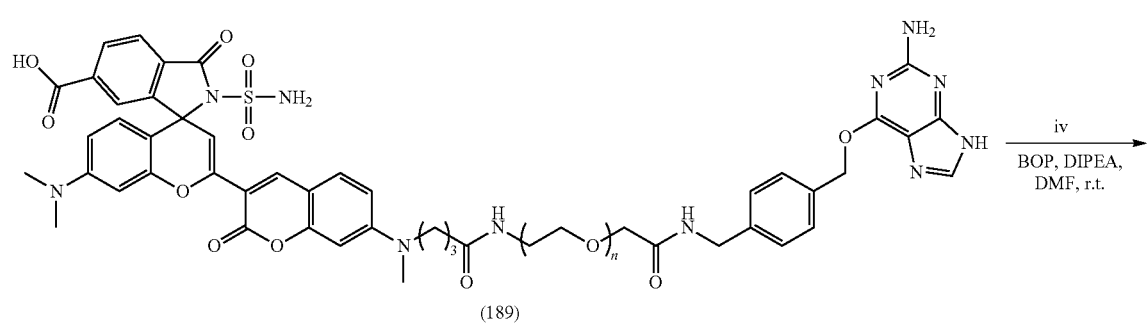
(189)

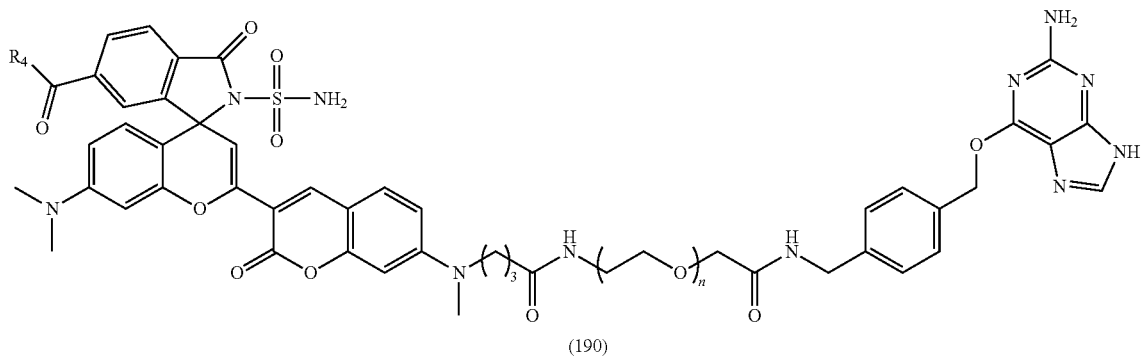

(190)

Step v

Methyl 4-((4-formyl-3-hydroxyphenyl)(methyl)amino)butanoate was synthesized based on reference (Lin et al., Chemistry 19, 2531-2538 (2013)). Methyl 4-((4-formyl-3-hydroxyphenyl)(methyl)amino)butanoate (1 eq.) and ethyl acetoacetate (1.5 eq.) were dissolved in EtOH and refluxed for 2 h. Then the reaction mixture was cooled to room temperature and the precipitate was filtered. The yellow solid methyl 4-((3-acetyl-2-oxo-2H-chromen-7-yl)(methyl)amino)butanoate was used in the next step without further purification.

Step vi

Methyl 4-((3-acetyl-2-oxo-2H-chromen-7-yl)(methyl)amino)butanoate (1 eq.) and 4-Dimethylamino-2-hydroxy-2',4'(5')-dicarboxy-benzophenones (1.5 eq.) (Kvach et al. Bioconjug Chem 20, 1673-1682 (2009)) were dissolved in conc. H2SO4 (5 mL) and stirred at 90° C. for 48 h. After cooling to room temperature, the solution was added ice then 70% perchloric acid, filtered, and washed with water to afford crude fluorophore semi-rhodamine derivatives.

The semi-rhodamine was dissolved in 3 mL DMF, and (2.0 eq) $K_2CO_3$ and 2.0 eq $Et_3N$ were added. Then allyl bromide (2.5 eq) was added slowly and stirred for 2 h at room temperature. It was then diluted with water and extracted with $CH_2Cl_2$ (2×). The combined organics were washed with brine, dried (MgSO4), filtered, and concentrated in vacuo. The mixture was purified by flash chromatography on silica gel. Compound 16 was obtained based on the above steps ii-iii.

Step vii

The fluorophores (1.0 eq) and BOP (1.2 eq), and DIEPA (2 eq) were dissolved in 2 mL DMF in ice bath. Polyethylene glycol-containing $O^6$-benzylguanine (1.0 eq.)[8] was added and stirred at 0° C. for 20 min. The mixture was purified through prep.-HPLC.

Compound WS1-SNH2-TMP-PEG2BG and WS1-SNH2-TMP-PEG5BG was synthesized based on the above step iv.

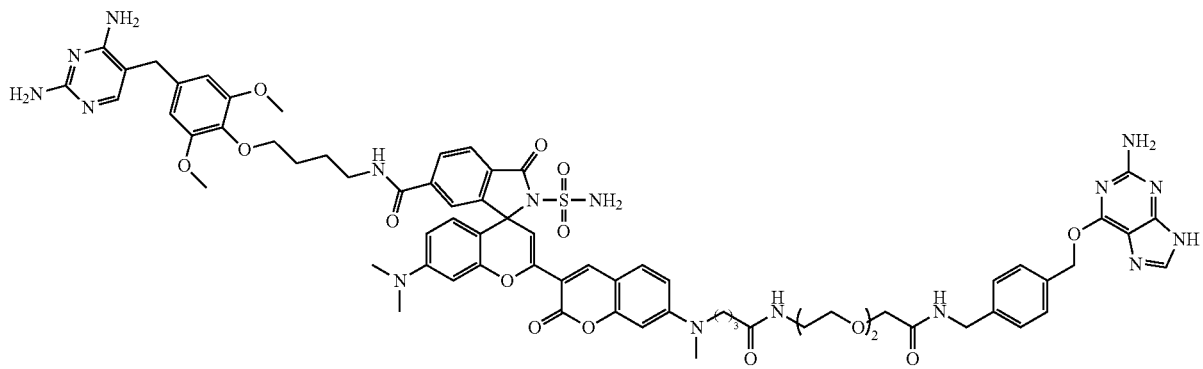

(191)

WS1-SNH2-TMP-PEG2BG

-continued (192)

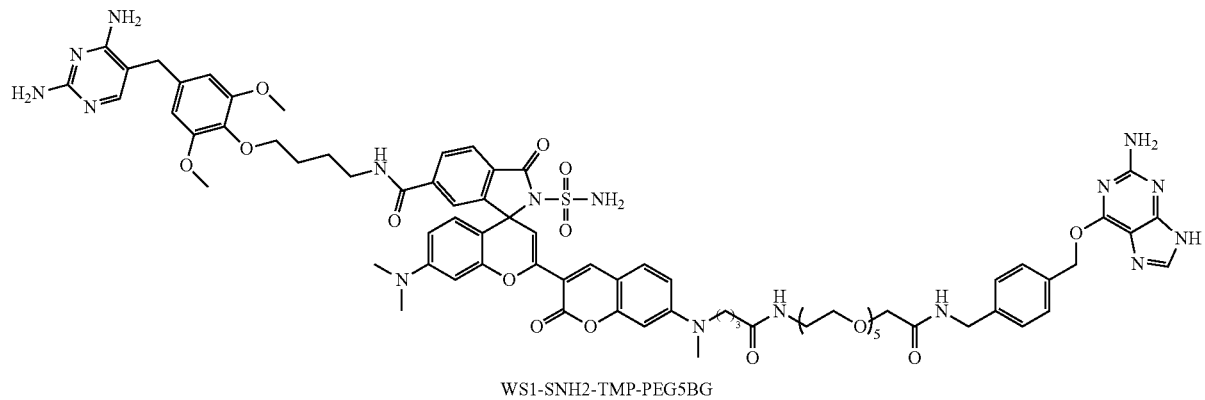

WS1-SNH2-TMP-PEG5BG

UV-Vis and Fluorescence Spectroscopy

Fluorescent and fluorogenic molecules for spectroscopy were prepared as stock solutions in DMSO and diluted such that the DMSO concentration did not exceed 1% (vol/vol). Spectroscopy was performed using 96-well plate (Thermo Fisher) with optical bottom. All measurements were taken at ambient temperature (25±2° C.). Absorption and fluorescence spectra were recorded on Spark® microplate reader (Tecan). Maximum absorption wavelength ($\lambda_{abs}$), and maximum emission wavelength ($\lambda_{em}$) were taken in 10 mM HEPES, pH 7.3 buffer unless otherwise noted; reported values for $\varepsilon$ are averages (n=3). Normalized spectra are shown for clarity.

Measurements of UV Absorbance Spectra in Water-Dioxane Mixtures

Solutions of 5 μM Rhodamine B, RhB-CH3 (201, Z=CH$_3$), RhB-Ben (201, Z=CH$_2$Ph), RhB-CN (201, Z=CN), RhB-SCH3 (115), RhB-SNH2 (116), RhB-SNMe$_2$ (117), RhB-CONH2 (118), WS1-SCF3, (119) WS1-SCH3 (120), WS1-CN (121), WS1-SNH2 (122), WS1-SO (123), WS1-UREA (124) in water-dioxane mixtures containing 10%, 20%, 30%, 40%, 50%, 60%, 70%, 80% and 90% of dioxane (by volume) were prepared. The absorbance spectra were recorded using a Spark® microplate reader (Tecan). The spectra were integrated from 400 to 700 nm for Rhodamine B-based fluorophores and from 350 to 750 nm for WS1-based fluorophores using the software Prism 7. Normalized integrals were plotted against dielectric constant of water-dioxane mixture.

Measurement of Increase in Absorbance and Fluorescence.

SNAP-HaloTag protein were used as a 85 μM-200 μM solution in 75 mM NaCl, 50 mM TRIS-HCl, pH 7.4 with 50% v/v glycerol (TBS-glycerol). SNAPTag and HaloTag based fluorogenic probes were diluted to 1.0-2.0 μM in 10 mM HEPES, pH 7.3. Then an aliquot of SNAPTag/HaloTag protein (1.5-2.0 equiv) was added and the resulting mixture was incubated until consistent absorbance signal was observed (~60 min).

TMP-containing fluorophores were diluted to 1.0-2.5 μM in HEPES buffer (10 mM, pH 7.3, 0.1% Triton X-100). Protein ecDHFR and DHFR-2 used as a 200-400 μM solution in 75 mM NaCl, 50 mM TRIS-HCl, pH 7.4 with 50% v/v glycerol (TBS-glycerol) were added and mixed with fluorophores for 10-30 min.

SDS (10% in 10 mM HEPES) was added with dilution of 100 folds as a control group. Absorbance and fluorescence measurements were performed in in 96-well plate (Thermos Fisher) with optical bottom.

Generation of U2OS FlpIn Halo-SNAP-NLS Cell Lines

The Flp-In™ System (ThermoFisher Scientific) was used to generated U2OS FlpIn Halo-SNAP-NLS expressing cells. pcDNA5-FRT-Halo-SNAP-NLS and pOG44 were co-transfected into the host cell line U2OS FLpIn (Malecki et al. *Molecular and Cellular Biology* 26, 4642 (2006)). Homologous recombination between the FRT sites in pcDNA5-FRT-Halo-SNAP-NLS and on the host cell chromosome, catalysed by the Flp recombinase expressed from pOG44, produced the U2OS FlpIn Halo-SNAP-NLS stably expressing cells.

Live-Cell Confocal Imaging

U2OS FlpIn Halo-SNAP-NLS expressing cells were grown in 96-well plate (Thermos Fisher) with optical bottom at 37° C. in a humidified 5% (vol/vol) CO2 environment. 50-500 nM probes and 2 μM verapamil were added and incubated for 1 h in DMEM media (Evrogen) containing 10% FBS. The cells were directly used to image without washing. Meanwhile, another group was imaged after being washed 2 times for 5 min with 1× phosphate buffered saline (PBS, pH 7.4) and DMEM supplemented with 10% FBS. Imaging was performed using Leica TCS SP8 confocal microscope. TMR- and Rhodamine B—, and Rhodamine 110-based probes were excited at 540 nm and the fluorescence signal was collected from 560-700 nm. Semi-Rhodamine-based probes were excited at 650 nm and the fluorescence signal was excited from 670-760 nm. Images were processed with Fiji (http://fiji.sc/wiki/index.php/Fiji) to obtain MIP (maximum intensity projections)

Abbreviations:

ACN, acetonitrile; BOP, benzotriazol-1-yloxytris(dimethylamino)phosphonium hexafluorophosphate; DCM, dichloromethane; DIEPA, diisopropylethylamine; DMF, dimethylformamide; LCMS, liquid chromatography-mass spectrometry; NBS, N-bromosuccinimide; PBS, phosphate buffered saline; r.t., room temperature; secBuLi secondary butyl lithium

TABLE 1

Photophysical properties of TAMRA derivatives.

| | Z | $\lambda_{abs}/\lambda_{em}$ | $\varepsilon/\varepsilon^{protein}/\varepsilon^{SDS}$ ($M^{-1}cm^{-1}$) | $\Phi$ | $D_{50}$ | $F/F_0$ | $F_{nuc.}/F_{cyt.}$ |
|---|---|---|---|---|---|---|---|
| 6-TAMRA | O | $550^a/578^a$ | $84,000^a$ | $0.43^a/0.39^c$ | $12^d$ | — | — |
| 132 | NCN | $552^a/580^a$ | $89,000^a$ | $0.45^a/0.45^c$ | $32^d$ | — | — |
| 133 | $NSO_2CH_3$ | $553^a/580^a$ | $89,000^a$ | $0.43^a/0.46^c$ | $44^d$ | — | — |
| 134 | $NSO_2NH_2$ | $552^a/580^a$ | $83,000^a$ | $0.44^a/0.44^c$ | $57^d$ | — | — |
| 135 | $NSO_2N(CH_3)_2$ | $553^a/580^a$ | $88,000^a$ | $0.4^a/0.43^c$ | $58^d$ | — | — |
| 150 | O | $555^b/578^b$ | $22,000^a/66,000^b/82,000^c$ | $0.42^b/0.61^c$ | — | $7.9 \pm 0.2^e$ | $1.8 \pm 0.1^f$ |
| 152 | NCN | $558^b/580^b$ | $18,000^a/68,000^b/82,000^c$ | $0.33^b/0.58^c$ | — | $18 \pm 2.6^e$ | $8.1 \pm 0.9^f$ |
| 154 | $NSO_2CH_3$ | $558^b/580^b$ | $15,000^a/65,000^b/86,000^c$ | $0.38^b/0.65^c$ | — | $9.7 \pm 0.1^e$ | $7.9 \pm 0.9^f$ |
| 156 | $NSO_2NH_2$ | $557^b/578^b$ | $9,800^a/57,000^b/89,000^c$ | $0.46^b/0.62^c$ | — | $13 \pm 2.4^e$ | $9.8 \pm 0.8^f$ |
| 158, MaP555-SNAP | $NSO_2N(CH_3)_2$ | $556^b/576^b$ | $3,500^a/54,000^b/88,000^c$ | $0.46^b/0.61^c$ | — | $21 \pm 3.2^e$ | $15 \pm 2.9^f$ |
| 151 | O | $555^b/578^b$ | $58,000^a/82,000^b/87,000^c$ | $0.51^b/0.68^c$ | — | $1.8 \pm 0.1^e$ | $9.4 \pm 1.7^f$ |
| 153 | NCN | $557^b/580^b$ | $15,000^a/71,000^b/79,000^c$ | $0.46^b/0.71^c$ | — | $7.3 \pm 0.8^e$ | $10 \pm 0.4^f$ |
| 155 | $NSO_2CH_3$ | $559^b/580^b$ | $40,000^a/85,000^b/95,000^c$ | $0.56^b/0.66^c$ | — | $3.7 \pm 0.4^e$ | $12 \pm 2.6^f$ |
| 157 | $NSO_2NH_2$ | $558^b/580^b$ | $9,600^a/87,000^b/91,000^c$ | $0.56^b/0.65^c$ | — | $19 \pm 3.2^e$ | $14 \pm 0.7^f$ |
| 159, MaP555-Halo | $NSO_2N(CH_3)_2$ | $558^b/578^b$ | $5,200^a/87,000^b/92,000^c$ | $0.54^b/0.63^c$ | — | $35 \pm 2.3^e$ | $18 \pm 2.9^f$ |
| 169, MaP555-actin | $NSO_2N(CH_3)_2$ | $558^g/580^g$ | $3,600^i/95,000^g/103,000^j$ | $0.57^g/0.49^j$ | — | $107 \pm 9.6^m$ | — |
| 172, MaP555-tubulin | $NSO_2N(CH_3)_2$ | $559^h/582^h$ | $13,000^k/75,000^h/84,000^l$ | $0.53^h/0.41^l$ | — | $11 \pm 0.3^n$ | — |

[a] HEPES buffer (pH 7.3),
[b] binding with SNAP-Halo-tag,
[c] 0.1% SDS in HEPES buffer (pH 7.3),
[d] dioxane-$H_2O$ mixture (v/v: 90/10 –10/90),
[e] ratio of fluorescence intensities at 580 nm in the presence and absence of SNAP-Halo-tag,
[f] average ratio between nuclear signal (U2OS FlpIn Halo-SNAP-NLS expressing cells) and cytosol signal (normal U2OS cell),
[g] binding with actin,
[h] binding with tubulin,
[i] general actin buffer,
[j] 0.2% SDS in general actin buffer,
[k] general tubulin buffer,
[l] 0.2% SDS in general tubulin buffer,
[m] ratio of fluorescence intensities at 580 nm in the presence and absence of actin,
[n] ratio of fluorescence intensities at 580 nm in the presence and absence of tubulin.
Error bars show ± s.e.m.

TABLE 2

Photophysical properties of R110 derivatives.

| | Z | $\lambda_{abs}/\lambda_{em}$ | $\varepsilon/\varepsilon^{protein}/\varepsilon^{SDS}$ ($M^{-1}$ $cm^{-1}$) | $\Phi$ | $D_{50}$ | $F/F_0$ | $F_{nuc.}/F_{cyt.}$ |
|---|---|---|---|---|---|---|---|
| 21 | $NSO_2N(CH_3)_2$ | $502^a/526^a$ | $74,000^a$ | $0.68^a/0.69^c$ | $70^d$ | — | — |
| 174, MaP510-Halo | $NSO_2N(CH_3)_2$ | $510^b/531^b$ | $4,500^a/61,000^b/73,000^c$ | $0.97^b/0.95^c$ | — | $11 \pm 1.8^e$ | $18 \pm 2.9^f$ |

[a] HEPES buffer (pH 7.3),
[b] binding with SNAP-Halo-tag,
[c] 0.1% SDS in HEPES buffer (pH 7.3),
[d] dioxane-$H_2O$ mixture (v/v: 90/10-10/90),
[e] ratio of fluorescence intensities at 530 nm in the presence and absence of SNAP-Halo-tag,
[f] average ratio between nuclear signal (U2OS FlpIn Halo-SNAP-NLS expressing cells) and cytosol signal (normal U2OS cell).
Error bars show ± s.e.m

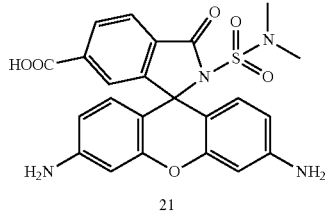 [SMILES: CN(C)S(=O)(=O)N1C(=O)c2ccc(C(=O)O)cc2C12c1ccc(N)cc1Oc1cc(N)ccc12]

21

TABLE 3

Photophysical properties of CPY derivatives.

| | Z | $\lambda_{abs}/\lambda_{em}$ | $\varepsilon/\varepsilon^{protein}/\varepsilon^{SDS}$ (M$^{-1}$ cm$^{-1}$) | $\Phi$ | $D_{50}$ | $F/F_0$ | $F_{nuc.}/F_{cyt.}$ |
|---|---|---|---|---|---|---|---|
| 24 | O | 610$^a$/635$^a$ | 113,000$^a$ | 0.50$^b$/0.51$^c$ | 38$^d$ | — | — |
| 25 | NCN | 612$^a$/638$^a$ | 68,800$^a$ | 0.50$^b$/0.49$^c$ | 72$^d$ | — | — |
| 26 | NSO$_2$CH$_3$ | 612$^a$/636$^a$ | 30,600$^a$ | 0.50$^b$/0.57$^c$ | >75$^d$ | — | — |
| 27 | NSO$_2$NH$_2$ | 612$^a$/— | 2,000$^a$ | —/— | >75$^d$ | — | — |
| 28 | NSO$_2$N(CH$_3$)$_2$ | 612$^a$/— | 1,000$^a$ | —/— | >75$^d$ | — | — |
| 161 | NCN | 618$^b$/635$^b$ | 1,500$^a$/144,000$^b$/70,000$^c$ | 0.53$^b$/0.72$^c$ | — | 112 ± 3.8$^e$ | 19 ± 1.2$^f$ |
| 163 | NSO$_2$CH$_3$ | 618$^b$/635$^b$ | 1,600$^a$/121,000$^b$/45,000$^c$ | 0.50$^b$/0.76$^c$ | — | 179 ± 14$^e$ | 24 ± 1.8$^f$ |
| 165 | NSO$_2$NH$_2$ | 618$^b$/635$^b$ | 440$^a$/101,000$^b$/8,300$^c$ | 0.58$^b$/— | — | 611 ± 42$^e$ | 30 ± 4.5$^f$ |
| 167 | NSO$_2$N(CH$_3$)$_2$ | 618$^b$/635$^b$ | 260$^a$/107,000$^b$/7,200$^c$ | 0.61$^b$/— | — | 1000 ± 44$^e$ | 58 ± 3.9$^f$ |
| 171 | NSO$_2$CH$_3$ | 618$^g$/635$^g$ | 500$^h$/61,000$^g$/24,000$^i$ | 0.78$^g$/0.71$^i$ | — | 449 ± 6.8$^j$ | — |

$^a$HEPES buffer (pH 7.3),
$^b$binding with SNAP-Halo-tag,
$^c$0.1% SDS in HEPES buffer (pH 7.3),
$^d$dioxane-H$_2$O mixture (v/v: 90/10-10/90),
$^e$ratio of fluorescence intensities at 635 nm in the presence and absence of SNAP-Halo-tag,
$^f$average ratio between nuclear signal (U2OS FlpIn Halo-SNAP-NLS expressing cells) and cytosol signal (normal U2OS cell),
$^g$binding with actin,
$^h$general actin buffer,
$^i$0.2% SDS in general actin buffer,
$^j$ratio of fluorescence intensities at 635 nm in the presence and absence of actin. Error bars show ± s.e.m.

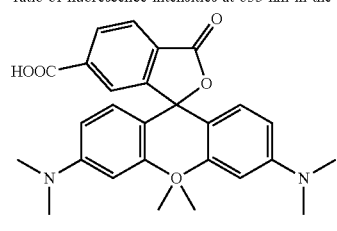

24

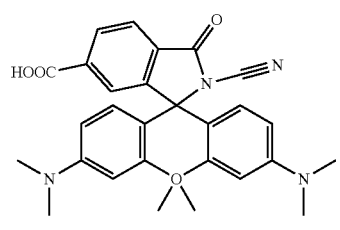

25

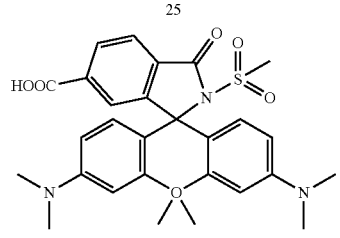

26

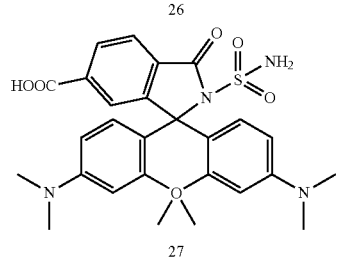

27

TABLE 3-continued

Photophysical properties of CPY derivatives.

| Z | $\lambda_{abs}/\lambda_{em}$ | $\epsilon/\epsilon^{protein}/\epsilon^{SDS}$ (M$^{-1}$ cm$^{-1}$) | $\Phi$ | $D_{50}$ | $F/F_0$ | $F_{nuc.}/F_{cyt.}$ |
|---|---|---|---|---|---|---|

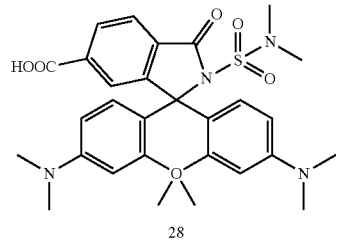

28

TABLE 4

Photophysical properties of SiR700 derivatives.

| | Z | $\lambda_{abs}/\lambda_{em}$ | $\epsilon/\epsilon^{protein}/\epsilon^{SDS}$ (M$^{-1}$ cm$^{-1}$) | $\Phi$ | $D_{50}$ | $F/F_0$ | $F_{nuc.}/F_{cyt.}$ |
|---|---|---|---|---|---|---|---|
| 35 | O | 694$^a$/718$^a$ | 104,000$^a$ | 0.17$^b$/ 0.16$^c$ | 54$^d$ | — | — |
| 140 | NCN | 698$^a$/720$^a$ | 8,200$^a$ | —/— | >75$^d$ | — | — |
| 37 | O | 695$^b$/718$^b$ | 38,000$^a$/83,000$^b$/ 85,000$^c$ | 0.27$^b$/0.25$^c$ | — | 7.5 ± 0.2$^e$ | 6.7 ± 1.5$^f$ |
| 168 | NCN | 700$^b$/720$^b$ | 340$^a$/52,000$^b$/ 12,000$^c$ | 0.24$^b$/0.18$^c$ | — | 650 ± 5.8$^e$ | 47 ± 3.4$^f$ |

$^a$HEPES buffer (pH 7.3),
$^b$binding with SNAP-HALO-tag,
$^c$0.1% SDS in HEPES buffer (pH 7.3),
$^d$dioxane-H$_2$O mixture (v/v: 90/10-10/90),
$^e$ratio of fluorescence intensities at 720 nm in the presence and absence of SNAP-Halo-tag,
$^f$average ratio between nuclear signal (U2OS Flpln Halo-SNAP-NLS expressing cells) and cytosol signal (normal U2OS cell). Error bars show ± s.e.m.

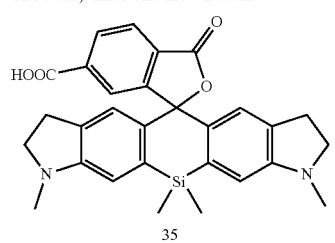

35

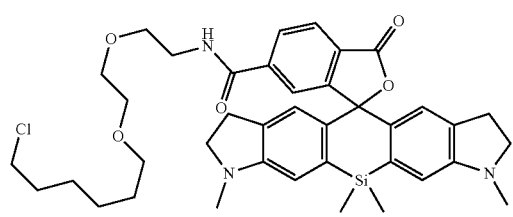

37

The invention claimed is:
1. A compound of the general formula (10) or the general formula (10')

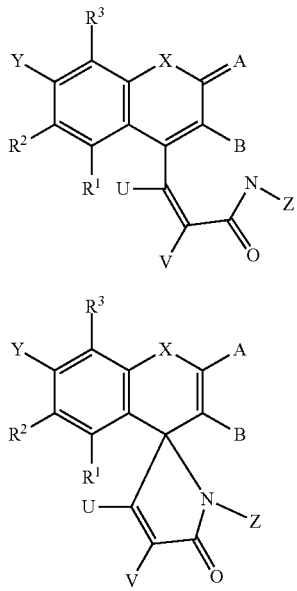

(10)

(10')

wherein
R$^1$ is selected from H and F;
R$^2$ and R$^3$ are independently selected from H, fluoro-, amino-, hydroxyl-, SO$_3$H— and/or carboxyl substituted or unsubstituted C$_1$ to C$_4$ alkyl;
X is O;
Y is OH or NR$^{Y1}$R$^{Y2}$, with
  R$^{Y1}$, and R$^{Y2}$ each independently selected from H, an unsubstituted or hydroxy-, amino-, halogen-, and/or carboxy-substituted hydrocarbon moiety selected from C$_1$-C$_8$ alkyl, C$_3$-C$_8$ cycloalkyl, C$_1$-C$_4$ acyl, C$_7$-C$_{12}$ alkylaryl, an unsubstituted phenyl or a phenyl substituted by any one or several of the following substituents: unsubstituted C$_1$-C$_4$ alkyl, halogen, C$_1$-C$_4$ oxyalkyl, COOH, COOR$^{YC}$, CONR$^{YC}$$_2$, with R$^{YC}$ being selected from H and unsubstituted or amino- or hydroxy-substituted C$_1$-C$_8$ alkyl; or
  R$^{Y1}$ and R$^{Y2}$ together are a C$_3$-C$_6$ unsubstituted or hydroxy-, amino-, halogen-, alkoxy- and/or carboxy-substituted alkyl forming a 4-7-membered ring structure with Y; or
  one of R$^{Y1}$ and R$^{Y2}$, or both R$^{Y1}$ and R$^{Y2}$, together with R$^2$ and/or R$^3$, respectively, form an unsubstituted or hydroxy-, amino-, halogen-, carboxy- and/or aryl-substituted 4-7-membered alkyl or alkylene ring;
a) A and B together with the atoms that they are covalently coupled to form a phenyl ring or 5- or 6-membered heteroaryl ring, wherein the ring is unsubstituted or substituted by one of NR$^{N1}$R$^{N2}$— and OH and wherein the ring is optionally further substituted by R$^4$, R$^5$ and/or R$^6$, wherein
  R$^{N1}$ and R$^{N2}$ have the same meanings as R$^{Y1}$, and R$^{Y2}$ above,
  R$^4$ has the same meaning as R$^3$, R$^5$ has the same meaning as R$^1$, and R$^6$ has the same meaning as R$^2$;
b) A is an unsubstituted or hydroxy-, amino-, halogen- and/or carboxy-substituted conjugated carbocycle or heterocycle having one, two or three rings; and B is selected from H (or D, F) and a moiety having a molecular weight between 15 and 250 u (g/mol);
U and V
  together with the atoms they are covalently coupled to form an unsubstituted or substituted 5-7 membered ring,
  wherein the substitution is selected from one or several substituents independently selected from OH, SH, amine, halogen, CN, NC, CNO, NCO, CNS, NCS, unsubstituted C$_1$-C$_4$ O-alkyl, C$_1$-C$_4$ S-alkyl, O-aryl, S-aryl, NO$_2$, CHO, CONR$^{UV}$$_2$, COOR$^{UV}$, COO-aryl, COO-alkylaryl, PO$_3$H, PO$_3$R$^{UV}$, SO$_3$H, SO$_3$R$^{UV}$ and SO$_2$R$^{UV}$, with R$^{UV}$ being selected from H, and C$_1$-C$_4$ unsubstituted alkyl
  and the 5-7 membered ring is selected from
    cycloalkyl,
    aryl,
    heteroaryl, or
U is selected from H, D and F and V is selected from H, D, F, and C$_1$ to C$_4$ unsubstituted or amino-, hydroxy- or halogen substituted alkyl,
Z is selected from
  CN, CHO, COR$^Z$, COOR$^Z$, and CONR$^Z$$_2$, wherein each R$^Z$ is independently selected from H, unsubstituted or hydroxy-, amino-, halogen-, and/or carboxy-substituted C$_1$-C$_8$ alkyl, C$_3$-C$_8$ cycloalkyl, C$_1$-C$_4$ acyl, C$_7$-C$_{12}$ alkylaryl, unsubstituted phenyl or phenyl substituted by any one or several of the following substituents: unsubstituted C$_1$-C$_4$ alkyl, halogen, C$_1$-C$_4$ oxyalkyl, COOR$^C$, CONR$^C$$_2$, with R$^C$ being selected from H, C$_1$-C$_8$ alkyl; or
  SO$_2$R$^S$ with R$^S$ being selected from
    NH$_2$, NHR$^{SN}$, and NR$^{SN}$$_2$, with each R$^{SN}$ independently selected from an unsubstituted or hydroxy-, amino-, halogen-, and/or carboxy-substituted moiety selected from C$_1$-C$_8$ alkyl, C$_3$-C$_8$ cycloalkyl, C$_1$-C$_4$ acyl, C$_7$-C$_{12}$ alkylaryl, or from unsubstituted phenyl or phenyl substituted by any one or several of the following substituents: unsubstituted C$_1$-C$_4$ alkyl, halogen, O—C$_1$-C$_4$ alkyl, COOH, COOR$^C$, CONR$^C$$_2$, with R$^C$ being selected from H and C$_1$-C$_8$ alkyl;
    an unsubstituted or hydroxy-, amino-, halogen-, and/or carboxy-substituted moiety selected from C$_1$-C$_8$ alkyl, C$_3$-C$_8$ cycloalkyl, C$_1$-C$_4$ acyl, C$_7$-C$_{12}$ alkylaryl, unsubstituted phenyl or phenyl substituted by any one or several of the following substituents: unsubstituted C$_1$-C$_4$ alkyl, halogen, O—C$_1$-C$_4$ alkyl, COOH, COOR$^{SC}$, CONR$^{SC}$$_2$, with R$^{SC}$ being selected from H and C$_1$-C$_8$ alkyl;
    OR$^{SO}$, with R$^{SO}$ selected from a unsubstituted or hydroxy-, amino-, halogen-, and/or carboxy-substituted moiety selected from C$_1$-C$_8$ alkyl, C$_3$-C$_8$ cycloalkyl, C$_1$-C$_4$ acyl, C$_7$-C$_{12}$ alkylaryl, or from unsubstituted phenyl or phenyl substituted by any one or several of the following substituents: unsubstituted C$_1$-C$_4$ alkyl, halogen, O—C$_1$-C$_4$ alkyl, COOH, COOR$^C$, CONR$^C$$_2$, with R$^C$ being selected from H and C$_1$-C$_8$ alkyl;
  CH$_2$R$^F$, CHR$^F$$_2$, and CR$^F$$_3$, with R$^F$ selected from CH$_2$F, CHF$_2$, CF$_3$, CH$_2$Cl, and CHCl$_2$, CCl$_3$;
  H
  CH$_2$COOR$^{K1}$ or CH$_2$CONHR$^{K1}$ with R$^{K1}$ selected from H, and unsubstituted or halogen-substituted C$_1$ to C$_4$ alkyl;

with the proviso that the following compounds are not claimed:

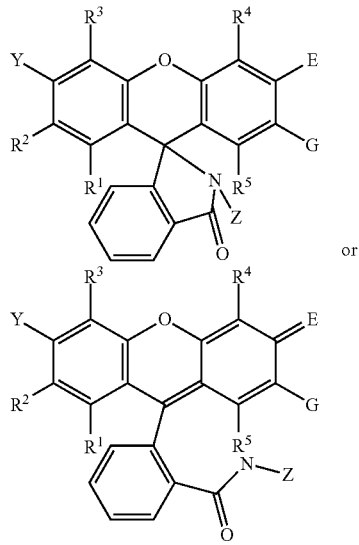

with
R$^1$, R$^2$, R$^3$, R$^4$, R$^5$ and G are H, and
Y and E are NEt$_2$ and
Z is CONH$_2$ or
Z is CONHC$_6$H$_5$; or
Z is CN or
Z is selected from CH$_2$CF$_3$, CH$_2$CHF$_2$, and CH$_2$CH$_2$F, or
Z is selected from CH$_2$COOCH$_3$ and CH$_2$COOH,
Z is H,
or
Y and E are NMe$_2$ and Z is selected from CH$_2$COOCH$_3$ and CH$_2$COOH or
Y and E are NH$_2$ and Z is selected from CH$_2$COOH and CH$_2$COOCH$_3$
or
Y is OH and E is =O (for formula 10) or E is OH (for formula 10'), and Z is C(=O)(CH$_3$)C$_6$H$_5$;
or
R$^1$, R$^3$, R$^4$, and R$^5$ are H, R$^2$ and G are methyl, Y and E are NHEt and Z is CH$_2$COOH or CH$_2$COOCH$_3$
or the compound is of formula (301), (302), (303), or (304)

(301)
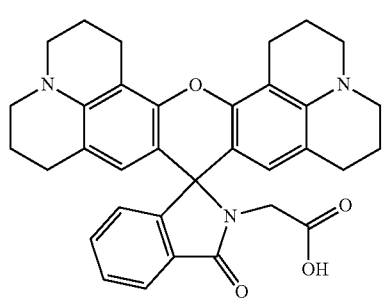

(302)
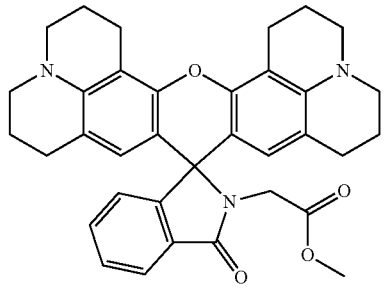

(303)
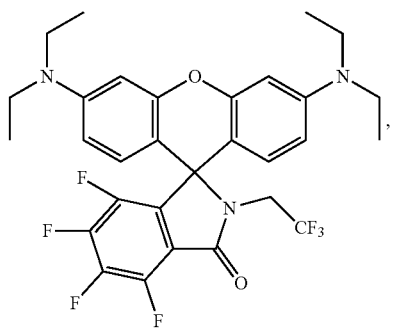

(304)
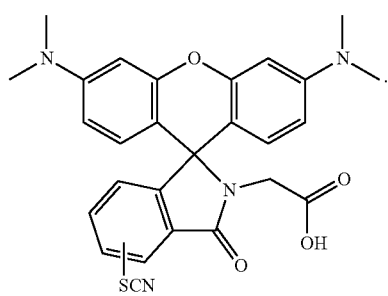

2. The compound according to claim 1, wherein the compound further comprises a moiety M selected from:
a. a moiety able to form one of an ester bond, an ether bond, an amide bond, a disulfide bond, a Schiff base, or a moiety able to react in a click-chemistry reaction, wherein the moiety is selected from —COCHCH$_2$, —CO—NHS, biotin, an azide or ethyne moiety, a tetrazine moiety, a (bicyclo[6.1.0]nonyne) moiety, a cyclooctyne moiety, a transcyclooctene moiety and a maleimide, or a moiety employed for specific protein labelling,
b. a substrate of an O$^6$-alkylguanine-DNA-alkyltransferase or a functional variant thereof, selected from a 6-[(4-methylenephenyl)methoxy]-9H-purin-2-amine moiety of formula (71), a moiety of formula (72), or a moiety of formula (73),

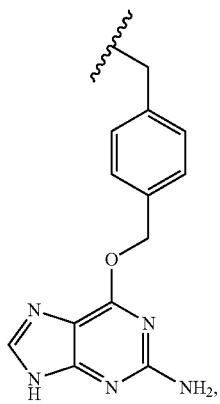
(71)

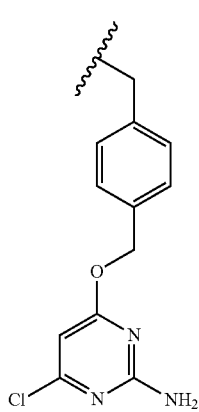
(72)

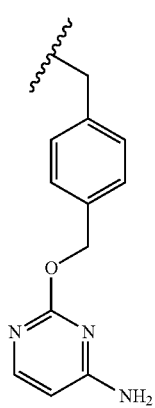
(73)

c. a substrate of a haloalkane halotransferase, of a 1-chlorohexyl moiety as exemplarily shown below;

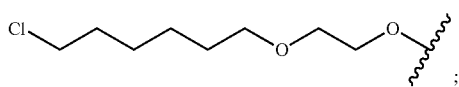
(74)

or from d. a substrate of dihydrofolate reductase, represented by:

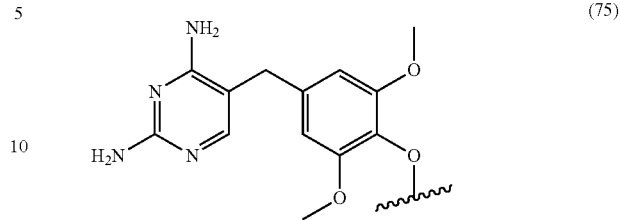
(75)

e. a moiety capable of selectively interacting non-covalently with a biomolecule ( under conditions prevailing in a living cell, wherein said moiety and said biomolecule form a complex having a dissociation constant $k_D$ of $10^{-4}$ mol/l or less;

f. a lipid.

3. The compound according to claim 2, wherein the compound is connected to said binding moiety M through a covalent bond or a linker moiety L consisting of 1 to 50 atoms having an atomic weight of 12 or higher.

4. The compound according to claim 3, wherein L is -$L^{A1}$-$L^{J1}$-$L^{A2}_m$-$L^{J2}_{m'}$-$L^{A3}_p$, wherein
$L^{A1}$, $L^{A2}$ and $L^{A3}$ are independently selected from unsubstituted, amino-, hydroxyl-, carboxyl- or fluoro substituted $C_1$ to $C_6$ alkyl or $C_3$ to $C_6$ cycloalkyl, ($CH_2$—$CH_2$—$O)_r$ or ($CH_2$—$CH(OH)$—$CH_2$—$O)_r$ with r being an integer from 1 to 4, and
$L^{J1}$ and $L^{J2}$ are selected independently from —$NR^{N5}C(O)$—, —$C(O)N(R^{N5})$—, —CN—, —NC—, —CO—, —OC(O)—, —C(O)O—, $NR^{N5}$—, —O—, and —S—, with $R^{N5}$ being selected from H and and unsubstituted $C_1$ and $C_3$ alkyl and
m, m' and p independently from each other are selected from 0 and 1.

5. The compound according to claim 2, wherein the compound is connected to said binding moiety M through one of substituents A, $R^2$, $R^3$, $R^4$, G, or a phenyl moiety formed by U and V.

6. The compound according to claim 1, wherein any one of substituents $R^2$, $R^3$, $R^4$, and G independently of any other is selected from H and unsubstituted or fluoro-, amino-, hydroxyl-, $SO_3H$— and/or carboxyl substituted $C_1$ to $C_4$ alkyl, $C_1$ to $C_4$ alkenyl or $C_1$ to $C_4$ alkynyl, wherein optionally one of $R^2$, $R^3$, $R^4$, and G is linked to a moiety M.

7. The compound according to claim 1, wherein A is a moiety of the general formula (60)

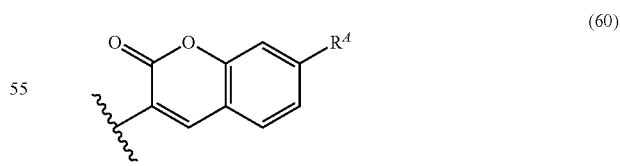
(60)

wherein $R^A$ is selected from H, OH, $NR^{Y1}R^{Y2}$.

8. The compound according to claim 1, wherein B is selected from H, D and F.

9. The compound according to claim 1, wherein Z is selected from
CN and $CONR^Z_2$ wherein each $R^Z$ is independently selected from H, unsubstituted $C_1$-$C_4$ alkyl and alkylaryl; or SO₂R^S with R^S being selected from
NR^SN₂, with each R^SN being independently selected from H, unsubstituted or hydroxy-, amino-, halogen-, and/or carboxy-substituted moiety selected from $C_1$-$C_8$ alkyl, $C_3$-$C_8$ cycloalkyl, $C_1$-$C_4$ acyl, $C_7$-$C_{12}$ alkylaryl, unsubstituted phenyl or phenyl substituted by any one or several of the following substituents: unsubstituted $C_1$-$C_4$ alkyl, halogen, O—$C_1$-$C_4$ alkyl, COOH, COOR^C, CONR^C₂, with R^C being selected from H and $C_1$-$C_8$ alkyl;
unsubstituted or perfluorinated alkyl.

10. The compound according to claim 1, wherein U and V form an unsubstituted or substituted phenyl, wherein one or several substituents of phenyl are independently selected from OH, SH, amine, halogen, CN, NC, CNO, NCO, CNS, NCS, unsubstituted $C_1$-$C_4$ O-alkyl, $C_1$-$C_4$ S-alkyl, O-aryl, S-aryl, NO₂, CHO, CONR^UV₂, COOR^UV, COO-aryl, COO-alkylaryl, PO₃H, PO₃R^UV, SO₃H, SO₃R^UV and SO₂R^UV, with R^UV being selected from H, and $C_1$-$C_4$ unsubstituted alkyl, or wherein U and V form a phenyl substituted with a moiety L-M.

11. The compound according to claim 1, wherein A and B are a moiety of the general formula (50),

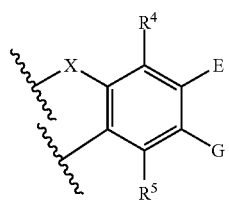

(50)

wherein
R⁴ and G are independently selected from H, substituted or unsubstituted $C_1$ to $C_4$ alkyl optionally forming a bridge to the substituent designated E, and a moiety having a molecular weight between 15 and 250 u (g/mol);
R⁵ is selected from H and F;
Y is NR^Y1R^Y2 and E is NR^EG1R^EG2 and
a. R^Y1 and R^Y2, and/or R^EG1 and R^EG2, are independently selected from H, unsubstituted and amino-, hydroxy-, carboxy- and/or fluoro-substituted $C_1$-$C_6$ alkyl, $C_1$-$C_4$ acyl, and $C_3$-$C_6$ cycloalkyl,
b. R^Y1 together with R^Y2, and/or R^EG1 together with R^EG2 form a ring and are an unsubstituted or alkyl-, amino-, hydroxy-, carboxy- and/or fluoro-substituted $C_3$-$C_6$ alkyl,
c. R^Y1 and/or R^EG1 are independently selected from H, unsubstituted and alkyl-, amino-, hydroxy-, carboxy- and/or fluoro-substituted $C_1$-$C_6$ alkyl, $C_1$-$C_4$ acyl, and $C_3$-$C_6$ cycloalkyl, and R^Y2 together with R² or R³, and/or R^EG2 together with G or R⁴, is an alkyl or heteroalkyl bridge selected from —(CH₂)₂—, —(CH₂)₃—, —CH₂CH=CH— or —(CH₂)₄— or —CH₂—O—, —CH₂—NR⁵—, —CH₂—S—, —CH₂—Se—, —(CH₂)₂O—, —(CH₂)₂NR^N—, —(CH₂)₂S—, —(CH₂)₂Se—, —CH₂—O—CH₂—, —CH₂NR⁵—, —CH₂S—CH₂—, —CH₂—Se—CH₂—, —CH₂-(1,2)phenyl-, and a mono- or dimethyl substituted derivative of any one of the foregoing alkyl or heteroalkyl bridge moieties;
d. R^Y1 and/or R^EG1 are independently selected from H, unsubstituted and alkyl-, amino-, hydroxy-, carboxyand/or fluoro-substituted $C_1$-$C_6$ alkyl, $C_1$-$C_4$ acyl, and $C_3$-$C_6$ cycloalkyl, and R^Y2 together with R², and/or R^EG2 together with G, form an cyclic structure according to any one of substructures (41) to (44) or (51) to (54):

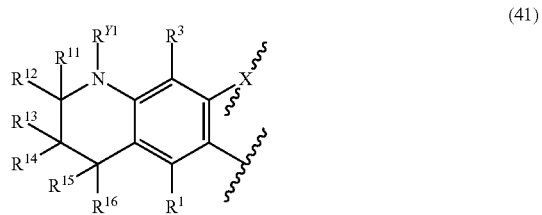

(41)

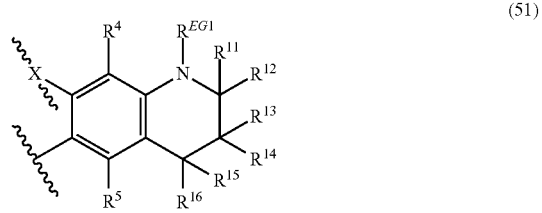

(51)

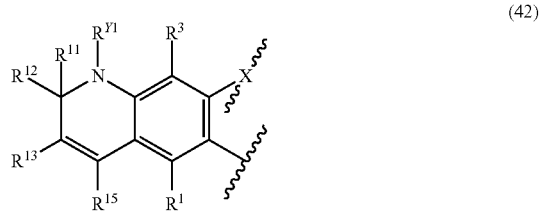

(42)

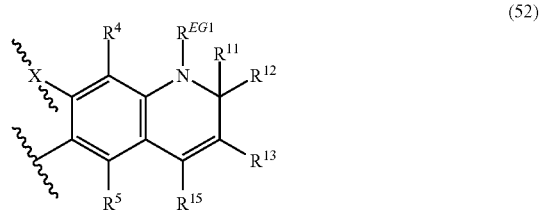

(52)

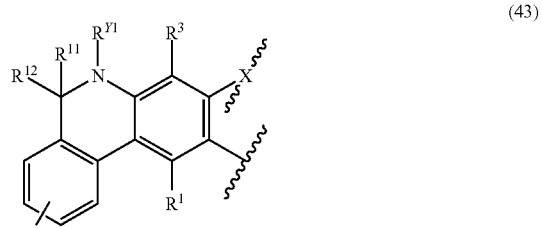

(43)

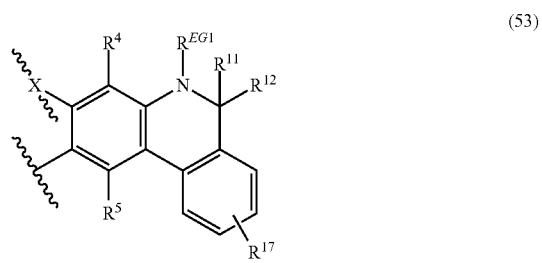

(53)

(44)
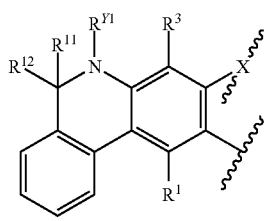

(54)
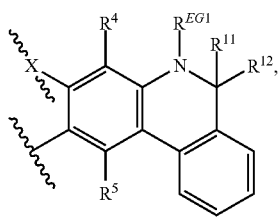

wherein $R^{11}$, $R^{12}$, $R^{13}$, $R^{14}$, $R^{15}$ and $R^{16}$ are selected from H, unsubstituted or hydroxyl-, amino-, carboxyl-, sulfoxyl- or halogen-substituted $C_1$ to $C_4$ alkyl, halogen, $SO_3R'$, $COOR'$, $CONR'_2$ with $R'$ selected from H and unsubstituted $C_1$ to $C_4$ alkyl;

and $R^{17}$ is selected from H unsubstituted or hydroxyl-, amino-, carboxyl-, sulfoxyl- or halogen-substituted $C_1$ to $C_4$ alkyl, halogen, $NO_2$, CN, $SO_3R'$, $COOR'$, $CONR'_2$ with $R'$ selected from H and unsubstituted $C_1$ to $C_4$ alkyl;

e. $R^{Y1}$ together with $R^3$, and $R^{Y2}$ together with $R^2$, and/or $R^{EG1}$ together with $R^4$, and $R^{EG2}$ together with G, form a bi-cyclic structure according to any one of substructures (45) to (47) or (55) to (57):

(45)
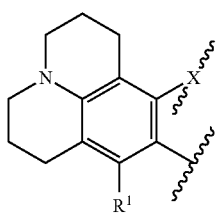

(55)
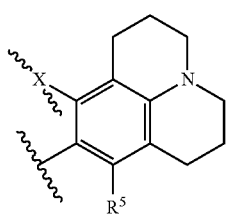

(46)
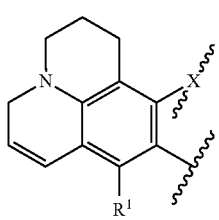

(56)
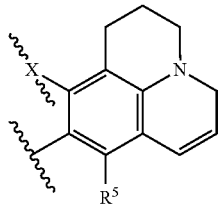

(47)
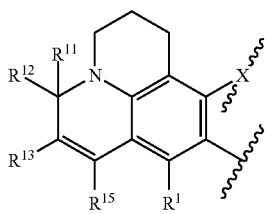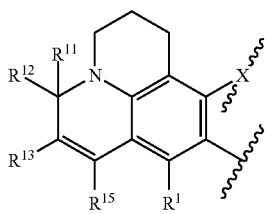

(57)
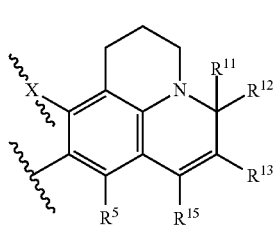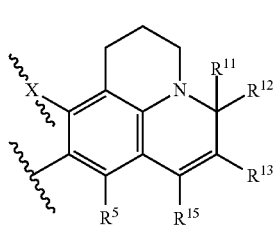

wherein $R^{11}$, $R^{12}$, $R^{13}$, and $R^{15}$ are selected from H, unsubstituted or hydroxyl-, amino-, carboxyl-, sulfoxyl- or halogen-substituted $C_1$ to $C_4$ alkyl, halogen, $SO_3R'$, $COOR'$, $CONR'_2$ with $R'$ selected from H and unsubstituted $C_1$ to $C_4$ alkyl; or f. $R^{Y2}$ and/or $R^{EG2}$ are independently selected from H, unsubstituted and alkyl-, amino-, hydroxy-, carboxy- and/or fluoro-substituted $C_1$-$C_6$ alkyl, $C_1$-$C_4$ acyl, and $C_3$-$C_6$ cycloalkyl, and $R^{Y1}$ together with $R^3$, and/or $R^{EG1}$ together with $R^4$, form an cyclic structure according to any one of substructures (48) to (49) or (58) to (59):

(48)
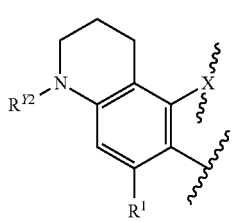

(58)
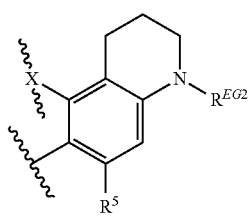

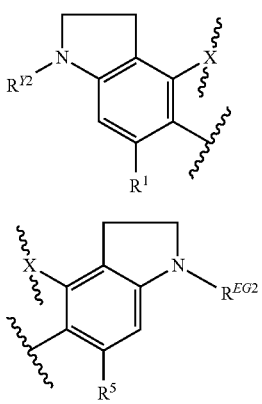

12. The compound according to claim 11, wherein $R^{Y1}$ together with $R^{Y2}$, and/or $R^{EG1}$ together with $R^{EG2}$ are —(CH$_2$)$_3$—, —CH$_2$CHFCH$_2$—, —CH$_2$CF$_2$CH$_2$—, —CH$_2$CH(CH$_3$)CH$_2$—, —CH$_2$C(CH$_3$)$_2$CH$_2$—, —CH$_2$CH(CN)CH$_2$—, —CH$_2$CH(COOH)CH$_2$—, —CH$_2$CH(CH$_2$COOH)CH$_2$—, —CH$_2$CH(OCH$_3$)CH$_2$— and —CH$_2$CH(N(CH$_3$)$_2$)CH$_2$—.

13. The compound according to claim 11, wherein
$R^{Y1}$ together with $R^3$, and $R^{Y2}$ together with $R^2$, and/or $R^{EG1}$ together with $R^4$, and $R^{EG2}$ together with G, form a bi-cyclic structure according to any one of substructures (45) to (47) or (55) to (57), and
Z is selected from
  CH$_2$R$^F$, CHR$^F_2$, and CR$^F_3$, with R$^F$ selected from CH$_2$F, CHF$_2$, CF$_3$, CH$_2$Cl, and CHCl$_2$, CCl$_3$;
  H
  CH$_2$COOR$^{K1}$ or CH$_2$CONHR$^{K1}$ with R$^{K1}$ selected from H, and unsubstituted or halogen-substituted C$_1$ to C$_4$ alkyl.

14. The compound according to claim 11, wherein
Y is NR$^{Y1}$R$^{Y2}$ and E is NR$^{EG1}$R$^{EG2}$,
$R^{Y1}$, $R^{Y2}$, $R^{EG1}$ and $R^{EG2}$ are unsubstituted or halogen-substituted C$_1$-C$_4$ alkyl;
optionally, R$^2$, R$^3$, R$^4$ and G can be halogen; and
Z is selected from
  CH$_2$R$^F$, CHR$^F_2$, and CR$^F_3$, with R$^F$ selected from CH$_2$F, CHF$_2$, CF$_3$, CH$_2$Cl, and CHCl$_2$, CCl$_3$;
  H
  CH$_2$COOR$^{K1}$ with R$^{K1}$ selected from H, and unsubstituted or halogen-substituted C$_1$ to C$_4$ alkyl.

15. The compound according to claim 11, wherein the compound is of the general formula (30) or (30')

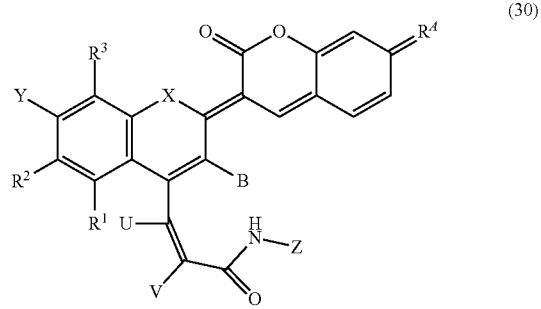

(30)

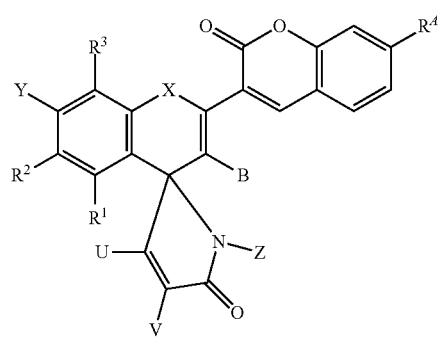

(30')

wherein
R$^A$, B, U and V have the meanings as defined in claim 1,
Y is NR$^{Y1}$R$^{Y2}$,
$R^{Y1}$ and $R^{Y2}$ are unsubstituted or halogen-substituted C$_1$-C$_4$ alkyl;
optionally, R$^2$ and R$^3$, can be halogen; and
Z is selected from
  CH$_2$R$^F$, CHR$^F_2$, and CR$^F_3$, with R$^F$ selected from CH$_2$F, CHF$_2$, CF$_3$, CH$_2$Cl, and CHCl$_2$, CCl$_3$;
  H
  CH$_2$COOR$^{K1}$ with R$^{K1}$ selected from H, and unsubstituted or halogen-substituted C$_1$ to C$_4$ alkyl.

16. The compound according to claim 1, wherein the compound is of the general formula (20) or (20')

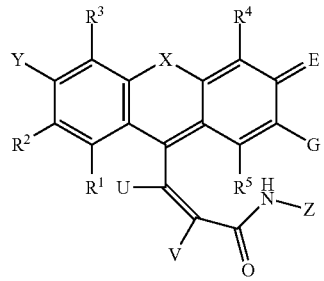

(20)

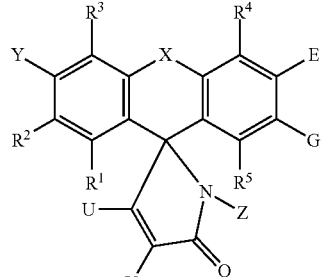

(20')

wherein
Y is NR$^{Y1}$R$^{Y2}$ and E is NR$^{EG1}$R$^{EG2}$, wherein $R^{Y1}$, $R^{Y2}$, $R^{EG1}$ and $R^{EG2}$ are individually unsubstituted or amino-, hydroxyl- or halogen-substituted C$_1$ to C$_4$ alkyl or C$_3$ to C$_6$ cycloalkyl, or $R^{Y1}$ together with $R^{Y2}$, and $R^{EG1}$ together with $R^{EG2}$ together with the N form an unsubstituted or methyl-, ethyl-propyl-, or halogen-substituted aziridine, pyrrolidine, piperidine, piperazine or morpholine, and/or $R^1$ and $R^5$ are H, and/or $R^2$, $R^3$, $R^4$ and G are independently selected from H, halogen, $SO_3H$, and unsubstituted and amino-, hydroxy-, carboxy-, $SO_3H$—, and/or halogen-substituted $C_1$-$C_4$ alkyl, $CO_2H$, $CO_2R$, $SO_2R$ with R being selected from $C_1$ to $C_4$ unsubstituted alkyl, and/or X is selected from O and/or U and V have the meaning defined in claim 9, and/or Z has the meaning as defined in claim 1, and wherein optionally, one of G, $R^2$, $R^3$, $R^4$, or a phenyl linking U and V bears a moiety M, linked to the compound by a covalent bond or a linker L, wherein M is selected from:

a) a moiety able to form one of an ester bond, an ether bond, an amide bond, a disulfide bond, a Schiff' base, or a moiety able to react in a click-chemistry reaction, wherein the moiety is selected from —CO—CHCH$_2$, —CO—NHS, biotin, an azide or ethyne moiety, a tetrazine moiety, a (bicyclo [6.1.0] nonyne) moiety, a cyclooctyne moiety, a transcyclooctene moiety and a maleimide, or a moiety employed for specific protein labelling, b) a substrate of an $O^6$-alkylguanine-DNA-alkyltransferase or a functional variant thereof, selected from a 6-[(4-methylenephenyl) methoxy]-9H-purin-2-amine moiety of formula (71), a moiety of formula (72), or a moiety of formula (73),

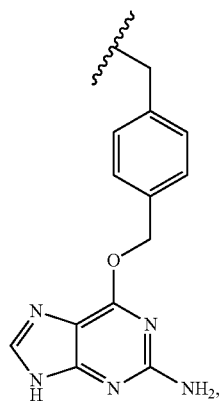
(71)

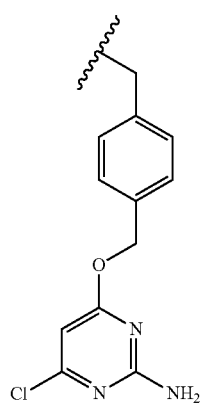
(72)

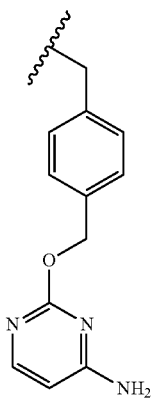
(73)

c) a substrate of a haloalkane halotransferase, of a 1-chlorohexyl moiety as exemplarily shown below;

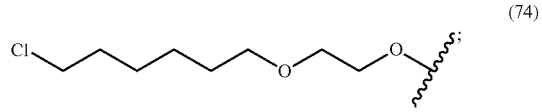 [SMILES: *OCCOCCCCCCCl]
(74)

or from a substrate of dihydrofolate reductase, represented by:

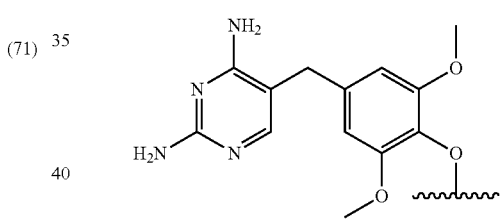
(75)

d) a moiety capable of selectively interacting non-covalently with a biomolecule under conditions prevailing in a living cell, wherein said moiety and said biomolecule form a complex having a dissociation constant kp of $10^{-4}$ mol/l or less;

e) a lipid.

17. The compound according to claim 1, wherein the compound is of the general formula (30) or (30')

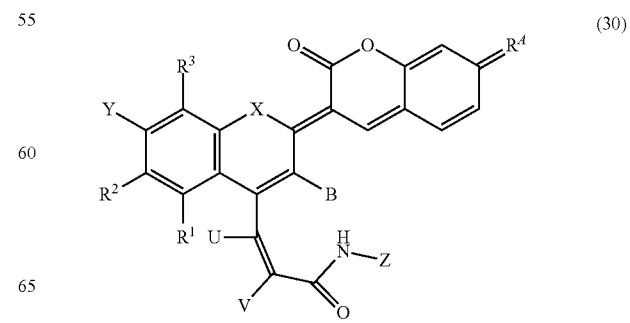
(30)

-continued

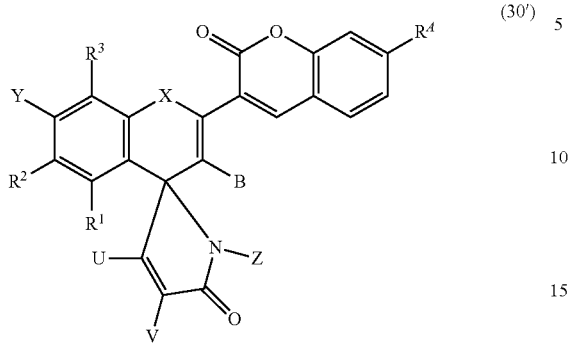

(30')

wherein

B is H, and/or

Y is $NR^{Y1}R^{Y2}$, wherein $R^{Y1}$ and $R^{Y2}$ are individually unsubstituted or amino-, hydroxyl- or halogen-substituted $C_1$ to $C_4$ alkyl or $C_3$ to $C_6$ cycloalkyl, or $R^{Y1}$ together with $R^{Y2}$, and $R^{EG1}$ together with $R^{EG2}$ together with the N form an unsubstituted or methyl-, ethyl- propyl-, or halogen-substituted aziridine, pyrrolidine, piperidine, piperazine or morpholine, and/or $R^1$ is H, and/or $R^2$ and $R^3$ are independently selected from H, halogen, $SO_3H$, and unsubstituted and amino-, hydroxy-, carboxy-, $SO_3H$—, and/or halogen-substituted $C_1$-$C_4$ alkyl, $CO_2H$, $CO_2R$, $SO_2R$ with R being selected from $C_1$ to $C_4$ unsubstituted alkyl, and/or X is O, and/or U and V have the meaning defined in claim 10, and/or Z has the meaning as defined in claim 1 and wherein optionally, one of $R^2$, $R^3$, $R^A$, or a phenyl linking U and V bears a moiety M, linked to the compound by a covalent bond or a linker L, wherein M is selected from:

a) a moiety able to form one of an ester bond, an ether bond, an amide bond, a disulfide bond, a Schiff' base, or a moiety able to react in a click-chemistry reaction, wherein the moiety is selected from —CO—CHCH$_2$, —CO—NHS, biotin, an azide or ethyne moiety, a tetrazine moiety, a (bicyclo [6.1.0] nonyne) moiety, a cyclooctyne moiety, a transcyclooctene moiety and a maleimide, or a moiety employed for specific protein labelling, b) a substrate of an $O^6$-alkylguanine-DNA-alkyltransferase or a functional variant thereof, selected from a 6-[(4-methylenephenyl) methoxy]-9H-purin-2-amine moiety of formula (71), a moiety of formula (72), or a moiety of formula (73),

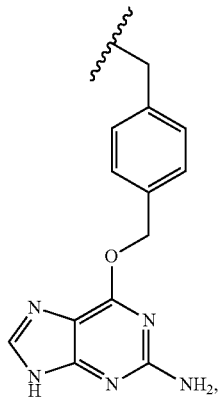

(71)

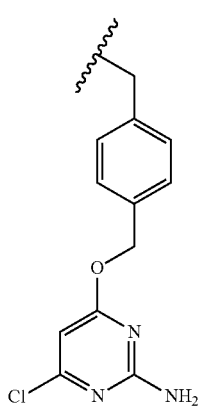

(72)

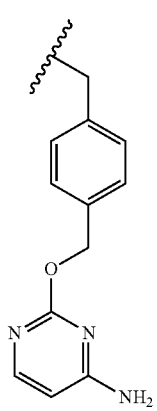

(73)

c) a substrate of a haloalkane halotransferase, of a 1-chlorohexyl moiety as exemplarily shown below;

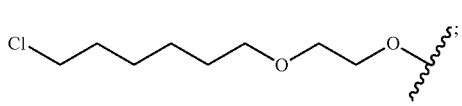

(74)

or from a substrate of dihydrofolate reductase, represented by:

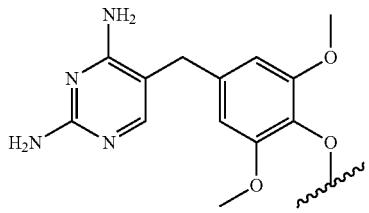
(75)

d) a moiety capable of selectively interacting non-covalently with a biomolecule under conditions prevailing in a living cell, wherein said moiety and said biomolecule form a complex having a dissociation constant kp of $10^{-4}$ mol/l or less;

a lipid.

18. The compound according to claim 16, wherein $R^2$, $R^3$, $R^4$, and G, are

H, or one of $R^1$, $R^2$, $R^3$, $R^4$, G, and $R^5$ is $L^{A1}_n$-$L^{J1}_{n'}$-$L^{A2}_m$-$L^{J2}_{m'}$-$L^{A3}_p$$L^{J3}_{p'}$-$L^{A4}_q$-$L^{J4}_{q'}$-$M_s$, wherein $L^{A1\ldots 4}$, $L^{J1\ldots 4}$, n, n' ... q', s and M have the definitions recited above;

Y is $NR^{Y1}R^{Y2}$ and E is $NR^{EG1}R^{EG2}$; and $R^{Y1}$, $R^{Y2}$, $R^{EG1}$ and $R^{EG2}$ are individually unsubstituted or amino-, hydroxyl- or fluoro substituted $C_1$ to $C_4$ alkyl, or $R^{Y1}$ together with $R^{Y2}$, and $R^{EG1}$ together with $R^{EG2}$ form a ring and are —$(CH_2)_3$—, —$(CH_2)_4$—, —$(CH_2)_5$—, —$(CH_2)_2O(CH_2)_2$— or —$(CH_2)_2NH(CH_2)_2$—.

19. The compound according to claim 11, wherein $R^2$ and G are F or Cl.

20. A method to stain a sample, said method comprising the steps of:

a. contacting the sample with a compound according to claim 1 or being characterized by one of the following combinations

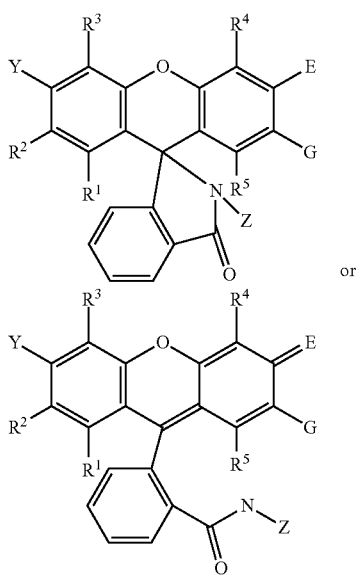

with $R^1$, $R^2$, $R^3$, $R^4$, $R^5$ and G are H, and

Y and E are $NEt_2$ and

Z is $CONH_2$ or

Z is $CONHC_6H_5$; or

Z is CN or

Z is selected from $CH_2CF_3$, $CH_2CHF_2$, and $CH_2CH_2F$, or

Z is selected from $CH_2COOCH_3$ and $CH_2COOH$,

Z is H, or

Y and E are $NMe_2$ and Z is selected from $CH_2COOCH_3$ and $CH_2COOH$ or

Y and E are $NH_2$ and Z is selected from $CH_2COOH$ and $CH_2COOCH_3$ or

Y is OH and E is =O (for formula 10) or E is OH (for formula 10'), and Z is $C(=O)(CH_3)C_6H_5$;

or $R^1$, $R^3$, $R^4$, and $R^5$ are H, $R^2$ and G are methyl, Y and E are NHEt and Z is $CH_2COOH$ or $CH_2COOCH_3$ or the compound is of formula (301), (302), (303) or (304)

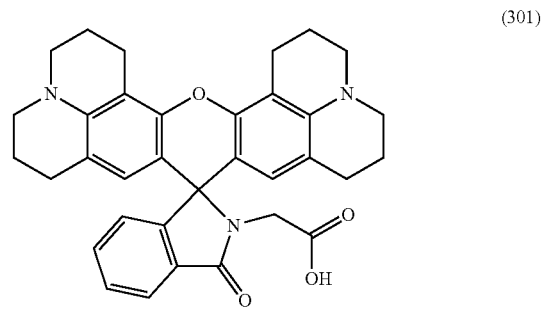
(301)

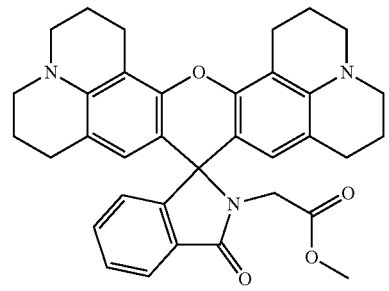
(302)

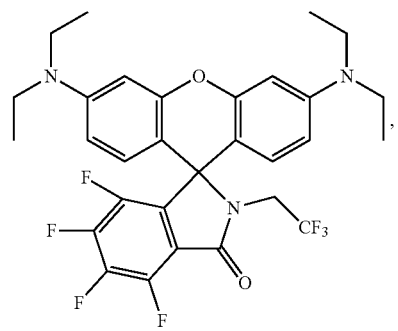
(303)

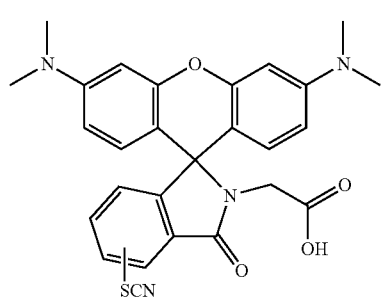 (304)
b. illuminating the sample with light of a wavelength ranging from 400-800 nm;
c. recording the presence and location of said compound in said sample by illuminating the sample with light of an appropriate excitation wavelength and recording light emitted from said sample.
* * * * *